United States Patent
Svedman et al.

(10) Patent No.: US 12,126,577 B2
(45) Date of Patent: Oct. 22, 2024

(54) USER EQUIPMENT AND BASE STATION FOR MANAGING BEAM FAILURE DETECTION

(71) Applicant: InterDigital Patent Holdings, Inc., Wilmington, DE (US)

(72) Inventors: Patrick Svedman, Chevy Chase, MD (US); Qing Li, Princeton Junction, NJ (US); Pascal M. Adjakple, Great Neck, NY (US); Lakshmi R. Iyer, King of Prussia, PA (US); Guodong Zhang, Woodbury, NY (US); Joseph M. Murray, Schwenksville, PA (US); Stephen E. Terry, Northport, NY (US); Mohamed Awadin, Plymouth Meeting, PA (US); Allan Y. Tsai, Boonton, NJ (US); Yifan Li, Conshohocken, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 35 days.

(21) Appl. No.: 17/421,853

(22) PCT Filed: Jan. 10, 2020

(86) PCT No.: PCT/US2020/013091
§ 371 (c)(1),
(2) Date: Jul. 9, 2021

(87) PCT Pub. No.: WO2020/146737
PCT Pub. Date: Jul. 16, 2020

(65) Prior Publication Data
US 2022/0109547 A1    Apr. 7, 2022

Related U.S. Application Data
(60) Provisional application No. 62/790,952, filed on Jan. 10, 2019.

(51) Int. Cl.
*H04L 5/00* (2006.01)
*H04B 7/06* (2006.01)
(Continued)

(52) U.S. Cl.
CPC ......... *H04L 5/0098* (2013.01); *H04B 7/0626* (2013.01); *H04B 7/0695* (2013.01);
(Continued)

(58) Field of Classification Search
CPC ..... H04L 5/001; H04L 5/0053; H04L 5/0091; H04L 5/0094; H04L 5/0098; H04W 8/22
See application file for complete search history.

(56) References Cited

U.S. PATENT DOCUMENTS

| | | | |
|---|---|---|---|
| 2015/0208269 A1 | 7/2015 | Damnjanovic et al. | |
| 2016/0037405 A1* | 2/2016 | Choi | H04W 48/20 455/444 |

(Continued)

FOREIGN PATENT DOCUMENTS

| | | |
|---|---|---|
| CN | 105917607 A | 8/2016 |
| TW | 201844044 A | 12/2018 |

(Continued)

OTHER PUBLICATIONS

"3rd Generation Partnership Project; Technical Specification Group Radio Access Network; NR; User Equipment (UE) radio access capabilities (Release 15)", 3GPP Draft; Draft 38306-F40, 3rd Generation Partnership Project (3GPP), Mobile Competence Centre ; 650, Route Des Lucioles ; F-06921 Sophia-Antipolis Cedex; France Jan. 2, 2019, XP051576853.

(Continued)

*Primary Examiner* — Gary Mui
(74) *Attorney, Agent, or Firm* — Flaster Greenberg P.C.

(57) ABSTRACT

An apparatus includes a processor, a memory; and communication circuitry, the apparatus being connected to a com- (Continued)

munications network via the communication circuitry, the apparatus further including computer-executable instructions stored in the memory which, when executed by the processor, causes the apparatus to identify an apparatus capability that is an indication of an ability of the apparatus to perform beam failure detection (BFD) for a plurality of cells, transmit the apparatus capability to an other apparatus, receive from the other apparatus at least one message including a change in network configuration; and substitute a second set of cells for the first set of cells on which the apparatus performs BFD based on the change in network configuration so the apparatus capability is not exceeded by the network configuration.

20 Claims, 16 Drawing Sheets

(51) Int. Cl.
  *H04W 48/20* (2009.01)
  *H04W 76/19* (2018.01)
  *H04W 80/02* (2009.01)

(52) U.S. Cl.
  CPC ........... *H04L 5/0094* (2013.01); *H04W 48/20* (2013.01); *H04W 76/19* (2018.02); *H04W 80/02* (2013.01)

(56) References Cited

U.S. PATENT DOCUMENTS

| | | | | |
|---|---|---|---|---|
| 2017/0142951 | A1* | 5/2017 | Hardy | B08B 9/0861 |
| 2017/0331670 | A1 | 11/2017 | Parkvall et al. | |
| 2019/0297577 | A1* | 9/2019 | Lin | H04W 52/0235 |
| 2020/0107266 | A1* | 4/2020 | Liao | H04W 52/0229 |
| 2020/0145164 | A1* | 5/2020 | Cheng | H04W 52/265 |
| 2020/0383165 | A1* | 12/2020 | Takahashi | H04W 74/0833 |
| 2021/0160126 | A1* | 5/2021 | Cirik | H04W 52/0241 |
| 2021/0204346 | A1 | 7/2021 | Ye et al. | |
| 2021/0219154 | A1* | 7/2021 | Han | H04B 7/0626 |
| 2021/0392651 | A1* | 12/2021 | Futaki | H04W 72/542 |
| 2022/0039009 | A1* | 2/2022 | Iyer | H04L 5/0098 |
| 2022/0210866 | A1* | 6/2022 | He | H04W 76/28 |

FOREIGN PATENT DOCUMENTS

| | | | |
|---|---|---|---|
| WO | 2018/064483 | A1 | 4/2018 |
| WO | 2018/164332 | A1 | 9/2018 |
| WO | 2018/174667 | A1 | 9/2018 |

OTHER PUBLICATIONS

Convida Wireless: "On Beam Failure Recovery for SCell", 3GPP Draft; R1-1813624_ON Beam Failure Recovery for Scell, 3rd Generation Partnership Project (3GPP), Mobile Competence Centre ; 650, Route Des Lucioles ; F-06921 Sophia-Antipolis Cedex; France, vol. RAN WG1, no. Spokane, USA; Nov. 12, 2018-Nov. 16, 2018, Nov. 11, 2018, XP051555682.
Convida Wireless: "On Beam Failure Recovery for SCell", 3GPP Draft; R1-1901206, 3rd Generation Partnership Project (3GPP), Mobile Competence Centre; 650, Route Des Lucioles; F-06921 Sophia-Antipolis Cedex; France, vol. RAN WG1, no. Taipei, Taiwan; Jan. 21, 2019-Jan. 25, 2019, Jan. 12, 2019, XP051576735.
Convida Wireless: "On Beam Failure Recovery for SCell", 3GPP Draft; R1-1904840_ON_BEAM_FAILURE_RECOVERY_FOR_SCELL, 3rd Generation Partnership Project(3GPP), Mobile Competence Centre ; 650, Route Des Lucioles ; F-06921 Sophia-Antipolis Cedex ; France, vol. RAN WG1, no. Xi 'an, China; Apr. 8, 2019-Apr. 12, 2019, Mar. 29, 2019, XP051691795.
Mediatek Inc: "Summary 1 on Remaing issues on Beam Failure Recovery", 3GPP Draft; R1-1807661 SUMMARY_BFR_V03, 3rd Generation Partnership PROJECT-(3GPP), Mobile Competence Centre; 650, Route Des Lucioles; F-06921 Sophia-Antipolis Cedex; France vol. RAN WG1,no. Busan, Korea; May 21, 2018-May 25, 2018 May 24, 2018, XP051463292.
Catt, "Triggering of SCell dormancy", 3GPP TSG RAN WG1#99 R1-1912150, 3GPP, Nov. 2019, pp. 1-6.
Ericsson, "Dormant SCell state in NR", 3GPP TSG-RAN WG2#103, Aug. 2018, R2-1811629, pp. 2.
Huawei et al., "Power consumption reduction based on time/frequency/antenna adaptation", R1-1810154, 3GPP TSG RAN WG1 Meeting #94bis, Oct. 2018, pp. 5.
LG Electronics Inc., "Clearing remaining issues on BWP", 3GPP TSG-RAN WG2 Meeting #101bis, May 2018, R2-1808511, pp. 1-2.
Oppo, "Introduction of dormancy behavior in NR", 3GPP TSG RAN WG2#108 R2-1914552, 3GPP, Nov. 2019, pp. 1-12.
Third Generation Partnership Project, "Technical Specification Group Radio Access Network; NR; Medium Access Control (MAC) protocol specification (Release 15)," 3GPP TS 38.321 V15.3.0, Sep. 2018, 76 pages.
Third Generation Partnership Project, "Technical Specification Group Radio Access Network; NR; Radio Resource Control (RRC) protocol specification (Release 15)," 3GPP TS 38.331 V15.3.0, Sep. 2018, 445 pages.
Third Generation Partnership Project, "Technical Specification Group Radio Access Network; NR; Physical layer procedures for data (Release 15)," 3GPP TS 38.214 V15.3.0, Sep. 2018, 96 pages.
Third Generation Partnership Project, "Technical Specification Group Radio Access Network; NR; Physical layer procedures for control (Release 15)," 3GPP TS 38.213 V15.3.0, Sep. 2018, 101 pages.
Third Generation Partnership Project, Technical Specification Group Radio Access Network; NR; User Equipment (UE) radio access capabilities; (Release 15), 3GPP TS 38.306 V15.3.0, Sep. 2018, 31 pages.
Third Generation Partnership Project, "Technical Specification Group Radio Access Network; NR; Requirements for support of radio resource management (Release 15)," 3GPP TS 38.133 V15.3.0, Sep. 2018, 136 pages.
Third Generation Partnership Project, "Revised WID: Enhancements on MIMO for NR", Samsung, RP-182863, 3GPP TSG RAN Meeting #82, Sorrento, Italy, Dec. 10-13, 2018, 5 pages.
Intel, "Correction of allowed CQI report delays in sCell Activation Tests", 3GPP TSG-RAN WG5 Meeting #67, R5-151905, Fukuoka, Japan, May 29, 2015, 12 pages.
Qualcomm Incorporated, "Discussion of cell activation timing", 3GPP TSG RAN WG1 #73, R1-132471, Fukuoka, Japan, May 11, 2013, 2 pages.
HTC, "Managing PUCCH resources on a deactivated PUCCH SCell", 3GPP TSG-RAN WG2 #91, R2-153463, Beijing, P.R. China, Aug. 15, 2015, 2 pages.

* cited by examiner

USER EQUIPMENT AND BASE STATION FOR MANAGING BEAM FAILURE DETECTION

CROSS-REFERENCE TO RELATED APPLICATIONS

This application is the National Stage Application of International Patent Application No. PCT/US2020/013091, filed Jan. 10, 2020 which claims the benefit of the earlier filed U.S. Provisional Application Ser. No. 62/790,952, filed on Jan. 10, 2019, the entire contents of which being incorporated herein by reference.

FIELD

The present disclosure relates generally to wireless communications, and more particularly to wireless communications systems, devices, methods, and computer readable medium with operation of beam failure detection capabilities, or with function related to beam failure detection capabilities, especially for a plurality of cells.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Beam failure detection (BFD), new beam identification (NBI) and beam failure recovery (BFR) are User Equipment (UE) procedures aimed at maintaining a communication link between the network and a UE. By following these procedures, a UE can detect BFD, identify a new candidate beam through NBI, and recover from the beam failure by indicating the new beam to the network through BFR. As contemplated in today's industry standards, BFD, NBI and BFR procedures are supported on a Special Cell (SpCell), i.e. PCell or PSCell, but not a secondary Cell (SCell).

In some cases, "BFR" is used to denote an entirety of beam failure detection/recovery, and thus includes BFD, NBI and BFR. In some cases. "link recovery" is used to denote all or part of beam failure detection/recovery, e.g. BFD, NBI and/or BFR.

UEs can be explicitly configured by radio resource control (RRC) signaling with up to two BFD-reference signals (BFD-RS) in a downlink (DL) bandwidth part (BWP-terminology used in 5G to describe a contiguous set of physical resource blocks, selected from a contiguous subset of the resource blocks for a given numerology on a given carrier—and is used to characterize an amount of carrier frequency bandwidth used), using the IE RadioLinkMonitoringConfig. A BFD-RS may be used for radio link quality measurements on the serving cell. The BFD-RS can be configured in the same list as the radio link monitoring reference signals (RLM-RS) by setting the parameter "purpose" of up to two of the RS as "beamFailure" or "both". If BFD-RS is not explicitly configured in RadioLinkMonitoringConfig, the BFD-RS are implicitly given as further described below.

The maxNrofFailureDetectionResources is 10. The limitation of max 2 RS for BFD is instead given in 3GPP Technical Specification TS 38.213 of the Medium Access Control (MAC) protocol specification. Conventional BFD description is provided in an L1 portion of the TS 38.213, and overall BFD, NBI and BFR procedure is mainly managed by the MAC layer, as described in 3GPP Technical Specification 38.321, V15.3.0. September 2018.

A UE can be RRC configured with a set of SCells. Moreover, an SCell is activated for a UE through MAC CE indication, and an SCell can be deactivated for a UE in a number of ways. e.g.: deactivation through MAC CE indication, expiry of an sCellDeactivationTimer timer, or at handover. In contrast. SpCells are always activated.

SUMMARY

As recognized by the present inventors, the capabilities of different UEs to support BFD for a group of cells will vary from UE to UE, and even vary depending on a state of the UE, such as a full battery state or a low battery state. While a UE is able to report to the network (e.g., a base station, or gNodeB, gNB) a metric of its ability to support a number cells for BFD (generally referred to as UE capability, or UE BFD capability, or UE BFD capability parameter), a UE according to the teachings of the present disclosure is also able to adapt a number of cells (or an amount of BFD processing that will performed for cells) included in the group of cells for which it is responsible to perform BFD. Likewise, it is also able to adapt to a number BFD-RSs or BWPs. Moreover, if the UE capability is less than a network configuration of cells associated with performing BFD for a group of cells, or a number of BFD-RS, a UE according to the present disclosure is able to reduce the number of cells, or BFD-RSs, for example, for which it is responsible for BFD to a lower number, which is within the UE's capability.

In some embodiments, processing circuitry at the UE applies a selection rule or procedure to reduce the BFD demands on the UE by the UE determining on which cell(s), BWP(s) and/or BFD-RS (out of the configured) it will performs BFD. Thus, a UE equipped to adapt the number of cells on which it will perform BFD, and/or the BWP and/or reference signals of the cells on which it will perform BFD so the UE capability is not exceeded.

Alternatively, the UE adapts the number of cells for which it is responsible for performing BFD based on guidance provided by the network, such as a serving base station. In this case, the base station uses the UE capability information reported by the UE, and provides command signals of various forms to instruct the UE how to adjust the number of cells, and/or the BWP and/or reference signals of the cells on which it will perform BFD so the UE capability is not exceeded. As recognized by the present inventors, the demands (or more generally network configuration) on a BFD may expand substantially in the future, well beyond the one or two cells for which a UE today may be responsible. For example, in some areas perhaps 20 or 30 secondary cells may be included in the group of cells for which the UE is responsible for performing BFD. Such a high processing demand may be well beyond the processing capability of the UE and so, according to the present description, the network may pare down the number of cells, and or BFD-related demands, in a group of cells assigned to the UE. This coordination between the UE and the base station may be accomplished with a variety of signaling and protocol mechanisms discussed herein, including RRC configuration, MAC signaling, and L1 signaling.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The scope of the present disclosure is best understood from the following detailed description of exemplary embodiments when read in conjunction with the accompanying drawings, wherein.

Figure 1A:
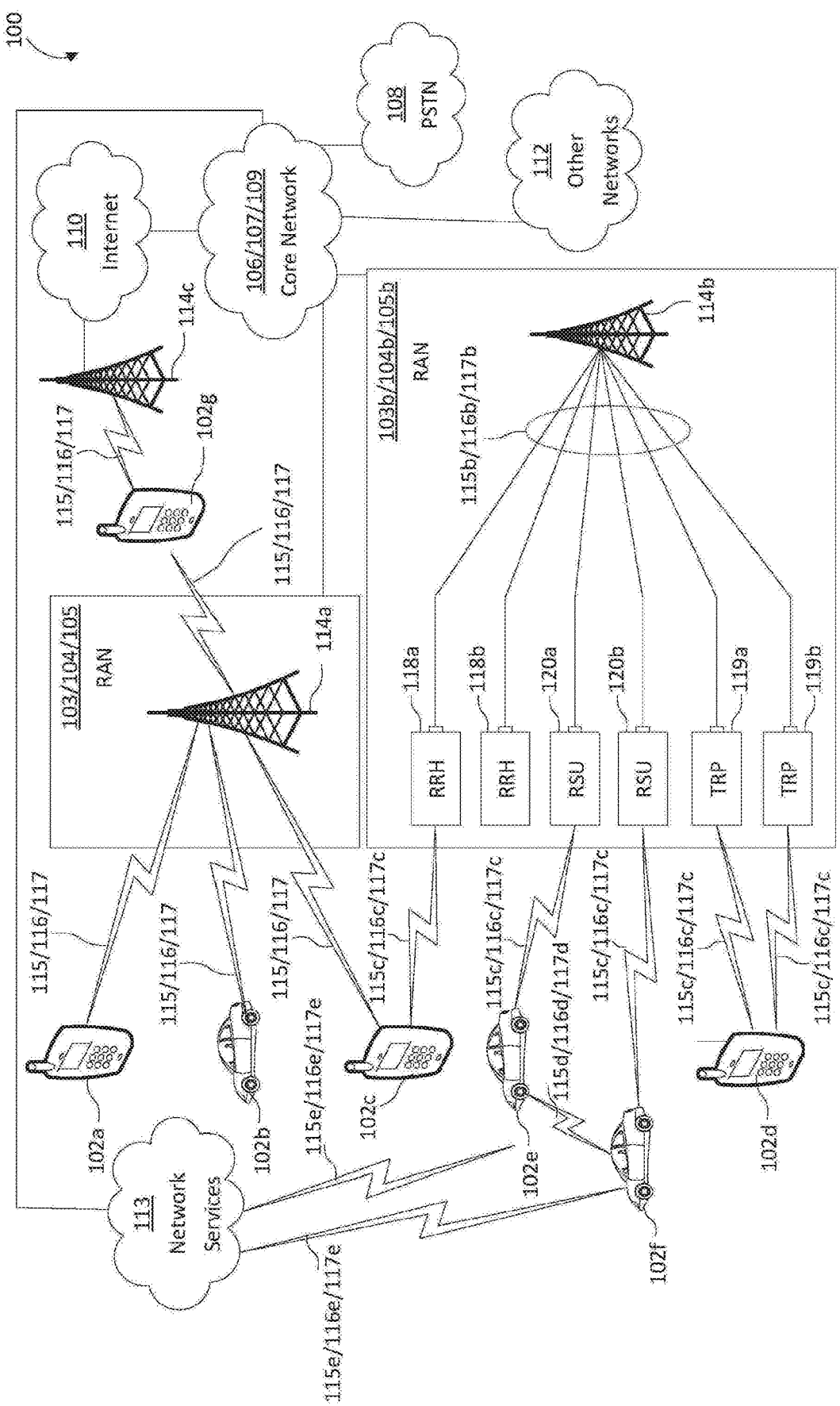
FIG. 1A is a block diagram that shows one embodiment of an example wireless communication system in which the methods and apparatuses described and claimed herein may be embodied.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G). LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz. and the provision of new ultra-mobile broadband radio access above 7 GHz. The flexible radio access is expected to consist of a new, non-backwards compatible radio access in new spectrum below 7 GHz. and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

For the reader's convenience the following Table of Abbreviations is provided

TABLE 1

| Abbreviations | |
|---|---|
| BF | Beam Failure |
| BFD | Beam Failure Detection |
| BFR | Beam Failure Recovery |
| BFRQ | Beam Failure Recovery ReQuest |
| BFRR | Beam Failure Recovery Response |
| BLER | Block Error Rate |
| BSR | Buffer Status Report |

TABLE 1-continued

Abbreviations

| | |
|---|---|
| BWP | Bandwidth Part |
| CBRA | Contention-based Random Access |
| CFRA | Contention-free Random Access |
| CORESET | Control Resource Set |
| CRC | Cyclic Redundancy Check |
| C-RNTI | Cell Radio-Network Temporary Identifier |
| CS-RNTI | Configured Scheduling Radio-Network Temporary Identifier |
| CSI-RS | Channel State Information Reference Signal |
| DCI | Downlink Control Information |
| DL | Downlink |
| DMRS | Demodulation Reference Signal |
| eMBB | enhanced Mobile Broadband |
| FDD | Frequency Division Duplex |
| FR1 | Frequency Range 1 (low frequencies, e.g. below 7.125 GHz or 6 GHz) |
| FR2 | Frequency Range 2 (high frequencies, e.g. above 7.125 GHz or 6 GHz) |
| gNB | NR NodeB, gNode B |
| IE | Information Element |
| LTE | Long Term Evolution |
| MAC | Medium Access Control |
| MAC CE | MAC Control Element |
| MCG | Master Cell Group |
| MIB | Master Information Block |
| NB | New Beam |
| NBI | New Beam Identification |
| NR | New Radio |
| NZP | Non-zero Power |
| OFDM | Orthogonal Frequency Division Multiplexing |
| PBCH | Physical Broadcast Channel |
| PCell | Primary Cell |
| PDCCH | Physical Downlink Control CHannel |
| PDSCH | Physical Downlink Shared CHannel |
| PUCCH | Physical Uplink Control CHannel |
| PUSCH | Physical Uplink Shared CHannel |
| PHY | Physical Layer |
| PRACH | Physical Random Access Channel |
| PSCell | Primary SCG Cell |
| BF | Beam Failure |
| QCL | Quasi Co-location |
| RA | Random Access |
| RACH | Random Access Channel |
| RAN | Radio Access Network |
| RLE | Radio Link Failure |
| RLM | Radio Link Monitoring |
| RNTI | Radio Network Temporary Identification |
| RRC | Radio Resource Control |
| RS | Reference Signal |
| RSRP | Reference Signal Received Power |
| SCell | Secondary Cell |
| SCG | Secondary Cell Group |
| SpCell | Special Cell (PCell or PSCell) |
| SR | Scheduling Request |
| SRS | Sounding Reference Signal |
| SS | Synchronization Signal |
| SSB | SS/PBCH Block |
| TAG | Timing Advance Group or Time-Alignment Group |
| TCI | Transmission Configuration Indicator |
| TDD | Time Division Duplex |
| TRS | Tracking Reference Signal |
| TTI | Transmission Time Interval |
| UCI | Uplink Control Information |
| UE | User Equipment |
| UL | Uplink |
| URLLC | Ultra reliable and low' latency communications |

REFERENCES

Throughout this document several standards are referred to in abbreviated form according to the following notation.
3GPP TS 38.331, V15.3.0, 2018 October, "38.331"
3GPP TS 38.213, V15.3.0, 2018 October, "38.213"
3GPP TS 38.321, V15.3.0, 2018 September, "38.321"
3GPP TS 38.133, V15.3.0, 2018 October, "38.133"
3GPP TS 38.306, V15.3.0, 2018 October, "38.306"
3GPP TS 38.214, V15.3.0, 2018 October, "38.214"
RP-182863, "Revised WID: Enhancements on MIMO for NR", 2018 Dec. 13

Example Communication System and Networks

FIG. 1A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Although each WTRU 102a, 102b, 102c, 102d, 102e, 102f, 102g is depicted in FIGS. 1A-1E as a hand-held wireless communications apparatus, it is understood that with the wide variety of use cases contemplated for wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110. Network Services 113, and/or the other networks 112. Examples of Network Services may include V2X Services, ProSe Services. IoT Services. Video Streaming, Edge Computing, etc. Base stations 114b may be any type of device configured to wiredly and/or wirelessly interface with at least one of the RRHs (Remote Radio Heads) 118a, 118b. TRPs (Transmission and Reception Points) 119a, 119b, and/or RSUs (Roadside Units) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRU 102c, to facilitate access to one or more communication networks, such as the core network 106/107/109, the Internet 110. Network Services 113, and/or other networks 112. TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/

107/109, the Internet 110, other networks 112, and/or Network Services 113. By way of example, the base stations 114a, 114b may be a base transceiver station (BTS), a Node-B, an eNode B, a Home Node B, a Home eNode B, a next generation node-B (gNode B), a satellite, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers. e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b. 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b. TRPs 119a, 119b, and/or RSUs 120a and 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c,102d, 102e, 102f, and/or 102g may communicate with one another over a direct air interface 115d/116d/117d, such as Vehicle-to-Vehicle (V2V) sidelink communication, and WTRUs 102a, 102b, 102c, 102d, 102e, 102f, and/or 102g may communicate with Network Service 113 over a direct air interface 115e/116e/117e, such as Vehicle-to-Infrastructure (V2I) sidelink communication. (not shown in the figures), which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

More specifically, as noted above, the communications system 100 may be a multiple access system and may employ one or more channel access schemes, such as CDMA. TDMA, FDMA, OFDMA. SC-FDMA, and the like. For example, the base station 114a in the RAN 103/104/105 and the WTRUs 102a, 102b, 102c, or RRHs 118a, 118b, TRPs 119a, 119b and/or RSUs 120a, 120b in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a in the RAN 103/104/105 and the WTRUs 102a. 102b, 102c, or RRHs 118a, 118b. TRPs 119a, 119b, and/or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). The air interface 115/116/117 or 115c/116c/117c may implement 3GPP NR technology. The LTE and LTE-A technology includes LTE D2D and V2X technologies and interface (such as Sidelink communications and etc.). The 3GPP NR technology includes NR V2X technologies and interface (such as Sidelink communications and etc.).

In an embodiment, the base station 114a in the RAN 103/104/105 and the WTRUs 102a. 102b, 102c, or RRHs 118a, 118b, TRPs 119a, 119b and/or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA. CDMA2000, GSM. LTE, LTE-A, NR, etc.) to establish a picocell or femtocell. As shown in FIG. 1A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or voice over internet protocol (VoIP) services to one or more of the WTRUs 102a, 102b, 102c, 102d, and 102f. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e, and 102f to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The other networks 112 may include wired or wireless communications networks owned and/or operated by other service providers. For example, the networks 112 may include any type of packet data network (i.e. an IEEE 802.3 ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities. e.g., the WTRUs 102a, 102b, 102c, 102d, 102e, and 102f may include multiple transceivers for communicating with different wireless networks over different wireless links. For example, the WTRU 102g shown in FIG. 1A may be configured to communicate with the base station 114a, which may employ a cellular-based radio technology, and with the base station 114c, which may employ an IEEE 802 radio technology.

Although not shown in FIG. 1A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 1B:
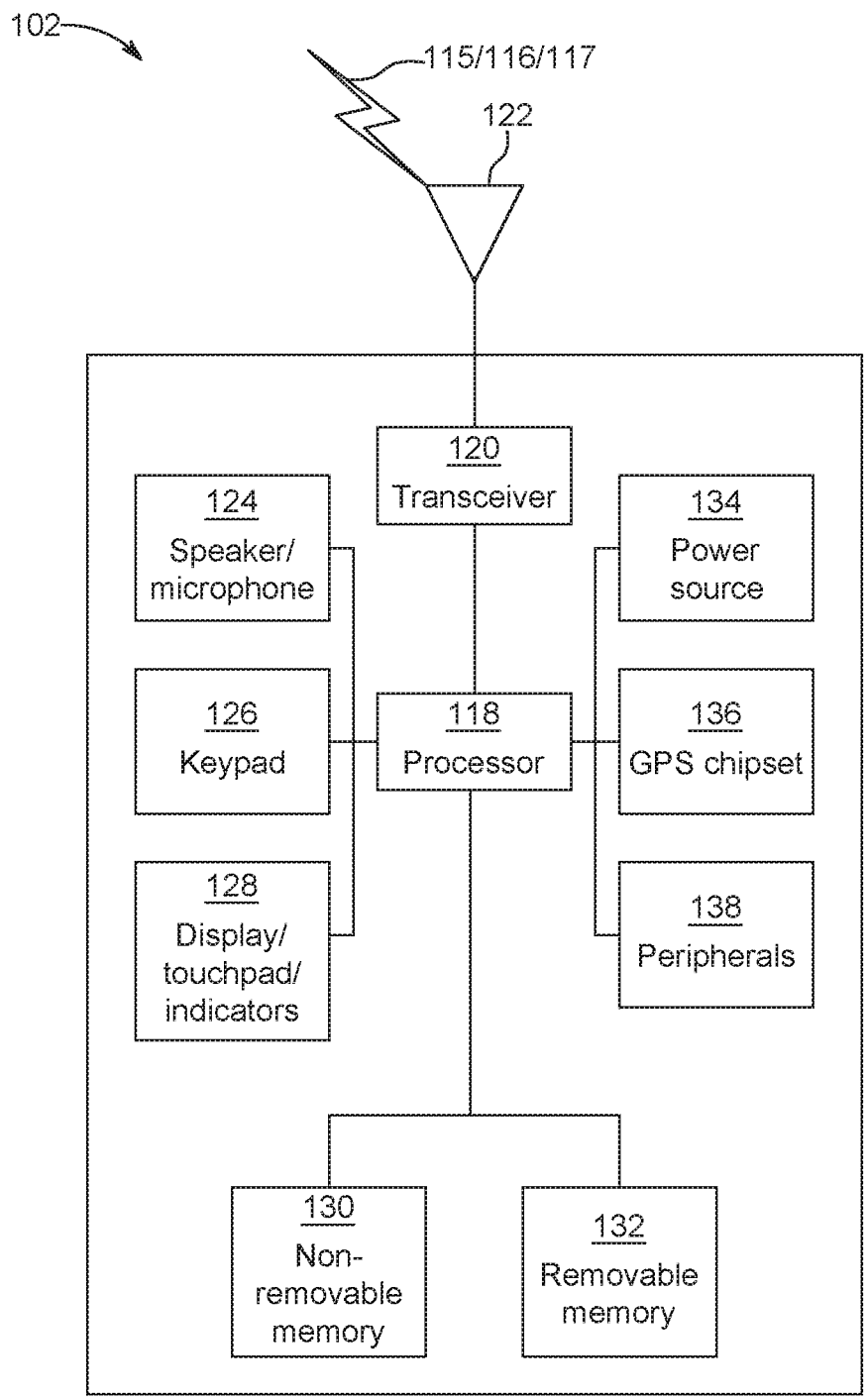
FIG. 1B is a block diagram of an example apparatus or device configured for wireless communications in accordance with the embodiments illustrated herein.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a) over the air interface 115/116/117 or another UE over the air interface 115d/116d/117d. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example, NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit.

The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 1C:
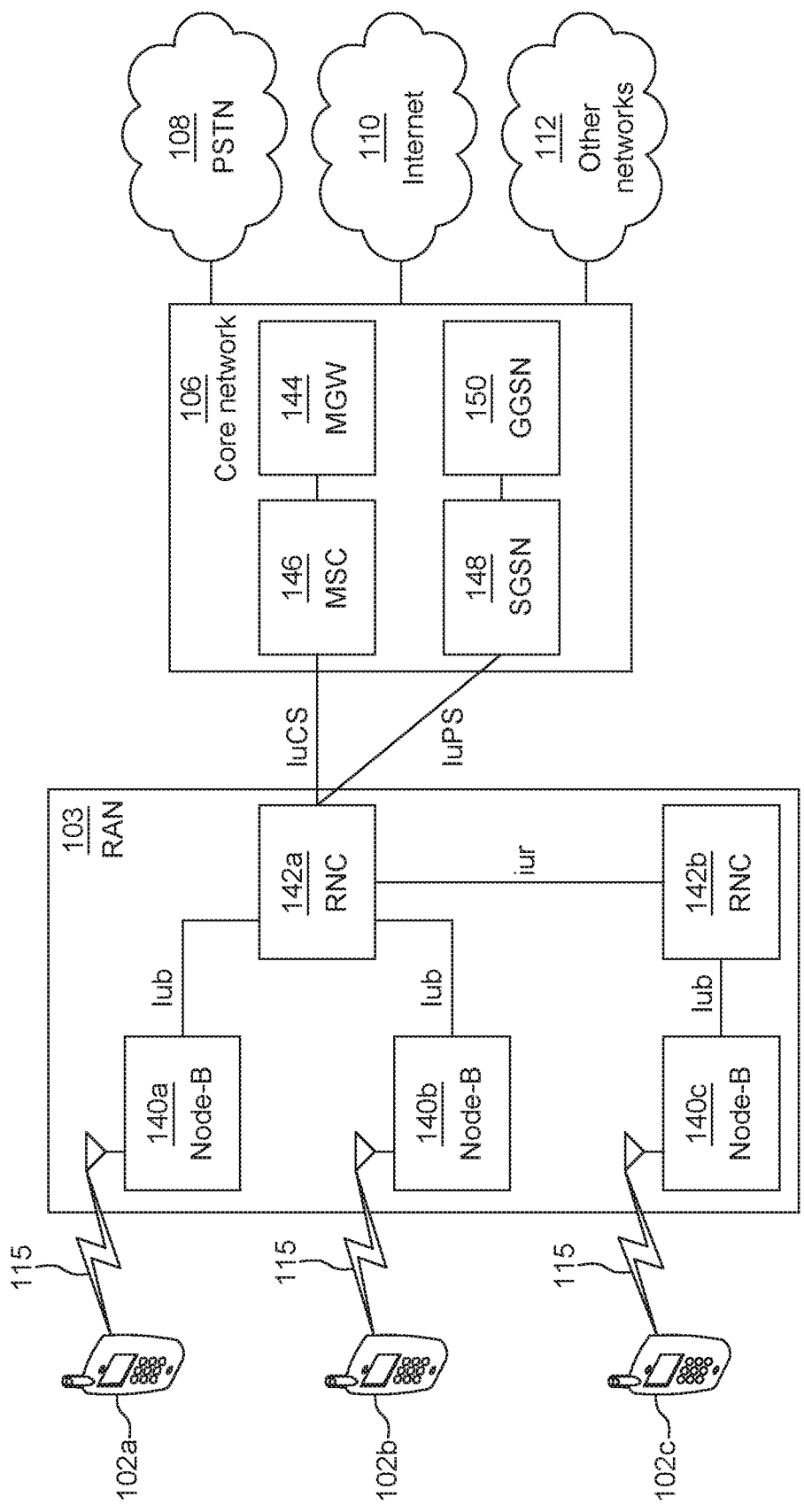
FIG. 1C is a system diagram that shows an example of a Radio Access Network (RAN) architecture and a core network architecture in accordance with an embodiment.

FIG. 1C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the other networks 112, which may include other wired or wireless networks that are owned and/or operated by other service providers.

Figure 1D:
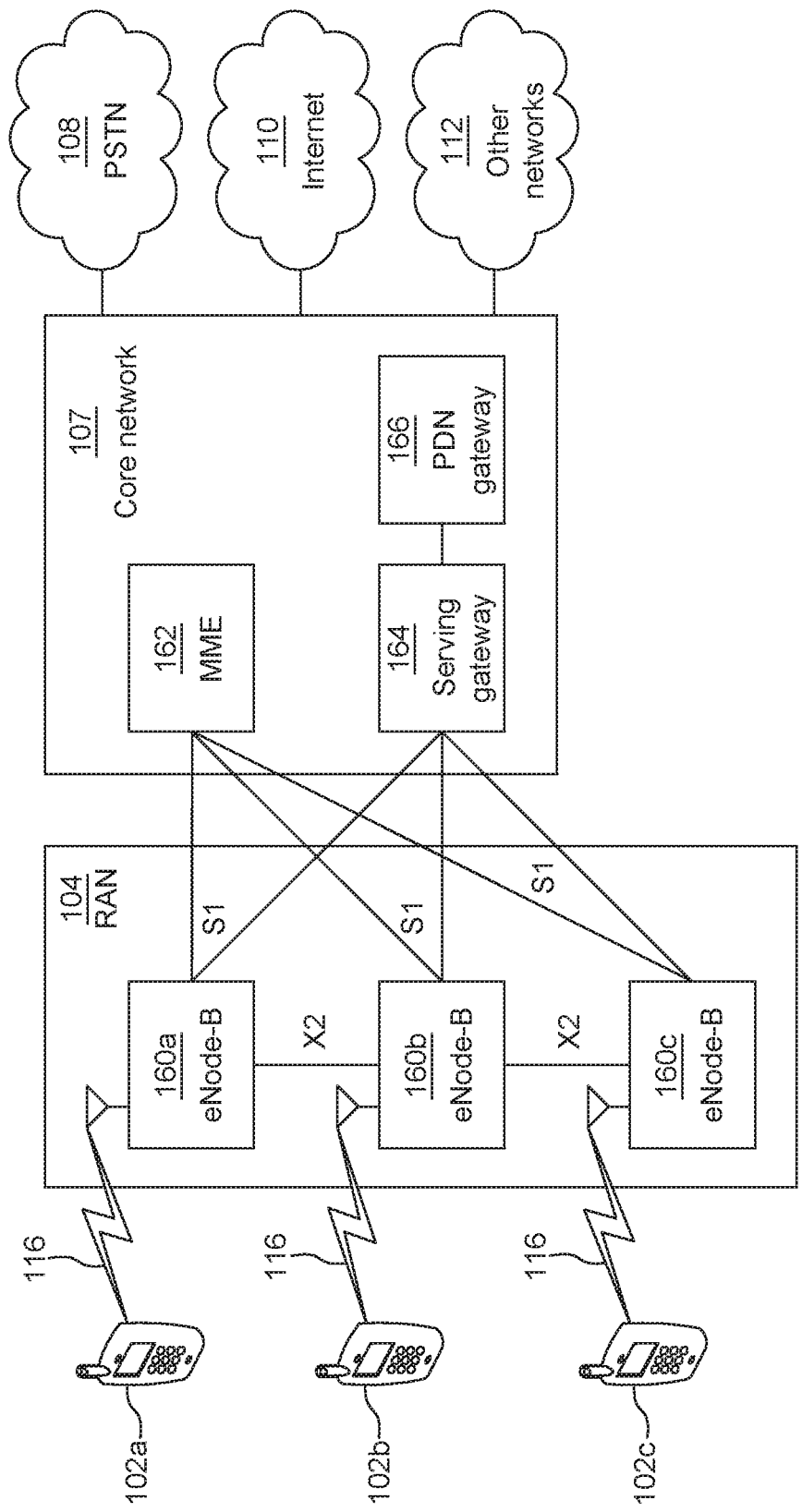
FIG. 1D is a system diagram that shows an example of a Radio Access Network (RAN) architecture and a core network architecture in accordance with another embodiment.

FIG. 1D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
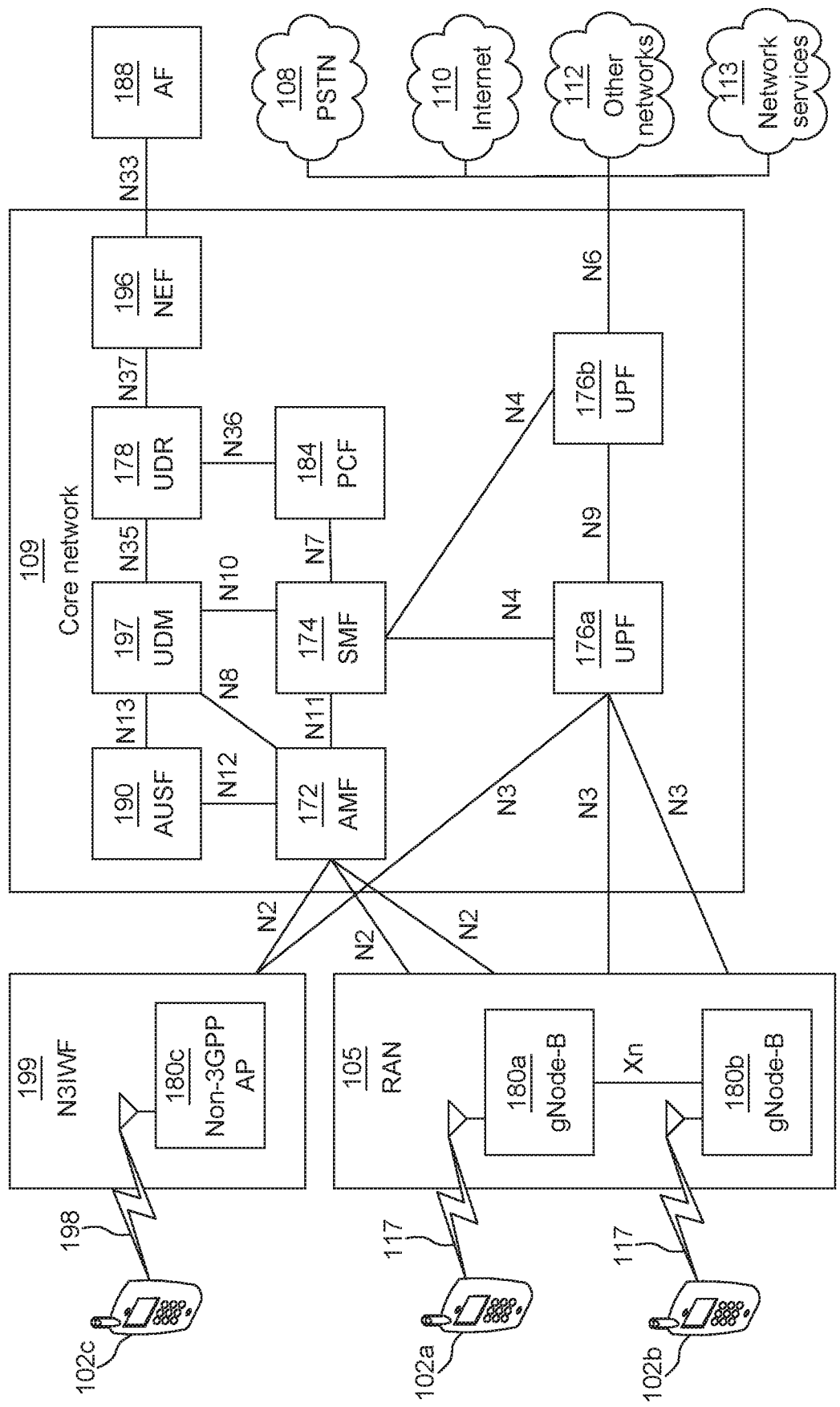
FIG. 1E is a system diagram that shows an example of a Radio Access Network (RAN) architecture and a core network architecture in accordance with another embodiment.

FIG. 1E is a system diagram of the RAN 105 and the core network 109 according to an embodiment. The RAN 105 may employ an NR radio technology to communicate with the WTRUs 102a and 102b over the air interface 117. The RAN 105 may also be in communication with the core network 109. The N3IWF 199 may employ a non-3GPP radio technology to communicate with the WTRU 102c over the air interface 198. The N3IWF 199 may also be in communication with the core network 109.

The RAN 105 may include gNode-Bs 180a and 180b though it will be appreciated that the RAN 105 may include any number of gNode-Bs while remaining consistent with an embodiment. The gNode-Bs 180a and 180b may each include one or more transceivers for communicating with the WTRUs 102a and 102b over the air interface 117. In an embodiment that uses an integrated access and backhaul connection, the same air interface may be used between the WTRUs and gNode-Bs which may be the core network 109 via one or multiple gNBs. In an embodiment, the gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It should also be appreciated the RAN 105 may employ more than one type of base station. For example, the RAN may employ eNode-Bs and gNode-Bs.

The N3IWF 199 may include a non-3GPP Access Point 180c though it will be appreciated that the N3IWF 199 may include any number of non-3GPP Access Points while remaining consistent with an embodiment. The non-3GPP Access Point 180c may include one or more transceivers for communicating with the WTRUs 102c over the air interface 198. In an embodiment, the non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 1E, the gNode-Bs 180a and 180b may communicate with one another over an Xn interface.

The core network 109 shown in FIG. 1E may be a 5G core network (5GC). The 5GC may offer numerous communication services to customers who are interconnected by the radio access network. The 5G Core Network 109 comprises a number of entities that perform the functionality of the core network. As used herein, the term "core network entity" or "network function" refers to any entity that performs one or more functionalities of a core network. It is understood that such core network entities may be logical entities that are implemented in the form of software (i.e., computer-executable instructions) stored in a memory of, and executing on a processor of, an apparatus configured for wireless and/or network communications or a computer system such as those illustrated in FIG. 1F.

As shown in FIG. 1E, the 5G Core Network 109 may include an access and mobility management function (AMF) 172, a session management function (SMF) 174, user plane functions (UPF) 176a and 176b, a user data management function (UDM) 197, an authentication server function (AUSF) 190, a Network Exposure Function (NEF) 196, a policy control function (PCF) 184, a non-3GPP interworking function (N3IWF) 199 an application function (AF) 188, a User Data Repository (UDR) 178. While each of the foregoing elements are depicted as part of the 5G core network 109, it will be appreciated that any one of these elements may be owned and/or operated by an entity other than the core network operator. It should also be appreciated that a 5G core network may not consist of all of these elements, may consist of additional elements, and may consist of multiple instances of each of these elements. FIG. 1E shows that network functions directly connect to one another, however, it should be appreciated that they may communicate via routing agents such as a diameter routing agent or message buses. Although FIG. 1E shows that connectivity between network functions is achieved via a set of interfaces, or reference points, it should be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible for forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, 102c via an N1 interface. The N1 interface is not shown in FIG. 1E.

The SMF 174 may be connected to the AMF 172 via an N11 interface, may be connected to a PCF 184 via an N7 interface, and may be connected to the UPF 176 via an N4 interface. The SMF 174 may serve as a control node. For example, the SMF 174 may be responsible for Session Management, IP address allocation for the WTRUs 102a, 102b, 102c, management and configuration of traffic steering rules in the UPF 176a and UPF 176b, and generation of downlink data notifications to the AMF 172.

The UPF 176a and UPF 176b may provide the WTRUs 102a, 102b, 102c with access to a packet data network (DN), such as the Internet 110, to facilitate communications between the WTRUs 102a, 102b, 102c and other devices. The UPF 176a and UPF 176b may also provide the WTRUs 102a, 102b, 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to other UPFs via an N9 interface. In addition to providing access to packet data networks, the UPF 176 may be responsible for packet routing and forwarding, policy rule enforcement, quality of service handling for user plane traffic, downlink packet buffering.

The AMF 172 may also be connected to the N3IWF 199 via an N2 interface. The N3IWF facilities a connection between the WTRU 102c and the 5G core network 170 via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and connected to an application function (AF) 188 via an N5 interface. The N15 and N5 interfaces are not shown in FIG. 1E. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, 102c so that the AMF may deliver the policies to the WTRUs 102a, 102b, 102c via an N1 interface. Policies may then be enforced, or applied, at the WTRUs 102a, 102b, 102c.

The UDR 178 acts as a repository for authentication credentials and subscription information. The UDR may connect to Network Functions so that Network Function can add to, read from, and modify the data that is in the repository. For example, the UDR 178 may connect to the PCF 184 via an N36 interface, the UDR 178 may connect to the NEF 196 via an N37 interface, and the UDR 178 may connect to the UDM 197 via an N35 interface.

The UDM 197 may serve as an interface between the UDR 178 and other Network Functions. The UDM 197 may authorize Network Functions access of the UDR 178. For example, the UDM 197 may connect to the AMF 172 via an N8 interface, the UDM 197 may connect to the SMF 174 via an N10 interface, and the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions 188. Exposure occurs on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements. e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of Network Slicing techniques, it is likely that the network architecture would not be flexible and scalable enough to efficiently support a wider range of use cases need when each use case has its own specific set of performance, scalability and availability requirements. Furthermore, introduction of new network services should be made more efficient.

In a network slicing scenario, a WTRU 102a, 102b, 102c may connect to an AMF 172, via an N1 interface. The AMF may be logically part of one or more slices. The AMF may coordinate the WTRU's connection or communication with one or more UPF(s) 176, SMF(s) 174, and other Network Functions. Each of the UPF(s) 176, SMF(s) 174, and other Network Functions may be part of different or the same slices. When they are part of different slices, they may be isolated from each other in the sense that they may utilize different computing resources, security credentials, etc.

The 5G core network 109 may facilitate communications with other networks. For example, the 5G core network 109 may include, or may communicate with, an IP gateway (e.g., an IP multimedia subsystem (IMS) server) that serves as an interface between the 5G core network 109 and the PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, 102c and servers or applications functions 188. In addition, the core network 170 may provide the WTRUs 102a, 102b, 102c with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1F:
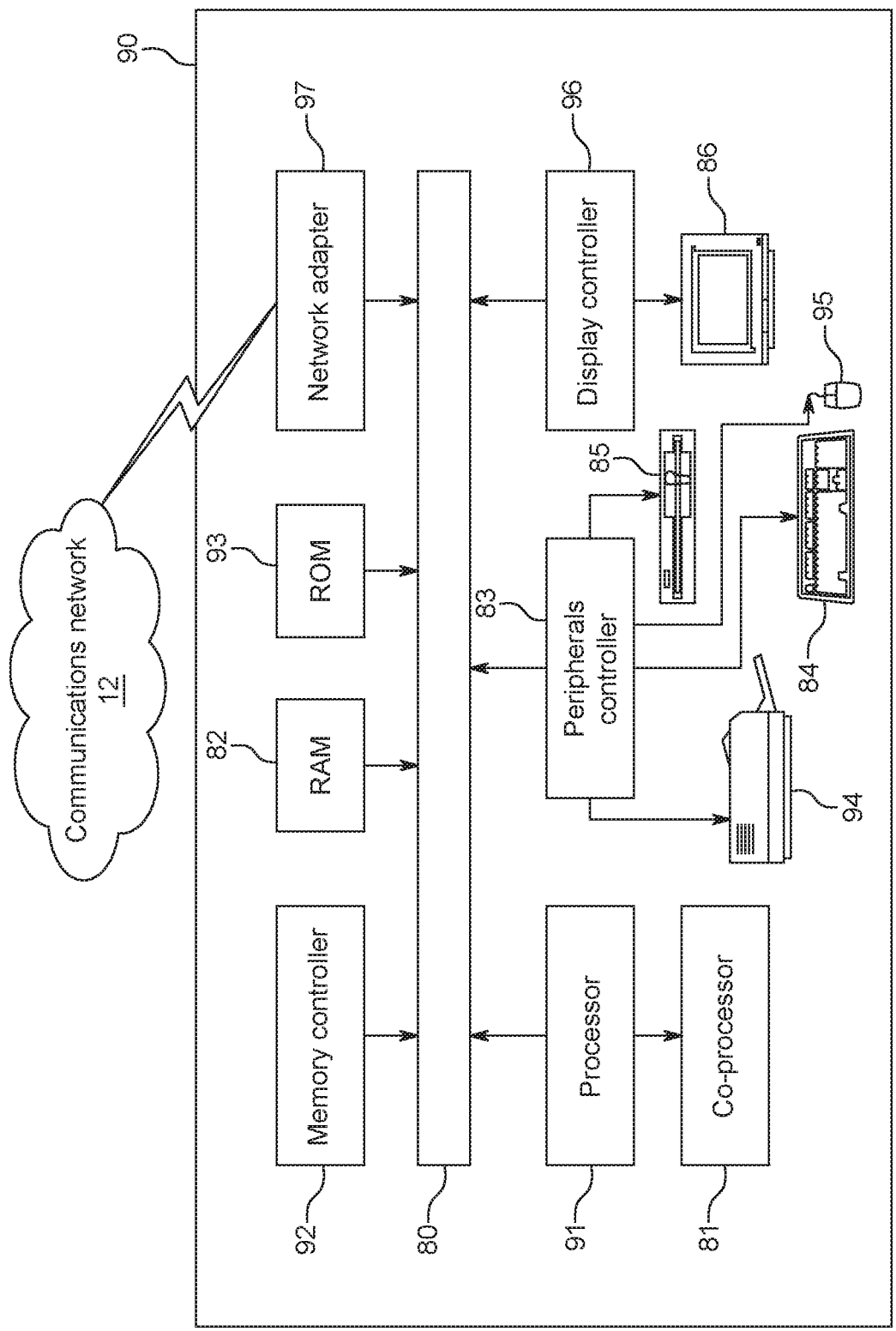
FIG. 1F is a system diagram that shows an example of a computing system used in a communication network illustrated in FIGS. 1A, 1, 1D, and 1E.

FIG. 1F is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108. Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example, a wireless or wired network adapter 97, that may be used to connect computing system 90 to an external communications network or devices, such as the RAN 103/104/105, Core Network 106/107/109, PSTN 108, Internet 110. WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 1G:
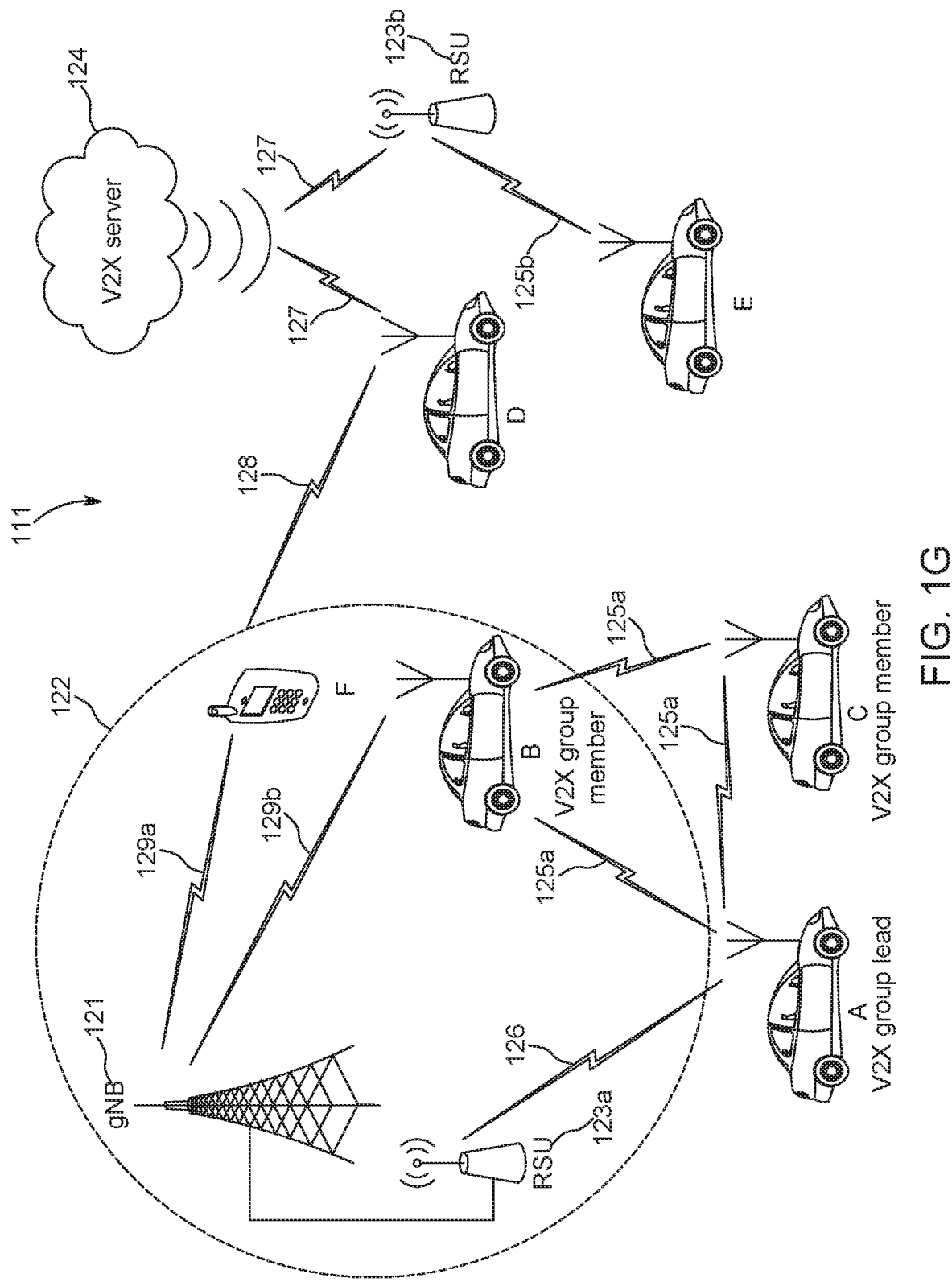
FIG. 1G is a system diagram that shows another example of wireless communication system.

FIG. 1G illustrates one embodiment of an example communications system 111 in which the methods and apparatuses described and claimed herein may be embodied. As shown, the example communications system 111 may include wireless transmit/receive units (WTRUs) A, B, C, D, E, F, a base station gNB 121, a V2X server 124, and RSU 123a and RSU 123b, though it will be appreciated that the disclosed embodiments contemplate any number of WTRUs, base station gNBs, V2X networks, and/or network elements. One or several or all WTRUs A, B, C, D, E may be out of range of the access network coverage 122. WTRUs A, B, C form a V2X group, among which WTRU A is the group lead and WTRU B and WTRU C are group members. WTRUs A, B, C, D, E, F may communicate among them over Uu interface 129a/129b if under the access network coverage or sidelink (PC5 or NR PC5) interface 125a if under or out of the access network coverage. WTRUs A, B, C, D, E, F may communicate to a RSU via a Vehicle-to-Network (V2N) interface 126 or sidelink interface 125b. WTRUs A, B, C, D, E, F may communicate to a V2X Server 124 via a Vehicle-to-Infrastructure (V2I) interface 127. WTRUs A, B, C, D, E, F may communicate to another UE via a Vehicle-to-Person (V2P) interface 128.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM. ROM. EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

Beam Failure Detection Management Overview

As recognized by the present inventors. A UE configured with many cells may experience the situation that a large percentage of the configured cells are simultaneously activated. If those activated cells are configured for BFD, the UE may have to perform BFD on a large number of cells and handle a large number of beam failure detection RS, which may exceed the UE capability for beam failure detection.

If BFD/NBI/BFR (also called link recovery) procedures are supported on SCells, in addition to SpCells, they could potentially be performed on any activated cell. The most complex and power consuming part of BFD/NBI/BFR is BFD since it is performed continuously, whereas NBI/BFR may be performed only in the event of beam failure. For a large number of activated cells, simultaneous BFD on each or most of the cells, e.g. up to 32 cells, may be excessively complex and power consuming. To this end, a BFD-related UE capability management approach is described, which apportions available UE capability of simultaneous BFD across cells and/or BWPs and/or reference signals.

With a UE capability for BFD significantly lower than the UE capability required to support the number of simultaneously activated cells gives rise to a need to manage the set of cells (and/or BWPs and/or reference signals) on which the UE actually performs BFD. This present disclosure addresses this problem and provides various approaches for managing the BFD-based demands placed on a UE with limited capability.

If a "dormant" cell state (for a UE) is introduced, with properties somewhere between the already existing deactivated and activated states, the result may be even more frequent cell state transitions. Such a development would provide further motivation to be able to more dynamically manage the set of cells (and/or BWPs and/or references signals) on which the UE performs BFD.

The present disclosure describes solutions for managing beam failure detection across cells, BWPs and RS, such that the UE capability is not exceeded. Generally, two main classes of solutions are described: solutions based on network indication and solutions based on UE selection.

Definitions

Configured Cell

In various embodiments, a UE can be configured with one or more "configured cells", e.g. PCell. PSCell(s) and/or SCell(s). The configuration(s) may be received using RRC signaling, e.g. during initial access, handover or cell (e.g. SCell) addition/release. In various embodiments, a configured cell is a serving cell.

Different UEs may have different sets of configured cells. A UE's set of configured cells may change with time, e.g. by RRC reconfiguration including cell (e.g. SCell) addition/release. Below, the term configured cell is sometimes denoted just "cell" for brevity.

Dormant and Other Cell States

A configured cell of a UE may be in one of multiple states, e.g. activated, deactivated, dormant. Some cells, e.g. PCell and PSCell, may be in only one state, e.g. activated state. A cell state may be UE specific, i.e. a cell's state may simultaneously be different for different UEs. e.g. a cell is in activated state for a first UE and the same cell is simultaneously in deactivated state for a second UE.

In various embodiments, an activated cell state is defined as follows: the UE applies normal operation on an activated cell (a cell in activated state), such as transmitting any configured SRS, PUCCH, monitoring PDCCH, measuring CSI and/or reporting CSI etc.

In various embodiments, a deactivated cell state is defined as follows: the UE does not apply normal operation on a deactivated cell (a cell in deactivated state). E.g. it does not transmit configured SRS, PUCCH, does not monitor PDCCH, does not measure and/or reports CSI etc.

In various embodiments, a dormant cell state is defined as follows: the UE may apply a subset of normal operation on a dormant cell. Further exemplary embodiments of a dormant cell state are given below.

In some embodiments, a UE transmits configured SRS on a dormant cell and in some embodiments the UE does not transmit configured SRS on a dormant cell. In some embodiments, a UE transmits configured PUCCH on a dormant cell and in some embodiments the UE doesn't transmit configured PUCCH on a dormant cell. In some embodiments, a UE monitors PDCCH on a dormant cell. In some embodiments, a UE does not monitor PDCCH on a dormant cell. In some embodiments, a UE measures and/or reports CSI on a dormant cell. In some embodiments, a UE does not measure and/or reports CSI on a dormant cell. In some embodiments, a UE measures CSI on a dormant cell but reports CSI on another cell, e.g. the PCell or PSCell.

Various further embodiments of dormant cells are given below.

For a cell in dormant state the UE
 transmits any configured SRS,
 transmits any configured PUCCH,
 does not monitor any configured PDCCH and
 measures and reports any configured CSI.
For a cell in dormant state the UE
 transmits any configured SRS,
 does not transmit any configured PUCCH,
 does not monitor any configured PDCCH and
 measures and reports (e.g. on another cell) any configured CSI
For a cell in dormant state the UE
 does not transmit any configured SRS,
 does not transmit any configured PUCCH.
 does not monitor any configured PDCCH and
 measures and reports (e.g. on another cell) any configured CSI In various embodiments, other combinations are used.

In various embodiments, a UE does not monitor any configured PDCCH (e.g. a configured CORESET, associated search space, RNTI, etc.) on a dormant cell, except such PDCCH that is used to indicate cell state switch from the dormant state, e.g. to an activated state. In various embodiments, such a state-switch triggering PDCCH is received on the dormant cell itself. In various embodiments, such a state-switch triggering PDCCH is received on another cell, e.g. the PCell or PSCell. Such a state-switch triggering PDCCH could be associated with particular CORESET(s), search space set(s), search space(s), RNTI(s), DCI format(s) and/or aggregation level(s). These aspects could be configured and/or predefined.

In various embodiments, a UE performs BFD, NBI, BFR (if configured) on a dormant cell. For example, if a UE performs BFD on an activated cell that then switches to dormant state, the UE continues to perform BFD on the dormant cell, at least if the BWP(s) were not changed. Note that BFR may comprise BFRQ transmission and/or BFRR reception, in various embodiments.

In various embodiments, a UE does not perform BFD, NBI, BFR (if configured) on a dormant cell. For example, if a UE performs BFD on an activated cell that then switches to dormant state, the UE stops performing BFD on the dormant cell. If the cell state is subsequently switched back to activated, the UE resumes BFD, at least if the BWP(s) were not changed since the last time the cell state was activated. In various embodiments, a UE performs BFD and NBI on a dormant cell, but BFRQ transmission and BFRR reception on another cell, e.g. an SpCell. In various embodiments, a UE performs BFD and NBI on a dormant cell. BFRQ transmission on another cell. e.g. an SpCell, and BFRR reception on the dormant cell. In various embodiments, the dormant cell transitions to an activated state in connection with a BFR procedure. e.g. at beam failure or following BFRQ transmission, e.g. on another cell. Hence, in some cases, beam failure on a cell that is in dormant state is followed by BFRR reception on the same cell, but in an activated state. In other words, the cell state has changed during the procedure between BFD and BFRR.

In various embodiments, a dormant state of a cell is associated with an RRC configuration for the cell that is fully or partly separate from the RRC configuration the UE applies to the cell when the cell state is activated. For example, a UE is configured with a serving cell RRC configuration that it applies when the cell is in an activated cell state and another (e.g. partial) serving cell RRC configuration that it applies when the cell is in a dormant cell state. In some embodiments, the UE switches between RRC serving cell configurations (or parts thereof) when the state of a cell is switched between activated and dormant. In some embodiments, a dormant cell state is associated with a separate DL and/or UL BWP configuration, e.g. a list of DL BWP configurations for dormant state separate from the list for activated state and a list of UL BWP configurations for dormant state separate from the list for activated state. In some embodiments, one or more BWP configurations in the list of BWP configurations for activated state are dedicated to dormant state. In some embodiments, one or more BWP configurations in the list of BWP configurations for activated state are also used in dormant state. In some embodiments, the BWP used for dormant state is the default BWP used in activated state or the BWP with BWP-Id equal to a configured dormant-BWP-id, which may be a parameter in a serving cell RRC configuration. In one example, a switch to dormant state implies a switch to dormant BWP(s). In various embodiments, a BWP, e.g. DL BWP, can be in a dormant state, in addition to active and inactive state. The definition of a dormant BWP state follows the descriptions of dormant cells state above (but applied to a BWP instead of a cell), in various embodiments.

In various embodiments, a BWP used in dormant state is configured without CORESETs and/or search spaces, which may result in that the UE does not need to perform PDCCH monitoring on the BWP.

In various embodiments, there are at least partly separate UE requirements, e.g. on CSI measurement accuracy, beam failure detection etc., for cells in dormant state.

Advantages of a dormant cell state compared to an activated cell state include that the UE power consumption may be lower, since a subset of normal operations are performed. Advantages of a dormant cell state compared to a deactivated cell state include that a transition time to normal operation in activated cell state may be shorter from a dormant state than from a deactivated state.

In various embodiments, a UE maintains the RRC configuration for a cell across state switches. In various embodiments, a cell state switch can be triggered by MAC CE and/or L1 signaling, e.g. DCI, where the trigger is sent either on the dormant cell (e.g. from activated to dormant) or on another cell such as PCell or PSCell (e.g. from dormant to activated). In some embodiments, the network triggers a cell state switch to/from dormant state. In some embodiments, the UE triggers a cell state switch to/from dormant state. For example, the BFRQ transmission, e.g. on the dormant cell or another cell such as an SpCell, can trigger a cell state switch from dormant to activated.

ON and OFF Cell States and/or BWP States

In various embodiments, BFD, NBI. BFR and/or link recovery is supported in one or more cell states of a configured cell, for instance in activated state. A cell is defined to be in an "ON" state if it is a cell state in which BFD, NBI and/or BFR is supported, in various embodiments. In some embodiments, a cell is defined to be in an "ON" cell state if it is a cell state in which BFD is supported. In some embodiments, a cell is defined to be in an "ON" cell state if it is a cell state in which BFD and NBI are supported. In some embodiments, a cell is defined to be in an "ON" cell state if it is a cell state in which BFD, NBI and BFRR reception are supported. In some embodiments, a cell is defined to be in an "ON" cell state if it is a cell state in which link recovery is supported.

In various embodiments, BFD, NBI, BFR and/or link recovery is supported in one or more BWP states, for instance active or dormant BWP state. A BWP is defined to be in an "ON" BWP state if it is a BWP state in which BFD, NBI and/or BFR is supported, in various embodiments. In some embodiments, a BWP is defined to be in an "ON" BWP state if it is a BWP state in which BFD is supported. In some embodiments, a BWP is defined to be in an "ON" BWP state if it is a BWP state in which link recovery is supported.

In various embodiments, the operation(s) that a UE applies on a configured cell in an ON cell state includes BFD, NBI and/or BFR, if such operations are configured, e.g. by RRC.

A UE functionality (e.g. BFD, NBI, BFR and/or link recovery) being "supported in a particular cell state" (e.g. activated, deactivated) means that a UE may be expected to perform the functionality on a cell that is in the particular cell state, in various embodiments. In various examples, if the functionality needs to be configured and/or activated by the network, the UE is expected to perform the functionality on the cell if it's configured and/or activated by the network. In some cases, e.g. with optional UE features (a UE feature may comprise one or more UE functionalities), only UEs that support the corresponding feature (and thereby the functionality) are expected to perform the functionality, even if the functionality is supported in the cell state. In other words, a UE functionality being supported in a particular cell state does not depend on any particular UEs capability to support the functionality. Instead, the UE functionality being supported in a cell state means that the communication standard or protocol provides support for the functionality on a cell in the cell state, at least for some configurations and for some UEs.

Considering how "supported" is generically defined herein, BFD being supported in a particular cell state may mean that the communication standard supports configuration and/or activation into the UE, of BFD for a cell in the particular cell state. This may imply assessing (monitoring) one or more downlink link qualities based on one or more BFD-RS in order to detect beam failure instance(s). The link quality assessment may involve estimating a BLER of a hypothetical PDCCH transmission and comparison against one or more threshold(s). In one example, BFD is supported on cells in an activated state but not on cells in a deactivated state. Note that BFD being supported in the state of a particular cell does not mean that BFD, NBI and/or BFR is performed on the cell. BFD, NBI and/or BFR may just be configured into the UE for the particular cell but not activated, or maybe not even configured.

Considering how "supported" is generically defined herein, NBI being supported in a particular cell state may mean that the communication standard supports configuration and/or activation into the UE, of NBI for a cell in the particular cell state. This may imply assessing (monitoring) one or more downlink link qualities (e.g. measuring RSRP) based on one or more candidate RS in order to select a candidate beam which is associated with a candidate RS. In one example, NBI is supported on cells in an activated state but not on cells in a deactivated state. Note that NBI being supported in the state of a particular cell does not mean that BFD, NBI and/or BFR is performed on the cell. BFD, NBI and/or BFR may just be configured into the UE for the particular cell but not activated, or maybe not even configured.

Considering how "supported" is generically defined herein, BFR being supported in a particular cell state may mean that the communication standard supports configuration and/or activation into the UE, of BFR for a cell in the particular cell state. This may imply the UE transmitting a beam failure recovery request (BFRR) indicating the selected candidate beam. It may also imply that the UE receives a beam failure recovery response from the network, confirming the reception of the BFRR and the switch to the selected candidate beam. In one example, BFR is supported on cells in an activated state but not on cells in a deactivated state. Note that BFR being supported in the state of a particular cell does not mean that BFD, NBI and/or BFR is performed on the cell. BFD, NBI and/or BFR may just be configured into the UE for the particular cell but not activated, or maybe not even configured.

A configured cell that is not in an ON cell state is in an OFF cell state.

In one example, a configured cell can be in one of two cell states for a UE, e.g.
   activated cell state: ON cell state since BFD is supported in the cell state.
      In one example, NBI and BFR are supported in the cell state.
      In one example, NBI but not BFR is supported in the cell state.
      In one example, NBI and BFRR but not BFRQ is supported in the cell state.
   deactivated cell state: OFF cell state since BFD is not supported in the cell state.
      In one example, NBI and BFR are not supported in the cell state.
      In one example, BFR but not NBI is supported in the cell state.
      In one example, BFRQ but not NBI or BFRR is supported in the cell state.

In this example, ON cell state is equivalent to activated cell state and OFF cell state is equivalent to deactivated cell state. In one example, BFD is supported in activated cell state but not in deactivated cell state, which means that activated cell state is an ON cell state whereas deactivated cell state is an OFF cell state.

In another example, a configured cell can be in one of three cell states for a UE, e.g.
   activated cell state: ON cell state since BFD is supported in the cell state.
      In one example, NBI and BFR are supported in the cell state.
      In one example, NBI but not BFR is supported in the cell state.
      In one example, NBI and BFRR but not BFRQ is supported in the cell state.
   dormant state: ON cell state since BFD is supported in the cell state.
      In one example, NBI and BFR are supported in the cell state.
      In one example, NBI but not BFR is supported in the cell state.
      In one example, NBI and BFR are not supported in the cell state.
      In one example, BFR but not NBI is supported in the cell state.
      In one example, NBI and BFRR but not BFRQ is supported in the cell state.
   deactivated cell state: OFF cell state since BFD is not supported in the cell state.
      In one example, NBI and BFR are not supported in the cell state.
      In one example, BFR but not NBI is supported in the cell state.
      In one example, BFRQ but not NBI or BFRR is supported in the cell state.

In this example, ON cell state is equivalent to activated cell state or dormant cell state and OFF cell state is equivalent to deactivated cell state. In one example, BFD is supported in activated cell state and dormant cell state but not in deactivated cell state, which means that activated cell state and dormant cell state are ON cell states whereas deactivated cell state is an OFF cell state.

Another example with three cell states is as follows
   activated cell state: ON cell state since BFD is supported in the cell state.
      In one example, NBI and BFR are supported in the cell state.
      In one example, NBI but not BFR is supported in the cell state.
      In one example, NBI and BFRR but not BFRQ is supported in the cell state.
   dormant state: OFF cell state since BFD is not supported in the cell state.
      In one example, NBI and BFR are supported in the cell state.
      In one example, NBI but not BFR is supported in the cell state.

In one example, NBI and BFR are not supported in the cell state.

In one example, BFR but not NBI is supported in the cell state.

In one example, NBI and BFRR but not BFRQ is supported in the cell state.

deactivated cell state: OFF cell state since BFD is not supported in the cell state.

In one example, NBI and BFR are not supported in the cell state.

In one example, BFR but not NBI is supported in the cell state.

In one example, BFRQ but not NBI or BFRR is supported in the cell state.

In this example, ON cell state is equivalent to activated cell state and OFF cell state is equivalent to deactivated cell state or dormant cell state. In one example, BFD is supported in activated cell state but not in deactivated cell state or dormant cell state, which means that activated cell state is an ON cell state whereas deactivated cell state and dormant cell state are OFF cell states.

In some embodiments, the set of BFD/BFR-related operations, such as those listed above, supported in different cell states depends on the cell type, e.g. SpCell and SCell. In some embodiments, some configured cells are always ON for a UE, for example, an SpCell.

Configured cells in ON or OFF cell states are also denoted "ON cells" or "OFF cells" below for brevity.

In various embodiments, the concepts of an ON cell and OFF cell refers to the state(s) of BWP(s) of the cell, where a (DL and/or UL) BWP ON/OFF BWP state may follow various embodiments for cell state above. For example, a BWP may have three potential BWP states, e.g. active BWP state (ON BWP state), inactive BWP state (OFF BWP state) and dormant BWP state (ON or OFF in various embodiments). For example, a cell is ON if the active DL BWP is ON. In another example, a cell is ON if the active DL BWP and active UL BWP are ON. Note that the set of possible states may differ between DL BWPs and UL BWPs.

Various embodiments throughout this disclosure apply to cells and/or BWPs. For brevity, "cell(s) and/or BWP(s)" is sometimes written "cell(s)/BWP(s)".

BFD-Cell

In various embodiments, a "BFD-cell" for a UE is a configured cell on which the UE performs BFD.

In various embodiments, only cells in ON state may be BFD-cells. In some embodiments, the set of BFD-cells for a UE is a subset of the ON cells. In some embodiments, the set of BFD-cells is equal to the set of ON cells.

In some embodiments, a "BFD-cell" is a configured cell for which a UE can perform NBI and/or BFR if beam failure is detected on the cell. Note that the NBI and/or BFR may be partly or completely performed on the BFD-cell or other cell(s) than the BFD-cell, i.e. the cell on which the corresponding beam failure was detected, in various embodiments.

In various embodiments, the term "link recovery" may refer to, or be equivalent to, BFD, NBI, BFR, BFD+NBI, BFD+BFR, NBI+BFR and/or BFD+NBI+BFR, or parts thereof. For example, enabling/disabling and/or activating/deactivating BFD on a cell/BWP may be equivalent to enabling/disabling and/or activating/deactivating "link recovery" on a cell/BWP, since in some cases BFD is a necessary first step in a link recovery procedure. The terminology "BFD-cell" therefore may refer to a cell on which the UE performs link recovery, BFD, NBI, BFR, BFD+NBI, BFD+BFR, NBI+BFR and/or BFD+NBI+BFR, or parts thereof, in various embodiments. In some embodiments, a cell is not a BFD-cell only if the UE is not expected to perform link recovery, BFD, NBI or BFR on the cell.

In various embodiments, a BFD-BWP for a UE is a BWP, e.g. an active DL BWP, on which the UE performs BFD. In various embodiments. e.g. such embodiments in which at most one DL BWP and/or at most one UL BWP are simultaneously active in a cell, the cell is a BFD-cell if and only if an active DL BWP of the cell is a BFD-BWP. For example, if and only if the active DL BWP of a cell is a BFD-BWP, then the cell is a BFD-cell. A cell, e.g. an SCell, may have an active DL BWP but no active UL BWP (for instance no UL BWP is configured for the cell such as in a DL-only SCell).

The terminology "BFD BWP" may refer to a BWP on which the UE performs link recovery, BFD, NBI, BFR, BFD+NBI, BFD+BFR, NBI+BFR and/or BFD+NBI+BFR, or parts thereof, in various embodiments. In some embodiments, a BWP is not a BFD BWP only if the UE is not expected to perform link recovery, BFD, NBI or BFR on the BWP.

Figure 2:
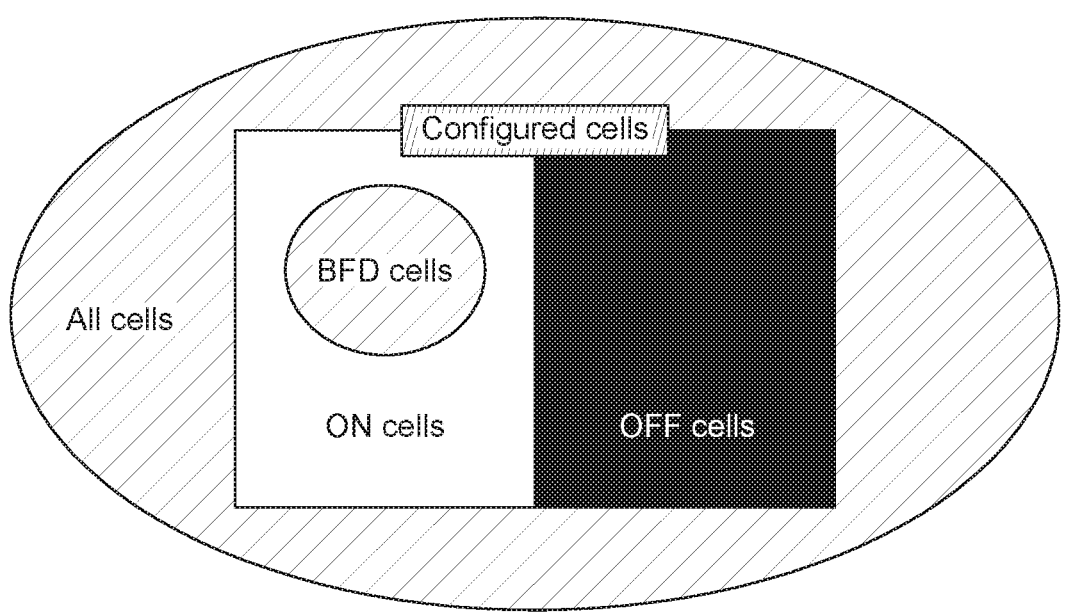
FIG. 2 is a Venn diagram that illustrates relationships between cells that have been configured to operate in differing states.

FIG. 2 is a Venn diagram of various sets of cells, which are viewed from the perspective of a UE. A set of all cells may include all cells detected by a UE and/or all cells otherwise indicated/configured to a UE. A set of configured cells is a subset of all cells, which has been configured by the network, e.g. through RRC signaling for instance configured SpCell(s) and SCell(s). The set of configured cells has two subsets, ON cells and OFF cells. The OFF cells are in an OFF state, whereas the ON cells are in an ON state. The set of BFD cells is a subset of the ON cells.

ON and OFF BFD-RS

A BFD-RS is a reference signal that a UE may use for BFD, in various embodiments. A BFD-RS may be a CSI-RS, an SSB (e.g. PSS, SSS, PBCH and/or PBCH-DMRS), an SRS, a DMRS and/or other signal(s). In various embodiments, BFD-RS are of different types. In some embodiments, there are two BFD-RS types, where the first BFD-RS type is periodic CSI-RS and the second BFD-RS type is SSB.

A UE may be configured with one or more BFD-RS in a configured cell, in various embodiments. Zero or more BFD-RS may be configured per BWP in some embodiments. In some embodiments, the BFD-RS are explicitly configured, e.g. by an explicit indication of a choice of a type of RS, e.g. CSI-RS or SSB, and a corresponding RS index. In some embodiments, the BFD-RS are implicitly configured, e.g. as the RS(s) configured to be QCLed (e.g. QCL Type D as in [38.214]) with the monitored CORESETs in an active BWP, e.g. through an activated TCI state. In various embodiments, a combination of explicit and implicit BFD-RS configuration is used. In various embodiments, the BFD-RS in a cell/BWP is configured by RRC, MAC and/or DCI signaling, or a combination thereof. For example, a first set of RS, are configured for a BWP with RRC signaling. In some embodiments, the set of BFD-RS is selected from the first set of RS by MAC signaling, e.g. with a MAC CE. In some embodiments, a second set of RS is selected from the first set with MAC signaling, e.g. with a MAC CE. In some embodiments, the set of BFD-RS is selected from the first set of RS by L1 signaling. e.g. a DCI. In some embodiments, the set of BFD-RS is selected from the second set of RS by L1 signaling, e.g. a DCI.

In some embodiments, implicit configuration of BFD-RS is only applied in SpCells. For example, if BFD-RS is not configured in an SCell (or BWPs thereof) it means that BFD is not enabled on the SCell (of BWP thereof).

A BWP may be a DL BWP and/or an UL BWP in various embodiments.

An "ON BFD-RS" for a UE is a configured BFD-RS that the UE monitors for beam failure, in various embodiments, e.g. the UE performs measurements on the ON BFD-RS (and potentially other resources and/or signals) and evaluates if the corresponding link quality is below a threshold. If all ON BFD-RS for a cell/BWP are below a threshold, L1 indicates beam failure to higher layers, e.g. MAC, in various embodiments. In various embodiments, the UE performs the measurement and/or evaluation according to a certain periodicity, which may be pre-defined, configured, and/or derived from other parameters.

A configured BFD-RS that is not ON is an "OFF BFD-RS", i.e. the UE does not monitor it for beam failure.

In some embodiments, all BFD-RS configured for an active BWP in a BFD-cell are ON BFD-RS. In some embodiments, a subset of the BFD-RS configured for an active BWP in a BFD-cell are ON BFD-RS, i.e. some BFD-RS configured for an active DL BWP in a BFD-cell may be OFF.

In various embodiments, configured BFD-RS in non-active BWPs are OFF BFD-RS.

In various embodiments, a cell with at least one ON BFD-RS is a BFD-cell. In various embodiments, a BWP with at least one ON BFD-RS is a BFD BWP.

Various Mechanisms for Cell/BWP State Change

A configured cell and/or BWP for a UE may be in one of one or more potential states, such as activated, deactivated, dormant states, in various embodiments. The state of a cell/BWP may change with time. Various examples of mechanisms are:

RRC configuration, e.g. cell/BWP addition, release, modification.
  E.g. a cell/BWP state is changed if the cell/BWP index is included in a list of cells/BWPs to release and/or a list of cells/BWPs to add and/or modify.

MAC CE based cell/BWP state change (e.g. MAC CE in PDSCH)
  E.g. a cell/BWP state is changed according to one or more bits corresponding to the cell/BWP, e.g. in a bitmap, sequence or list in which the association between bit/item and cell/BWP would be pre-defined or configured in advance, e.g. with RRC signaling. For example, a particular value of the one or more bit(s) could correspond to a particular cell/BWP state and/or a particular change of cell/BWP state (e.g. different values could correspond to toggling, no state change, etc.).
  In some examples, an explicit cell/BWP index would be included in the MAC CE. In some examples, the presence or absence of a cell/BWP index in the MAC CE would indicate the cell/BWP state change, e.g. no change, state toggle, or state change from one to the next according to a predefined state transition diagram.

DCI based cell/BWP state change (e.g. DCI in PDCCH).
  In some embodiments, the DCI indicates a cell/BWP state transition for the cell/BWP on which the DCI is received.
  In some embodiments, the DCI indicates a cell/BWP state transition for another cell/BWP than the cell/BWP on which the DCI is received, e.g. on another frequency carrier. In one example this can be achieved by indicating the cell using a carrier indicator in the DCI, e.g. if the UE is configured with cross-carrier scheduling.
  In some embodiments, an indication of the state to which the cell/BWP should change is included in the DCI. In some embodiments, state toggling or state transition according to a state transition diagram is explicitly or implicitly indicated in the DCI.
  In various embodiments, the transition to/from dormant state can be triggered by a DCI.

Timer based cell/BWP state change. A cell/BWP state is changed at the expiry of a timer, for example, an inactivity timer which expires if there is no activity for the UE on the cell/BWP (e.g. control and/or data transmission/reception) until the timer expiry.

If a UE with a dormant state SCell has data to transmit an sends a scheduling request on a cell, e.g. PCell or PSCell, this may trigger the activation of the dormant cell. e.g. in anticipation of receiving the subsequent UL grant on the cell that is dormant. Which dormant cell(s), e.g. SCell(s), to activate in such a situation may configured in the RRC configuration.

The number of cells. e.g. SCells, kept in dormant state may be related to or based on the data buffer status in the UE, e.g. related to the UE buffer status report (BSR). Little or no data in the buffer may trigger switching more cells into dormant state. More data in the buffer may trigger switching more cells into an activated state, so that the data can be communicated rapidly.

The status of the SpCell may trigger state switching. e.g. to/from dormant, of SCells in the same cell group. For example, if the SpCell active BWP (e.g. DL and/or UL BWP) is switched to a default BWP, this may trigger one or more SCells in activated state to switch to dormant state.

In some cases, the dormant cell state can be reached only from the activated state. In some cases, the dormant state can be reached from both the activated and the deactivated states. In various embodiments, a dormant state is a sub-state of the activated state, where another sub-state may be non-dormant activated (e.g. "fully activated"). In various embodiments, a cell maintains its activated sub-state when it is deactivated and subsequently activated. For example, if a cell is in dormant (an activated sub-state) and a deactivation MAC CE is received, the cell switches to deactivated state. If a cell activation MAC CE is subsequently received, the cell switches back to dormant. i.e. the sub-state before deactivation. Similarly, if the cell was non-dormant activated before switching to deactivated, the cell may return to non-dormant activated after subsequent activation, in various embodiments. In various embodiments, a dormant state is a sub-state of the deactivated state. Similarly, such a sub-state of the deactivated state may be maintained after activation and subsequent deactivation, e.g. by MAC CE.

UE Capability for BFD

A particular network configuration creates a BFD processing demand (or simply "demand") on a UE and an ability to meet that demand, as characterized by UE capability, relates to UE complexity, processing capability, and power consumption, since it involves RS tracking and measurement and periodic beam failure metric computation etc. Consequently, the amount of simultaneous BFD performed by a UE across the configured cells may have to be limited according to the capability of the UE.

In various embodiments, one or more UE capability/capabilities is reported by the UE to the network (e.g., a base station, such as gNB). While the term UE capability is used herein to describe information that is transmitted to the network regarding performance attributes of the UE, it should be understood that UE capability includes various parameters. Example, optional, parameters include processing capacity/reserve for handing BFD processing, and battery power. Such one or more capability/capabilities may be formulated/characterized in various ways, for instance one or more of the following UE capability parameters:

A maximum number of simultaneous BFD-BWPs,
A maximum number of simultaneous ON BFD-RS of a first type (e.g. periodic CSI-RS),
A maximum number of simultaneous ON BFD-RS of a second type (e.g. SSB),
A maximum number of simultaneous ON BFD-RS (e.g. the sum of simultaneous ON BFD-RS of a first type and simultaneous ON BFD-RS of a second type),
A combination of the maximum number of simultaneous BFD-cells and the maximum number of simultaneously ON BFD-RS,
A maximum number of configured BFD-RS i.e. the maximum number of RSs configured into the UE in support of both PDCCH quality monitoring or new beam identification,
A maximum number of configured BFD-RS,
A maximum number of configured BFD-RS of a first type (e.g. periodic CSI-RS),
A maximum number of configured BFD-RS of a second type (e.g. SSB) and/or
A maximum number of configured BFD-RS (e.g. the sum of configured BFD-RS of a first type and configured BFD-RS of a second type),
A maximum number of simultaneous BFD-cells.

While the above parameters may be reported in isolation, it should be understood that parameters need not be independent of one another, and may be reported in a multi-dimensional vectors, such as combined number of cells and BFD-BWP capability. For example, a UE may be able to handle N cells. However, it may only be able to handle N−2 cells simultaneously with a different number of BWPs, or RSs. Accordingly, the above examples have been given as single parameters for simplicity, but it should be recognized that the UE capability parameters may not be independent of one another and thus may be reported, or considered by the UE, in groups of two or more.

In various embodiments described herein, a UE capability related to BFD, NBI and/or BFR comprises multiple UE capabilities related to the BFD, NBI and/or BFR capability of a UE. In some embodiments, multiple such UE capabilities are components (e.g. parts) of a UE capability for BFD, NBI and/or BFR. For brevity, the terminology "a UE capability", or "UE capability parameter" (used in the singular, although it may include plural parts) is used also for such embodiments.

In various embodiments, a UE can report a UE capability related to BFD, NBI and/or BFR (e.g. multiple components) per frequency band, per combination of frequency bands (e.g. multiple bands), per frequency range and/or per UE, etc. In various embodiments, a UE can report a UE capability related to BFD, NBI and/or BFR (e.g. multiple components) per frequency band and a (potentially different) UE capability related to BFD, NBI and/or BFR (e.g. multiple components) per UE.

In various embodiments, the UE can report a single UE capability value/parameter for a particular capability that applies per frequency band, and the single capability value then applies to each band (similarly for band combination etc.). In various embodiments, the UE can report multiple UE capability values for a particular capability that applies per frequency band, and each of the multiple values then applies to different bands band (similarly for band combination etc.).

In various embodiments, a UE can report the following UE capabilities per frequency band. The form of a RRC message, although other messages could be used as well such as NAS message. The following are different types of UE capability information that may be reported in fields of the messages:

The maximum number of simultaneous ON BFD-RS of a first type (e.g. periodic CSI-RS) and
The maximum number of simultaneous ON BFD-RS of a second type (e.g. SSB).

In various embodiments, a UE can report the following UE capabilities per frequency band:

The maximum number of simultaneous ON BFD-RS of a first type (e.g. periodic CSI-RS),
The maximum number of simultaneous ON BFD-RS of a second type (e.g. SSB) and
The maximum number of simultaneous ON BFD-RS (e.g. the sum of simultaneous ON BFD-RS of a first type (e.g. periodic CSI-RS) and simultaneous ON BFD-RS of a second type (e.g. SSB)), In various embodiments, a UE can report the following UE capabilities per UE:

The maximum number of simultaneous ON BFD-RS of a first type (e.g. periodic CSI-RS) and
The maximum number of simultaneous ON BFD-RS of a second type (e.g. SSB).

In various embodiments, a UE can report the following UE capabilities per UE:

The maximum number of simultaneous ON BFD-RS of a first type (e.g. periodic CSI-RS),
The maximum number of simultaneous ON BFD-RS of a second type (e.g. SSB) and
The maximum number of simultaneous ON BFD-RS (e.g. the sum of simultaneous ON BFD-RS of a first type (e.g. periodic CSI-RS) and simultaneous ON BFD-RS of a second type (e.g. SSB)), In various embodiments, a UE can report the following UE capabilities per UE:

The maximum number of simultaneous ON BFD-RS (e.g. the sum of simultaneous ON BFD-RS of a first type (e.g. periodic CSI-RS) and simultaneous ON BFD-RS of a second type (e.g. SSB)), In various embodiments, a UE can report the following UE capabilities:

Per frequency band: The maximum number of simultaneous ON BFD-RS of a first type (e.g. periodic CSI-RS),
Per frequency band: The maximum number of simultaneous ON BFD-RS of a second type (e.g. SSB),
Per frequency band: The maximum number of simultaneous ON BFD-RS (e.g. the sum of simultaneous ON BFD-RS of a first type (e.g. periodic CSI-RS) and simultaneous ON BFD-RS of a second type (e.g. SSB)),
Per UE: The maximum number of simultaneous ON BFD-RS of a first type (e.g. periodic CSI-RS).
Per UE: The maximum number of simultaneous ON BFD-RS of a second type (e.g. SSB) and
Per UE: The maximum number of simultaneous ON BFD-RS (e.g. the sum of simultaneous ON BFD-RS of a first type (e.g. periodic CSI-RS) and simultaneous ON BFD-RS of a second type (e.g. SSB)).

In various embodiments, a UE can report the following UE capabilities:

Per frequency band: The maximum number of simultaneous ON BFD-RS of a first type (e.g. periodic CSI-RS), Per frequency band: The maximum number of simultaneous ON BFD-RS of a second type (e.g. SSB), Per frequency band: The maximum number of simultaneous ON BFD-RS (e.g. the sum of simultaneous ON BFD-RS of a first type (e.g. periodic CSI-RS) and simultaneous ON BFD-RS of a second type (e.g. SSB)) and Per UE: The maximum number of simultaneous ON BFD-RS (e.g. the sum of simultaneous ON BFD-RS of a first type (e.g. periodic CSI-RS) and simultaneous ON BFD-RS of a second type (e.g. SSB)).

In various embodiments, a UE can report the following UE capabilities:

Per frequency band: The maximum number of simultaneous ON BFD-RS of a first type (e.g. periodic CSI-RS), Per frequency band: The maximum number of simultaneous ON BFD-RS of a second type (e.g. SSB) and Per UE: The maximum number of simultaneous ON BFD-RS (e.g. the sum of simultaneous ON BFD-RS of a first type (e.g. periodic CSI-RS) and simultaneous ON BFD-RS of a second type (e.g. SSB)).

In various embodiments, a BFD-RS related UE capability, e.g. maximum number of simultaneous ON BFD-RS, counts only explicitly configured BFD-RS. In various embodiments, a BFD-RS related UE capability. e.g. maximum number of simultaneous ON BFD-RS, counts both explicitly and implicitly configured BFD-RS.

In various embodiments, a BFD-RS related UE capability, e.g. maximum number of simultaneous ON BFD-RS, is based on an assumed period. In some embodiments (A), the period is the period by which the physical layer informs the higher layers when the radio link quality is worse than the threshold. In some embodiments (B) of the period, the UE will evaluate whether the downlink radio link quality of the BFD-RS estimated over the last period becomes worse than a threshold within the period. In some embodiments, the actual UE capability is scaled (compared to the reported UE capability) if the configured or applicable period is scaled compared to the assumed period.

Consider an example (e.g. for embodiments (A)) in which the assumed period is 2 milliseconds (ms) but the configured period is 10 ms, e.g. since the periodicity of the BFD-RS(s) is 10 ms. This means a scaling factor of 5 between configured and assumed period. If the UE reported a UE capability of maximum number of simultaneous ON BFD-RS to be 4 (assuming a 2 ms period), then the actual UE capability that the network can apply is 4*5=20 simultaneous ON BFD-RS.

In various embodiments, a UE indicates a capability, e.g. BFD-related capability, at least partly based on its battery power status and/or based on the battery power saving scheme the UE applies. For example, when a UE has a high battery status, it may indicate a higher BFD-related capability, e.g. more BFD-RS. When a UE applies a power saving scheme, it may indicate a lower BFD-related capability, thereby prohibiting too high BFD-related power consumption.

Overview of Network/UE Hybrid BFD Management Solutions and UE Based Embodiments

In a first class of BFD management embodiments, the network (or gNB, or simply base station) determines BFD based on the UE capabilities and adjusts the group of cell-based resources assigned for BFD to the UE so the UE's capability is not exceeded. As will be discussed, in turn are three categories of embodiments: RRC configuration, MAC signaling and L1 (PHY layer) signaling.

In a second class of BFD management embodiments, the UE applies one or more selection rules or procedures if the network configuration results in the BFD UE capability being exceeded. For example, this may occur in a multi-RAT (e.g. EN-DC) and/or multi connectivity scenario, in which RRC signaling (e.g. NR is handled in an LTE cell and with limited coordination between the LTE cell and NR cell. With the selection rule or procedure, the UE determines on which cell, BWP and/or BFD-RS (out of the configured) it performs BFD. Again, note that BFD, NBI and/or BFR related UE capability/capabilities may be indicated per band, band combination, frequency range and/or per UE, etc. If there is a UE capability reported per band, the various embodiments describing solutions etc. can be applied per band, band combination, frequency range and/or per UE etc., to make sure that each reported capability is not exceeded. For example, consider a UE that reports per frequency band: (1) The maximum number of simultaneous ON BFD-RS of a first type (e.g. periodic CSI-RS) and (2) The maximum number of simultaneous ON BFD-RS of a second type (e.g. SSB), for two frequency bands. Various embodiments to manage the number of simultaneous ON BFD-RS could then be applied to each of the two frequency bands to avoid exceeding the per-band UE capability. Furthermore, for UE capabilities reported separately per RS type (e.g. periodic CSI-RS and SSB), various embodiments of solutions to manage the number of simultaneous ON BFD-RS could then be applied to each of the two RS types in order not to exceed the per-type UE capability.

Network/UE-Based BFD Management Alternative Embodiments

In various embodiments, the network (e.g., the serving base station, gNB) indicates to the UE which of the cells are BFD-cells, e.g. which of the ON cells are also BFD-cells.

In various embodiments, the network indicates to the UE which of the BFD-RS are ON BFD-RS.

In various embodiments, the UE performs measurements, e.g. RSRP, RSRQ, SINR, RSSI, on BFD-RS, other RS/signals and/or other time-frequency resources assigned for measurement. A UE may feedback corresponding measurement results or information derived from such measurements to the network. The network may use such information that is fed back, as well as other information, to decide which cells and/or BFD-RS to indicate to the UE as ON or OFF.

Network/UE-Based BFD Management Alternative Embodiments Based on RRC Signaling

This section is divided into four categories, each of which will be addressed in turn: (i) Cell level RRC Configuration. (ii) BWP Level RRC Configuration, (iii) Enabling BF on a Cell and/or BWP, and (iv) BFD-RS Level RRC Configuration.

Cell Level RRC Configuration

In various embodiments, the network indicates to the UE which of the cells, e.g. of the ON cells, that are BFD-cells, with RRC signaling.

In various embodiments, the network indicates to the UE with RRC signaling if "BFD is enabled on a cell". In some embodiments, the cell is a BFD-cell if BFD is enabled on the cell, and the cell is in an ON state. If the cell is in an OFF state, the cell is not a BFD-cell even though BFD is enabled in the cell RRC configuration.

Figure 3:
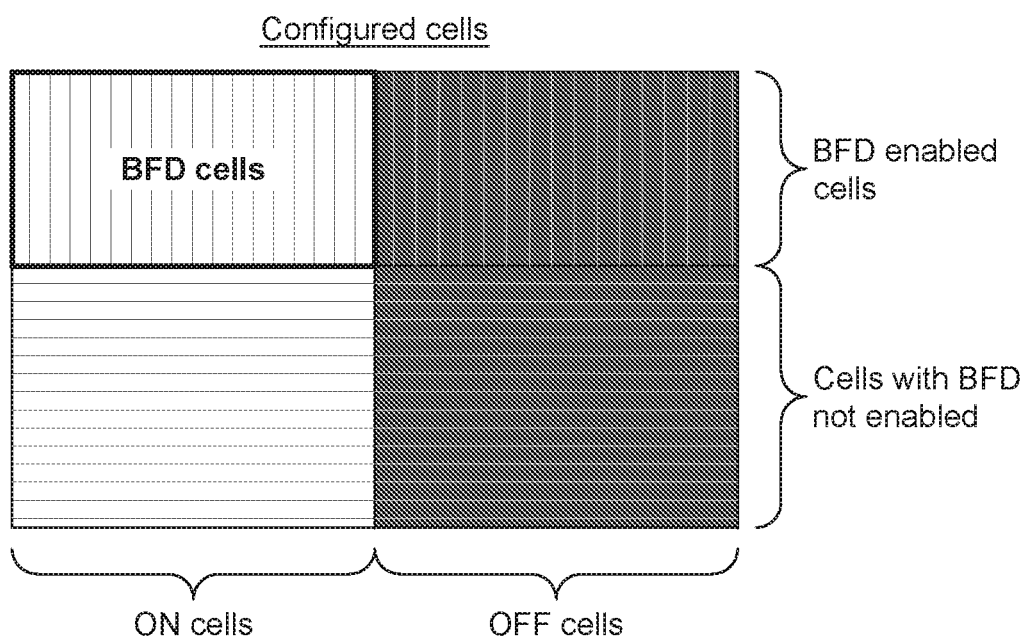
FIG. 3 is a Venn diagram that illustrates relationships between configured cells from a UE's perspective regarding cell active states and BFD enablement.

FIG. 3 illustrates an exemplary Venn diagram of various sets of cells. The sets are from the perspective of a UE. The entire rectangle represents the set of configured cells for a UE. The configured cells are either in an ON state or in an OFF state. Furthermore, the configured cells either have BFD enabled, according to various embodiments, or not enabled. The subset of cells which are both in an ON state and have BFD enabled are BFD cells, in various embodiments.

In various embodiments, it is up to the network to make sure that the number of BFD-cells does not exceed the UE capability. This can be achieved for instance by limiting the number of cells in an ON state (configured e.g. using MAC CE or DCI signaling), that have BFD enabled. A complementary approach is to disable and/or enable BFD on cells with RRC signaling prior to, after or at cell state transitions.

BWP Level RRC Configuration

In various embodiments, the network indicates with RRC signaling to the UE if "BFD is enabled on a BWP". In some embodiments, the cell is a BFD-cell if BFD is enabled on the active BWP, and the cell is in an ON state. If the cell is in an OFF state and/or BFD is not enabled on the active BWP, the cell is not a BFD-cell.

In some embodiments, the network indicates with RRC signaling to the UE if BFD is enabled on a cell and if BFD is enabled and/or disabled on one or more of its BWPs. In such a situation, a cell is a BFD-cell if BFD is enabled on the cell, the cell is ON and BFD is enabled on an active BWP.

In various embodiments, the absence of RRC signaling, e.g. the absence of an optional parameter or IE, may indicate disabled BFD on a cell and/or BWP, e.g. if BFD disabled is a default state of a cell and/or BWP.

In various embodiments, it is up to the network to make sure that the number of BFD-cells and/or BFD BWPs does not exceed the UE capability. This can be achieved for instance by limiting the number of cells/BWP in an ON state (configured e.g. using MAC CE or DCI signaling), that have BFD enabled. A complementary approach is to configure one or more BWPs in a cell such that BFD is enabled on some BWP(s) and BFD is disabled on other BWP(s). If the number of ON cells exceeds the UE BFD capability, the network can limit the number of BFD-cells by activating BWPs with BFD disabled in enough ON cells. In some embodiments, BFD is performed on a DL BWP of a cell if NBI and/or BFR is enabled, i.e. RRC configured/setup, on the active UL BWP of the same cell.

Enabling BFD on a Cell and/or BWP

In some embodiments, an explicit indication that BFD is enabled on the cell is included in the cell RRC configuration (e.g. ServingCellConfig IE), e.g. a one-bit indication.

In some embodiments, an explicit indication that BFD is enabled on a BWP is included in a BWP RRC configuration (e.g. BWP-DownlinkDedicated, radioLinkMonitoringConfig, BWP-UplinkDedicated and/or BeamFailureRecoveryConfig IE), e.g. a one-bit indication.

In various embodiments, if it's indicated that BFD is enabled on a cell and/or BWP, e.g. using an explicit indication, but no BFD-RS are explicitly configured for the cell and/or BWP, then the UE uses the BFD-RS implicitly defined through the current QCL configuration of the monitored CORESET(s).

In some cases, BFD is enabled on a cell and/or BWP if one or more related IEs are included in the cell configuration and/or BWP configuration, e.g. a configuration/setup of BFD, NBI and/or BFR. In some embodiments, BFD is enabled on a cell if BFD, NBI and/or BFR is enabled/setup/ configured on at least one DL BWP and/or UL BWP. In some embodiments, BFD is enabled on a cell if BFD, NBI and/or BFR is enabled/setup/configured on each configured DL BWP and/or each configured UL BWP. In some embodiments, BFD is enabled on a cell if BFD, NBI and/or BFR is enabled/setup/configured on one or more active BWPs, for example, if BFD is enabled/setup/configured on the active DL BWP and/or NBI/BFR is enabled/setup/configured on the active UL BWP.

In various embodiments, BFD is always enabled on an SpCell, e.g. BFD is enabled on all configured BWPs of the SpCell, in some cases only in a set of frequency bands or ranges. e.g. in FR2.

A configuration of BFD may be a configuration of BFD-RS, such as a RadioLinkMonitoringConfig IE and/or a RadioLinkMonitoringConfig IE with a RadioLinkMonitoringRS IE with one or more RS configured for beam failure detection, e.g. with purpose parameter set to "beamFailure" and/or "both" and/or "rlf" and/or another value associated with enabled BFD. In some embodiments, some purpose parameter values. e.g. "beamFailure" and/or "both", are associated with enabled BFD whereas other purposes. e.g. "rlf", are associated with disabled BFD.

In various embodiments, if it's indicated that BFD is enabled on a cell and/or BWP, e.g. by using an explicit indication or by the setup/presence of RadioLinkMonitoringConfig IE, but no BFD-RS are explicitly configured for the cell and/or BWP, then the UE uses the BFD-RS implicitly defined through the currently active QCL configuration of the monitored CORESET(s), as described above. If, on the other hand, BFD-RS have been explicitly configured for the cell and/or BWP, e.g. by using the RadioLinkMonitoringRS IE, those explicitly defined BFD-RS are used.

A configuration of NBI and/or BFR may be a configuration of candidate RS for NBI and/or a configuration of BFRQ, e.g. resources for BFRQ such as dedicated resources for CFRA, PUCCH, SR, etc. and/or a configuration of BFRR. e.g. a configuration of CORESET and/or search space for BFRR.

In various embodiments, it's indicated to a UE that BFD is enabled on a cell and/or BWP by the setup/presence of BeamFailureRecoveryConfig IE, or a similar IE dedicated to SCell BFR, in a cell or BWP configuration.

BFD-RS Level RRC Configuration

In various embodiments, the network indicates with RRC signaling to the UE if a BFD-RS is an ON BFD-RS. In some embodiments, the BFD-RS is an ON BFD-RS if the BFD-RS is activated, and the corresponding cell is in an ON state. If the cell is in an OFF state, the BFD-RS is not an ON BFD-RS even though the BFD-RS is activated in the cell RRC configuration.

In various embodiments, RRC signaling can be used to release a previously explicitly configured BFD-RS, e.g. with the failureDetectionResourcesToReleaseList parameter in the RadioLinkMonitoringConfig IE. In some embodiments, a BFD-RS can be suspended and/or activated with RRC signaling, for example, by including the BFD-RS index (e.g. RadioLinkMonitoringRS-Id) in a list of indices for suspension and/or activation. A suspended BFD-RS is not monitored by the UE, i.e. it is an OFF BFD-RS, while an activated BFD-RS would be used for BFD if the corresponding cell is ON and/or BWP is ON. i.e. it is an ON BFD-RS. An advantage of using a suspend/activate parameter instead of setup/add/modify/release is that it requires much fewer bits.

For example, an RRC parameter similar to the following failureDetectionResourcesToSuspendList SEQUENCE SIZE(1 . . . maxNrofFailureDetectionResources)) OF RadioLinkMonitoringRS-Id OPTIONAL,--Need M could indicate a set of BFD-RS indices (RadioLinkMonitoringRS-Id) for which the suspended/activated state would toggle. In some embodiments, BFD-RS are activated by default after being configured, e.g. using the failureDetectionResourcesToAddModList parameter.

In some embodiments, there is a separate suspend list and a separate activate list, rather than a single list with state toggle functionality. In some embodiments, suspend/activate BFD-RS list(s) are included in an RRC configuration per BWP, e.g. RadioLinkMonitoringConfig in a DL BWP configuration.

In some embodiments, suspend/activate BFD-RS list(s) are included in a cell level RRC configuration, e.g. ServingCellConfig IE. In some embodiments, presence of a certain BFD-RS index (e.g. RadioLinkMonitoringRS-Id) in a suspension and/or activation list(s) suspends/activates the corresponding BFD-RS index in each configured BWP in which the BFD-RS index is configured.

In various embodiments, a suspend/activate mechanism. e.g. with list(s) as described above, is used to suspend and activate implicitly configured BFD-RS. In some embodiments, if there are no BFD-RS explicitly configured, the indices in suspend/activate list(s) refer to CORESET indices, e.g. to the ControlResourceSetId parameter. In various such embodiments, if the implicitly configured BFD-RS corresponding to a CORESET index is suspended, it is an OFF BFD-RS. If it is activated, it may be an ON BFD-RS, if the cell is ON, BWP is ON and/or CORESET is monitored.

In various embodiments, it is up to the network to make sure that the number of ON BFD-RS does not exceed the UE capability. In various embodiments, it is up to the network to make sure that the number of ON BFD-RS of a first RS type (e.g. periodic CSI-RS) does not exceed the corresponding UE capability for the first RS type. In various embodiments, it is up to the network to make sure that the number of ON BFD-RS of a second RS type (e.g. SSB) does not exceed the corresponding UE capability for the second RS type. In some embodiments, this can be achieved by suspending and/or activating BFD-RS in ON and OFF cells.

In various embodiments, the physical layer uses only activated BFD-RS in the evaluation of beam failure. i.e. if a beam failure indication should be provided to higher layers or not. In some embodiments, the ON BFD-RS is a subset of the activated BFD-RS, e.g. the activated BFD-RS of ON cells and/or ON BWPs. In some embodiments, an activated BFD-RS on an OFF cell and/or OFF BWP is an OFF BFD-RS.

Exemplary UE Procedures

Figure 4:
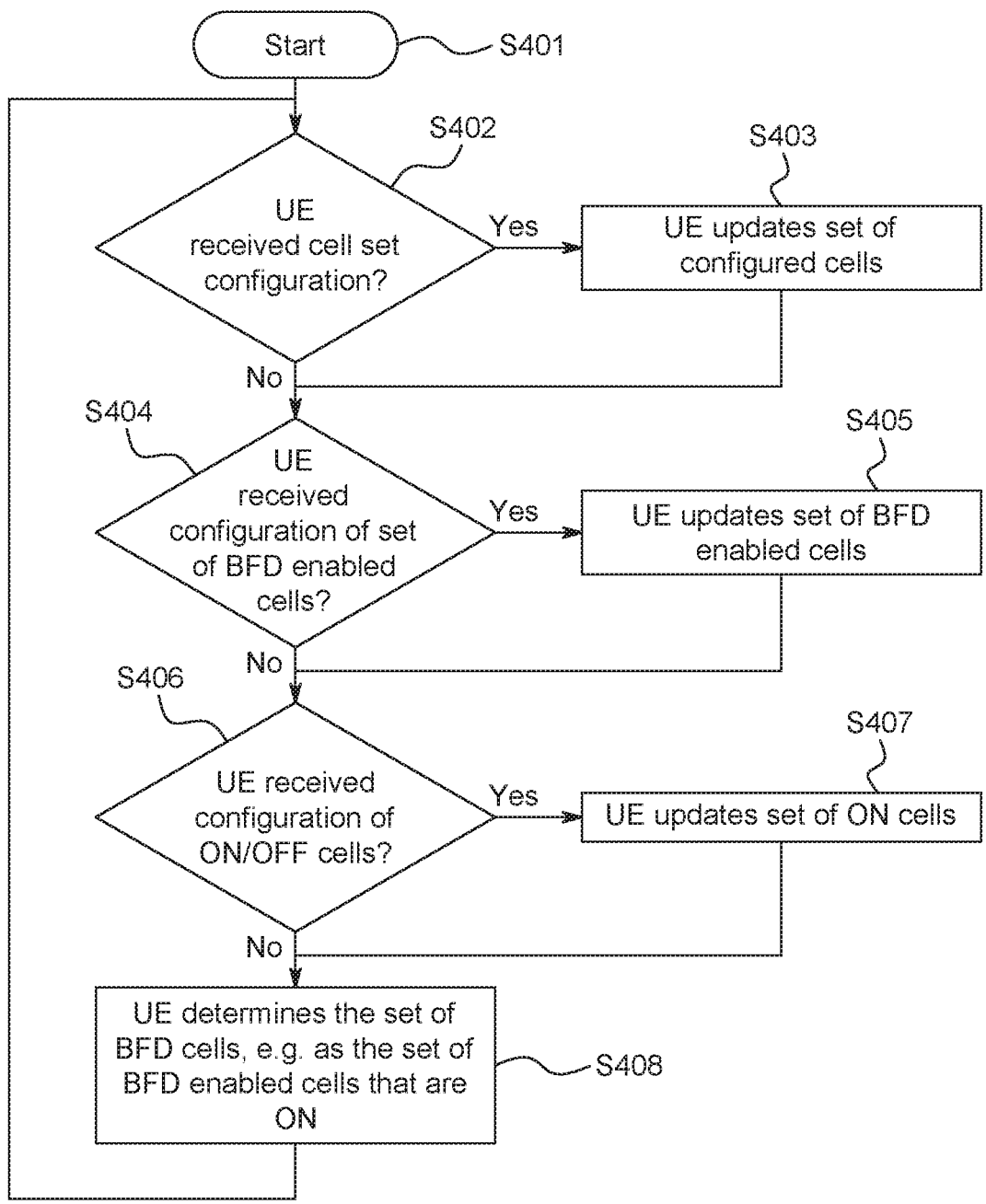
FIG. 4 is a flowchart of a network managed process for adapting cells within a group of cells for which the UE is responsible for performing BFD.

Various embodiments of a UE procedure for maintaining a set of BFD cells are illustrated in the flowchart of FIG. 4. Various embodiments include only a part of the steps and/or execution of the steps in a different order.

Step S401. At the start of the procedure, a UE may be connected to the network, for instance to an SpCell, or may attempt to perform initial access to an SpCell. This step may also include that the UE reports to the network (e.g., gNB) its one or more UE capabilities related to BFD, NBI and/or BFR.

Step S402. In this step a query is made regarding whether a UE has received a configuration, e.g. RRC configuration, from the network, including a configuration of a set (or group) of configured cells. In some embodiments, a configuration includes the addition of one or more cells. In some embodiments, a configuration includes the release of one or more cells. If the response is affirmative, the process proceeds to step S403, but if it is negative, the process proceeds to the query at S404.

Step S403. In this step, if the UE received a configuration updating the set of configured cells from the network, e.g. change of PCell, addition/release/change of PSCell and/or addition/release of SCell(s), the UE updates the set of configured cells accordingly.

a. In various embodiments, the release of a cell from a set of configured cells implies that other cell configuration(s) such as BFD enabled/disabled, cell ON/OFF etc., are released, i.e. the UE does not maintain various such states for such released cells. As an example, consider a BFD enabled cell that is first released and then added again to the set of configured cells. After the addition, the cell is not BFD-enabled, in various embodiments, i.e. the release and subsequent addition disabled BFD.

Step S404. In this step a query is made regarding whether a UE received an RRC configuration of a set of BFD-enabled cells from the network. In some cases, a cell may be configured with BFD enabled and/or disabled by the same reconfiguration message by which the cell is added to the set of configured cells, e.g. a BFD enabling and/or disabling configuration is included in the configuration of an added cell. In some cases, an already configured, e.g. already added, cell may be configured with BFD-enabled and/or -disabled after the cell has been added to the set of configured cells, e.g. a BFD enabling and/or disabling configuration is included in the configuration of a modified cell. If the response is affirmative, the process proceeds to step S405, and if negative the process proceeds to the query at step S406.

Step S405. If the UE received a configuration updating a set of BFD-enabled and/or -disabled cells, the UE updates the set. In various embodiments, such a set is not explicitly maintained in the UE. Instead, a BFD configuration for each configured cell and/or for configured BWPs of configured cells is maintained.

Step S406. In this step, a query is made regarding whether a UE may receive a configuration from the network. e.g. MAC CE and/or DCI, that indicates changes to cell state(s), e.g. between ON and OFF. If the response to the query is affirmative, the process proceeds to step S407, and if the response is negative, the process proceeds to step S408.

Step S407. If the UE received a configuration about cell state changes. e.g. ON/OFF, the UE may update the set of ON cells and/or set of OFF cells accordingly. In various embodiments, such set(s) are not explicitly maintained in the UE. Instead, an ON/OFF state for each configured cell is maintained.

Step S408. Note that various embodiments, the order of steps S402/3, Step S404/5 and Step S406/7 is different, e.g. ON/OFF configuration in Step S406/7 is received prior to BFD enabling/disabling in Step S404/5. In various embodiments, a UE receives a subset of the configurations mentioned in steps Step S402-7, for example, a UE receives only a configuration of ON/OFF cells. In various embodiments, a UE determines a set of BFD cells following the reception of a configuration from the network that impacts the determination of the set of BFD cells, such as one or more of the configurations in the steps Step S402-7.

Figure 5:
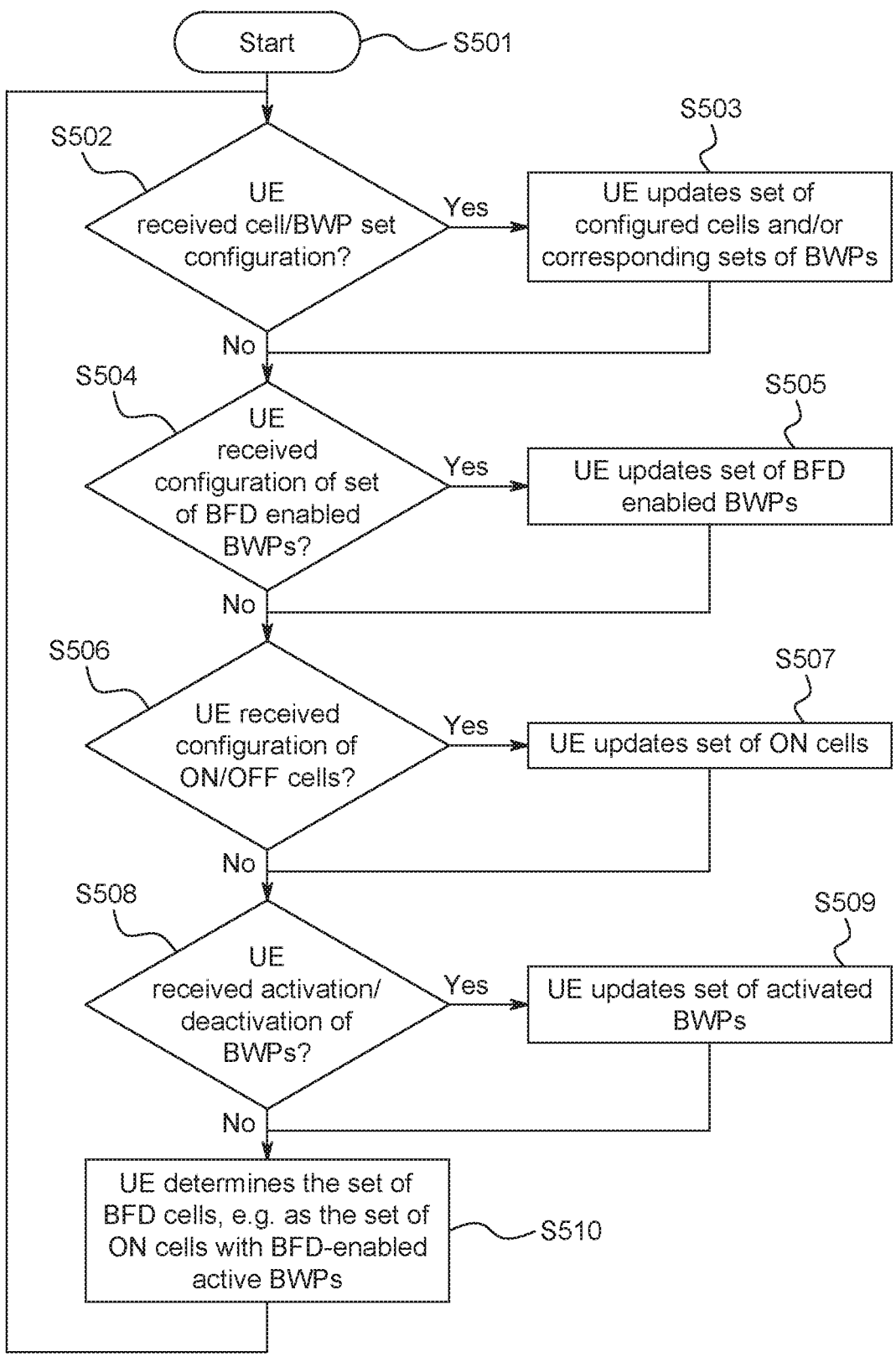
FIG. 5 is flowchart similar to FIG. 4, although includes an adjustment to addition/release/change of BWP(s) for which the UE is responsible for BFD.

Additional embodiments of a UE procedure for maintaining a set of BFD cells are illustrated in FIG. 5. Various embodiments of the steps in addition to those described for FIG. 4 are described below. Various embodiments include embodiments of steps described for FIG. 4 combined with embodiments of steps described for FIG. 5. Various embodiments include only a part of the steps and/or in a different order.

Step S501. See various descriptions for corresponding steps in the FIG. 4 description.

Step S502. In this step, a query is made regarding whether a UE has received a configuration, e.g. RRC configuration, from the network, including a configuration of a set of configured BWP(s) (DL and/or UL BWP(s)). In some embodiments, a configuration includes the addition of one or more BWPs. In some embodiments, a configuration includes the release of one or more BWPs. If the response to the query is affirmative, the process proceeds to step S503, but it if is negative, the process proceeds to step S504.

Step S503. If the UE received a configuration updating the set of configured BWPs from the network. e.g. addition/release/change of BWP(s), the UE updates the set of configured BWPs accordingly.

a. In various embodiments, the release of a BWP from a set of configured BWP implies that other BWP configuration(s) such as BFD enabled/disabled, activated/deactivated, etc., are released, i.e. the UE doesn't maintain various such states for such released BWPs. As an example, consider a BFD enabled BWP that is first released and then added again to the set of configured BWPs. After the addition, the BWP is not BFD-enabled, in various embodiments, i.e. the release and subsequent addition disabled BFD, e.g. since the default state is disabled.

Step S504. In this step, a query is made regarding whether a UE has received a configuration of a set of BFD-enabled BWP(s) from the network. In some cases, a BWP may be configured with BFD enabled and/or disabled by the same reconfiguration message by which the BWP is added to the set of configured BWPs. e.g. a BFD enabling and/or disabling configuration is included in the configuration of an added BWP. In some cases, an already configured, e.g. already added, BWP may be configured with BFD-enabled and/or -disabled after the BWP has been added to the set of configured BWP, e.g. a BFD enabling and/or disabling configuration is included in the configuration of a modified BWP. If the response to the query is affirmative, the process proceeds to step S505, and if it is negative, the process proceeds to step S506.

Step S505. If the UE received a configuration updating a set of BFD-enabled and/or -disabled BWP(s), the UE updates the set. In various embodiments, such a set is not explicitly maintained in the UE. Instead, a BFD configuration for each configured BWP is maintained.

Step S506. See corresponding description for FIG. 4.

Step S507. See corresponding description for FIG. 4.

Step S508. In this step a query is made regarding whether a UE receives a configuration from the network, e.g. MAC CE and/or DCI, that indicates changes to BWP state(s), e.g. between activated/deactivated or ON/OFF. If the response to the query is affirmative, the process proceeds to step S509, if negative, the process proceeds to step S510.

Step S509. If the UE received a configuration about BWP state changes, the UE may update the sets of BWPs in various states. e.g. set of activated BWPs, set of deactivated BWPs, set of ON BWPs and/or set of OFF BWPs accordingly. Note again that such sets do not need to be explicitly maintained by the UE. Instead, the UE may maintain a state per BWP (e.g. activated or deactivated).

Step S510. Note that various embodiments, the order of steps Step S502/3, Step S504/5. Step S506/7 and Step S508/9 is different, e.g. ON/OFF configuration in step S506/7 is received prior to BFD enabling/disabling in step S504/5. In various embodiments, a UE receives a subset of the configurations mentioned in steps Step S502-9, for example, a UE receives only a BWP activation/deactivation for a particular cell.

In various embodiments, a UE determines a set of BFD cells following the reception of a configuration from the network that impacts the determination of the set of BFD cells, such as one or more of the configurations in the steps Step S502 to Step S509.

Note that during various procedures, the UE performs BFD on the set of BFD cells. In various embodiments, performing BFD means that BFD is performed such that the corresponding requirements are fulfilled, e.g. according to the corresponding requirements in the 3GPP RAN4 specifications.

Cell Activation/Deactivation

An example part of a MAC procedure for cell, e.g. SCell in this example, activation/deactivation is given below. For each configured SCell, the MAC entity performs:

```
1>      if an SCell Activation/Deactivation MAC CE is received activating the
SCell:
        2>      activate the SCell; i.e. apply normal SCell operation including:
                3>      perform beam failure detection on the SCell, if configured.
1>      else if an SCell Activation/Deactivation MAC CE is received deactivating
the SCell; or
1>      if the sCellDeactivationTimer associated with the activated SCell expires:
        2>      deactivate the SCell;
1>      if the SCell is deactivated:
        2>      not perform beam failure detection on the SCell;
```

In other examples, "beam failure detection" above is replaced by "beam failure detection and recovery" or "beam failure detection and recovery procedure". In other examples, "configured" above is replaced by "RadioLink-MonitoringConfig is configured", "BeamFailureRecoveryConfig is configured", "BeamFailureRecoveryConfig and RadioLinkMonitoringConfig is configured", "BeamFailureRecoveryConfig or RadioLinkMonitoringConfig is configured", or "enabled".

Network/UE-Based BFD Management Alternative Embodiments Based on MAC Signaling

MAC CE for BFD Activation/Deactivation

In various embodiments, BFD on a cell and/or a BWP can be activated and/or deactivated using a MAC CE.

In various embodiments, a BFD activation/deactivation MAC CE includes a sequence of fields, e.g. a bitmap, where different fields, e.g. bits, correspond to different cell indices, e.g. SCellIndex or ServCellIndex. In some embodiments, Bi denotes the $i^{th}$ field, e.g. $i^{th}$ bit. In some embodiments. Bi denotes the $i^{th}$ bit in an N-bit field. For instance, if there is a cell, e.g. SCell, configured for the MAC entity with cell index i, this field/bit indicates the MAC CE activation/ deactivation of BFD of the cell with index i. For example, the Bi field/bit is set to "1" to indicate that BFD on the cell with index i will be activated and to "0" to indicate that BFD on the cell with index i will be deactivated.

In various embodiments, a cell is a BFD-cell if it is in an ON state and BFD on the cell is MAC CE activated. In various embodiments, a cell is not a BFD-cell if it is in an OFF state and/or BFD on the cell is MAC CE deactivated.

In various embodiments, enabling BFD on a cell, e.g. using RRC signaling such as described previously, is combined with BFD activation/deactivation using a MAC CE. In various embodiments, a cell is a BFD cell if and only if the cell has BFD enabled and BFD is MAC CE activated. In various embodiments, a cell is a BFD cell if the cell has BFD MAC CE activated, even if it doesn't have BFD enabled, e.g. using a default and/or implicit BFD, NBI and/or BFR configuration. In some embodiments, each configured cell is BFD enabled.

In some embodiments, the default BFD MAC CE state is deactivated for a cell/BWP that has been RRC configured, e.g. BFD enabled, but not MAC CE BFD activated/deactivated, and in other embodiments it's activated.

Figure 6:
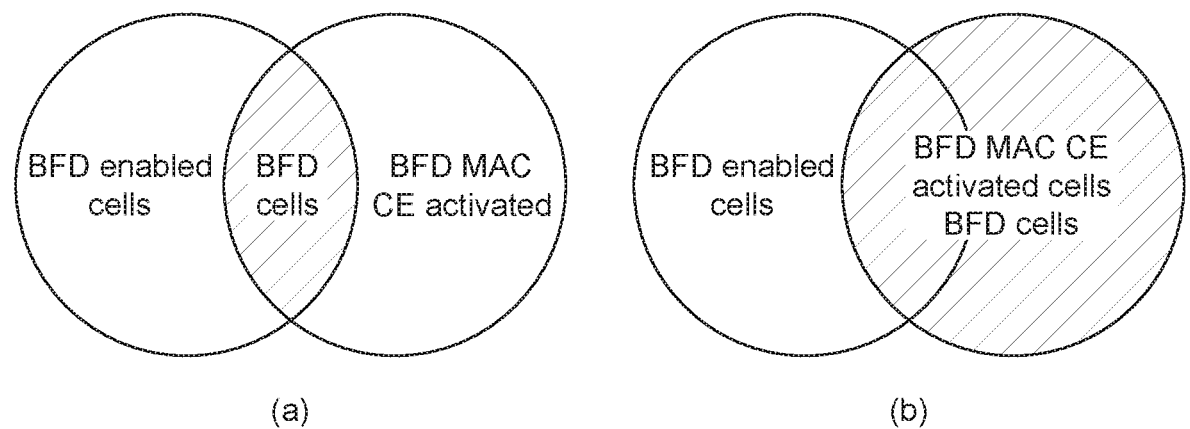
FIGS. 6a and 6b illustrate various embodiments of the group of BFD cells in relation to a set of BFD enabled cells and a set of cells with BFD activated by MAC CE.

FIGS. 6(a) and 6(b) illustrate various embodiments of the set of BFD cells in relation to a set of BFD enabled cells and a set of cells with BFD activated by MAC CE.

In FIG. 6(a), a set of BFD cells is an intersection of the set of BFD enabled cells and a set of cells with BFD MAC CE activated. In various embodiments, a cell is a BFD cell if it has BFD enabled, e.g. with a BFD, NBI and/or BFR RRC configuration and/or according to various embodiments previously discussed with respect to RRC signaling.

In FIG. 6(b), a set of BFD cells is a set of cells on which BFD has been MAC CE activated, even though some of these cells are not BFD enabled. A UE may perform BFD, NBI and/or BFR on a cell that has not BFD enabled, e.g. with a corresponding BFD, NBI and/or BFR RRC configuration, e.g. by applying a default and/or implicit configuration/parameter(s) such as implicitly defined BFR-RS, according to various embodiments.

In some embodiments, the activation/deactivation of BFD of a cell means that BFD is activated/deactivated on an active BWP of the cell, i.e. different BWPs of a cell can maintain different BFD activation/deactivation states. In some embodiments, a BFD-cell (or non BFD-cell) can switch into a non BFD-cell (or BFD-cell) by a BWP switch, e.g. if the old and new BWPs of the cell are activated and deactivated, respectively. In various embodiments, a cell is a BFD-cell if it is in an ON state and BFD on an active BWP of the cell is MAC CE activated. A cell is not a BFD-cell if it is in an OFF state and/or BFD on an active BWP of the cell is MAC CE deactivated. In some embodiments, the default BFD MAC CE state for a BWP that has been RRC configured but not MAC CE BFD activated/deactivated is deactivated, and in other embodiments it's activated.

In various embodiments, a MAC CE for BFD activation/deactivation is separate from a MAC CE for SCell activation/deactivation. In various embodiments, a MAC CE for BFD activation/deactivation is combined and/or jointly encoded with a MAC CE for SCell activation/deactivation.

In various embodiments, a joint SCell and BFD activation/deactivation MAC CE consists of a sequence of fields, e.g. a bitmap, where different fields. e.g. bits, correspond to different cell indices, e.g. SCellIndex or ServCellIndex. For example, let Bi indicate the $i^{th}$ field, e.g. $i^{th}$ bit. For instance, if there is a cell, e.g. SCell, configured for the MAC entity with cell index i, this field indicates the SCell and BFD activation/deactivation of the cell with index i.

In various embodiments, a joint SCell and BFD activation/deactivation MAC CE consists of a field. e.g. a sequence of values, where different values, correspond to different cell indices, e.g. SCellIndex or ServCellIndex. For example, let Bi indicate the $i^{th}$ value.

Example values for the Bi field/value and corresponding states are given below in Table 2 and Table 3. For a cell state which is OFF, the BFD activation/deactivation information is not used since BFD is not supported in the state. In the example in Table 2, only the deactivated SCell state is an OFF state, whereas in the example in Table 3, both the deactivated and dormant cell states are OFF states. In the examples, a cell is a BFD cell if it is activated (with the MAC CE), in an ON state and is BFD activated (with the MAC CE). Otherwise, it is not a BFD cell.

TABLE 2

Example of joint indication of cells' activation state and BFD activation state in MAC CE

| $B_i$ value | Activation/ deactivation state of SCell i | BFD activation/ deactivation state of SCell i | Cell state | BFD-Cell Status |
|---|---|---|---|---|
| b0 | Deactivated | info not used | OFF | Not BDF Cell |
| b1 | Dormant | Deactivated | ON | Not BDF Cell |
| b2 | Dormant | Activated | ON | BDF Cell |
| b3 | Activated | Deactivated | ON | Not BDF Cell |
| b4 | Activated | Activated | ON | BDF Cell |

TABLE 3

Example of joint indication of cells' activation state and BFD activation state in MAC CE

| $B_i$ value | Activation/ deactivation state of SCell i | BFD activation/ deactivation state of SCell i | Cell state | BFD-Cell Status |
|---|---|---|---|---|
| b0 | Deactivated | info not used | OFF | Not BDF Cell |
| b1 | Dormant | info not used | OFF | Not BDF Cell |
| b2 | Activated | Deactivated | ON | Not BDF Cell |
| b3 | Activated | Activated | ON | BDF Cell |

In various embodiments, a MAC CE for BFD activation/deactivation includes a sequence of fields, where different fields indicate different cells. For example, let $B_i$ indicate the $i^{th}$ field, with i=0, . . . , N−1. In some embodiments, field $B_i$ can indicate one cell index. e.g. SCellIndex or ServCellIndex. Hence, the MAC CE can indicate up to N cell indices. If a cell index is indicated, this can toggle the BFD activation/deactivation state of the cell, in various embodiments. If a cell index is not indicated, the BFD activation/deactivation state of the cell can be maintained. In some embodiments, the field $B_i$ can include both a cell index and a BFD activation/deactivation state, e.g. a bit representing activated or deactivated.

In some embodiments, a MAC CE for BFD activation/deactivation refers to BFD activation/deactivation on the cell on which it was received. In some embodiments, it refers to BFD activation/deactivation on another cell. e.g. all configured cells (or SCells) or all activated cells (or SCells).

By introducing BFD activation/deactivation in MAC CE, the network can control the set of BFD-cells similarly. e.g. as dynamically and with similar overhead and latency, as the network can control the set of activated/deactivated SCells. This enables the network to efficiently ensure that the UE capability for BFD is not exceeded.

MAC CE for BFD-RS Activation/Deactivation

In various embodiments, a MAC CE can be used to activate/deactivate individual or sets of BFD-RS. For example, a larger set of BFD-RS can be configured for a cell and/or BWP by RRC signaling, and a subset of those BFD-RS can be selected for a cell and/or BWP by a BFD-RS activation/deactivation MAC CE. In some embodiments, RRC can configure one or more sets of BFD-RS, which can be activated/deactivated with MAC CE. In some embodiments, a set is confined to a single BWP. In some embodiments, a set spans one or multiple BWP(s) of one or more cell(s).

In some embodiments, a BFD-RS is ON if it is activated by a BFD-RS activation/deactivation MAC CE and/or the corresponding cell is ON and/or the corresponding BWP is ON.

In some embodiments, a BFD-RS activation/deactivation MAC CE includes a sequence of fields, e.g. a bitmap, where each field correspond to a BFD-RS (or a set thereof). For example, let $B_i$ indicate the $i^{th}$ field, with i=0, . . . , N−1. In some embodiments, field $B_i$ can indicate one BFD-RS index (or BFD-RS set index), e.g. RadioLinkMonitoringRS-Id (explicit BFD-RS) or ControlResourceSetId (implicit BFD-RS). Hence, the MAC CE can indicate up to N BFD-RS indices (or BFD-RS set indices). If a BFD-RS index (or BFD-RS set index) is indicated, this can toggle the BFD-RS (or BFD-RS set) activation/deactivation state of the BFD-RS (or BFD-RS set), in various embodiments. If a BFD-RS index (or BFD-RS set) is not indicated, the BFD-RS (or BFD-RS set) activation/deactivation state of the BFD-RS (or BFD-RS set) can be maintained. In various embodiments, the field $B_i$ can include a BFD-RS (or BFD-RS set) activation/deactivation state, e.g. a bit representing activated or deactivated. In some embodiments, the field B, can include both a BFD-RS index (or BFD-RS set index) and a BFD-RS (or BFD-RS set) activation/deactivation state, e.g. a bit representing activated or deactivated. In some embodiments, an activated BFD-RS set means that all BFD-RS in the set are activated and/or a deactivated BFD-RS set means that all BFD-RS in the set are deactivated.

In some embodiments, a MAC CE for BFD-RS (or set thereof) activation/deactivation refers to BFD-RS (or set thereof) activation/deactivation on the cell on which it was received. In some embodiments, it refers to BFD-RS (or set thereof) activation/deactivation on another cell, e.g. all configured cells or all activated cells. In some embodiments, a BFD-RS activation/deactivation MAC CE can activate/deactivate BFD-RS or set(s) of BFD-RS within a frequency band, e.g. the frequency band on which the MAC CE was received, or a band combination or a frequency range.

In various embodiments, a MAC CE for BFD-RS (or set thereof) activation/deactivation activates and/or deactivates explicitly RRC configured BFD-RS (or sets thereof). In various embodiments, a MAC CE for BFD-RS (or set thereof) activation/deactivation activates and/or deactivates implicitly RRC configured BFD-RS (or sets thereof), such as one or more RS currently configured/indicated/activated as QCL with one or more monitored CORESETs. In some embodiments, a monitored CORESET is a CORESET associated with a search space that the UE monitors.

In various embodiments, MAC CE for TCI State Indication for UE-specific PDCCH is used to activate/deactivate (or turn ON/OFF) BFD for the BFD-RS that was implicitly configured using the MAC CE for TCI State Indication for UE-specific PDCCH. In some embodiments, the MAC CE for TCI State Indication is extended with a field that indicates if the implicitly configured BFD-RS is activated/deactivated or turned ON/OFF (e.g. through explicit activated or deactivated indication, or by toggling or not toggling the state). In some embodiments, the reception of a MAC CE for TCI State Indication for UE-specific PDCCH that activates a TCI state that for a CORESET and cell that is already activated, toggles the corresponding implicitly configured BFD-RS state (between activated/deactivated or ON/OFF). In various embodiments, a TCI state RRC configuration includes an indication, e.g. a bit, e.g. in a QCL info IE, that indicates if a BFD-RS that is implicitly configured using the TCI state should be activated/deactivated or turned ON/OFF.

Exemplary UE Procedures

Figure 7:
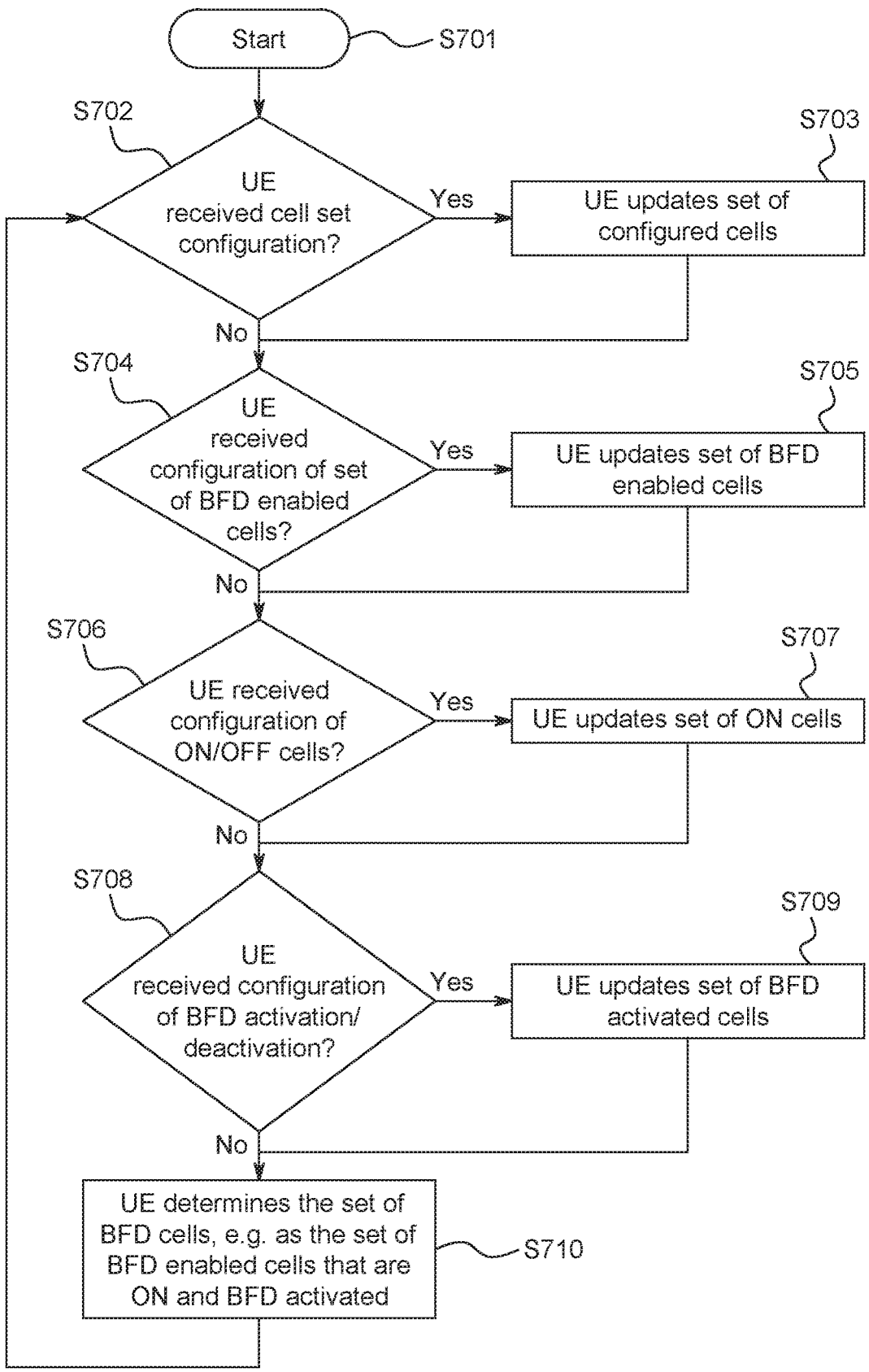
FIG. 7 is a flowchart of a process performed at the UE for determining which cells to perform BFD.

Various embodiments of a UE procedure for maintaining a set of BFD cells are illustrated in FIG. 7. The numbered steps in the flow chart are discussed below. Various embodiments include only a part of the steps and/or in a different order. Various embodiments of the steps in addition to those described for FIG. 4 and/or FIG. 5 are described below. Various embodiments include embodiments of steps described for FIG. 4 and/or FIG. 5 combined with embodiments of steps described for FIG. 7.

Step S701. See various embodiments for the description for FIG. 4 and/or FIG. 5.

Step S702. See various embodiments for the description for FIG. 4 and/or FIG. 5.

Step S703. See various embodiments for the description for FIG. 4 and/or FIG. 5.

Step S704. See various embodiments for the description for FIG. 4 and/or FIG. 5.

Step S705. See various embodiments for the description for FIG. 4 and/or FIG. 5.

Step S706. See various embodiments for the description for FIG. 4 and/or FIG. 5.

Step S707. See various embodiments for the description for FIG. 4 and/or FIG. 5.

Step S708. A query is made regarding whether a UE receives a configuration from the network, e.g. MAC CE and/or DCI, that indicates activation and/or deactivation of BFD, NBI and/or BFR for one or more cells. If the response to the query is affirmative, the process proceeds to step S709, and if negative it proceeds to step S710.

Step S709. If the UE received a configuration about BFD/NBI/BFR activation/deactivation the UE may update the set of BFD-activated cells and set of BFD-deactivated cells accordingly. In various embodiments, such set(s) are not explicitly maintained in the UE. Instead, an BFD activated/deactivated state for each configured and/or ON cell is maintained.

Step S710. Note that various embodiments, the order of steps Step S702/3. Step S704/5, Step S706/7 and Step S708/9 is different, e.g. ON/OFF configuration in Step S706/7 is received prior to BFD enabling/disabling in Step S704/5. In various embodiments, a UE receives a subset of the configurations mentioned in steps Step S702-9, for example, a UE receives only a configuration of ON/OFF cells.

In various embodiments, a UE determines a set of BFD cells following the reception of a configuration from the network that impacts the determination of the set of BFD cells, such as one or more of the configurations in the steps Step S702-9.

Figure 8:
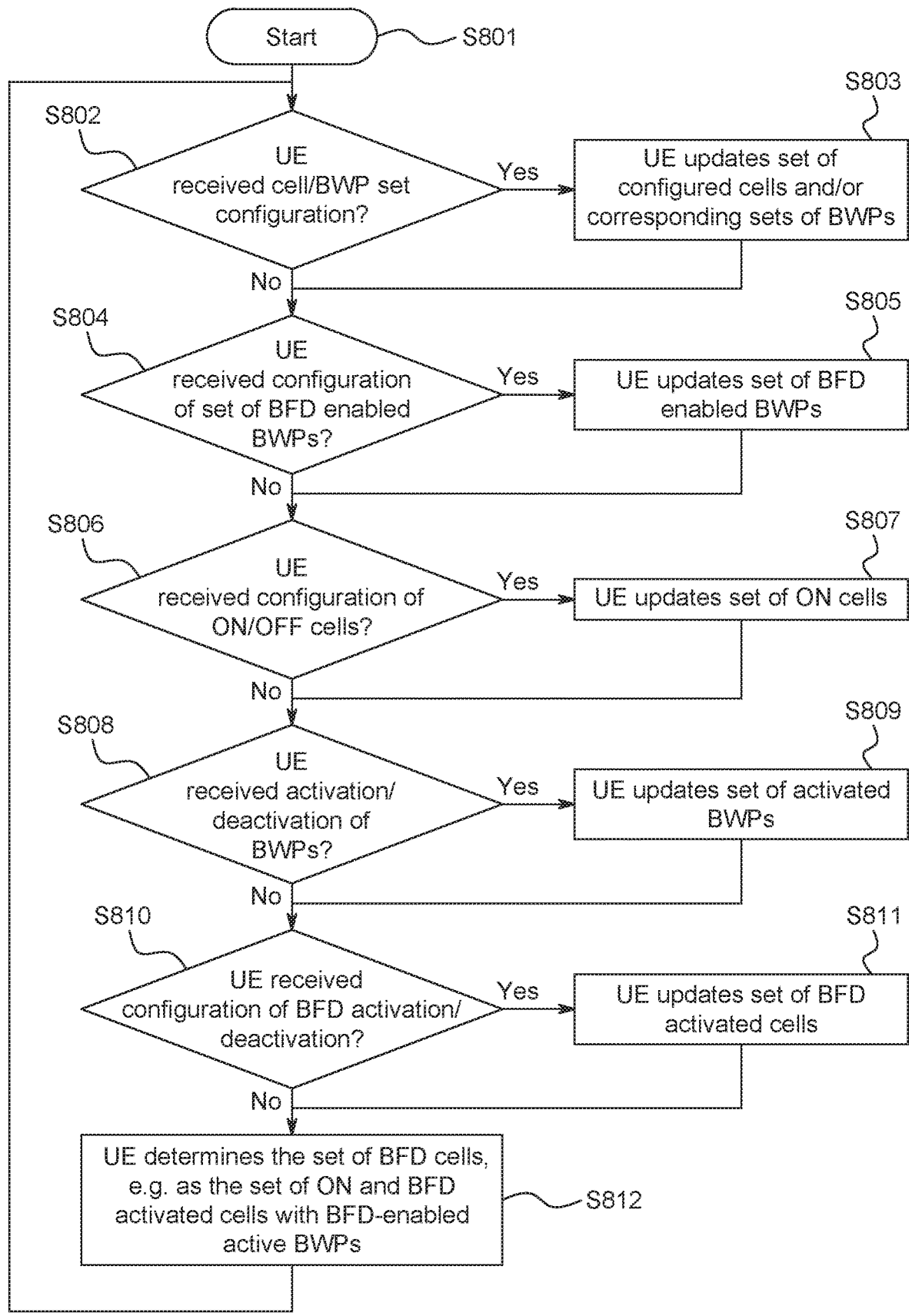
FIG. 8 is a flowchart of a process performed at the UE for determining the cells in the group for which the UE is responsible for performing BFD, including active cells with BFD-enabled active BWP.

Additional embodiments of a UE procedure for maintaining a set of BFD cells are illustrated. With reference to FIG. 8, various embodiments of the steps in addition to those described for FIG. 4, FIG. 5 and FIG. 7 are described below. Various embodiments include embodiments of steps described for FIG. 4 combined with embodiments of steps described for FIG. 5. Various embodiments include only a part of the steps and/or in a different order. In reference to FIG. 8, Step S801. See various embodiments for the description for FIG. 4 and/or FIG. 5.

Step S802. See various embodiments for the description for FIG. 4 and/or FIG. 5.

Step S803. See various embodiments for the description for FIG. 4 and/or FIG. 5.

Step S804. See various embodiments for the description for FIG. 4 and/or FIG. 5.

Step S805. See various embodiments for the description for FIG. 4 and/or FIG. 5.

Step S806. See various embodiments for the description for FIG. 4 and/or FIG. 5.

Step S807. See various embodiments for the description for FIG. 4 and/or FIG. 5.

Step S808. See various embodiments for the description for FIG. 5.

Step S809. See various embodiments for the description for FIG. 5.

Step S810. See various embodiments for the description for FIG. 7.

Step S811. See various embodiments for the description for FIG. 7.

12. Note that various embodiments, the order of steps Step S802/3, Step S804/5. Step S806/7, Step S808/9 and Step S810/11 is different, e.g. ON/OFF configuration in Step S806/7 is received prior to BFD enabling/disabling in Step S804/5. In various embodiments, a UE receives a subset of the configurations mentioned in steps S802-11, for example, a UE receives only a BWP activation/deactivation for a particular cell.

In various embodiments, a UE determines a set of BFD cells following the reception of a configuration from the network that impacts the determination of the set of BFD cells, such as one or more of the configurations in the steps 2 to 11.

Cell Activation/Deactivation

An example part of a MAC procedure for cell, e.g. SCell in this example, activation/deactivation is given below.

For each configured SCell. The MAC entity will:

In other examples, "beam failure detection" in the example above is replaced by "beam failure detection and recovery" or "beam failure detection and recovery procedure".

Network/UE-Based BFD Management Alternative Embodiments Based on L1 Signaling

In various embodiments, L1 signaling is used to activate/deactivate BFD on a cell and/or BWP for one or more UE(s), e.g. with a single bit parameter. In various embodiments, L1 signaling is used to turn BFD ON/OFF on a cell and/or BWP for one or more UE(s), e.g. with a single bit parameter.

In various embodiments, L1 signaling comprises one or more parameters in a DCI, a parameter used to scramble a CRC (e.g. an RNTI), a parameter used generate. e.g. initialize, a sequence (e.g. a DMRS sequence, preamble sequence etc.). In various embodiments, the L1 signaling is received on the same cell and/or BWP as the cell and/or BWP on which BFD is activated/deactivated/turned ON/turned OFF. In various embodiments, the L1 signaling refers to BFD on one or more cell(s) and/or BWP(s) different from the cell and/or BWP on which the L1 signaling was received, e.g. by including carrier indicator(s) and/or BWP indicator(s) in the L1 signaling.

In various embodiments, L1 indicates a cell state to one or more UEs, e.g. using a cell state index, for example, one state from the set states described in Table 4, Table 5 or Table 6 or from a subset thereof or from subset thereof in addition to other states not listed in Table 4, Table 5 or Table 6.

```
1>    if an SCell Activation/Deactivation MAC CE is received activating the
SCell:
     2>    activate the SCell; i.e. apply normal SCell operation including:
          3>    perform beam failure detection on the SCell, if activated.
1>    else if an SCell Activation/Deactivation MAC CE is received deactivating
      the SCell; or
1>    if the sCellDeactivationTimer associated with the activated SCell expires:
     2>    deactivate the SCell;
1>    if the SCell is deactivated:
     2>    not perform beam failure detection on the SCell;
```

Note that "activated" in the example above refers to "Beam failure detection". In other examples, "beam failure detection" in the example above is replaced by "beam failure detection and recovery" or "beam failure detection and recovery procedure".

BFD Activation/Deactivation

An example part of a MAC procedure for BFD activation/deactivation is given below, in this example for an SCell.

For each configured SCell, the MAC entity will:

TABLE 4

Illustration of BFD cell indication with L1 signaling

| Cell state index | Cell state | BFD cell Status |
|---|---|---|
| i0 | Deactivated | Not BDF Cell |
| i1 | Dormant | Not BDF Cell |
| i2 | Dormant | BDF Cell |

```
1>    if an SCell beam failure detection Activation/Deactivation MAC CE is
      received activating the SCell beam failure detection:
     2>         activate the SCell beam failure detection;
1>    else if an SCell beam failure recovery Activation/Deactivation MAC CE is
      received deactivating the SCell beam failure detection:
     2>         deactivate the SCell beam failure detection;
1>    if the SCell beam failure detection is activated; and
1>    if the SCell is activated:
     2>         perform beam failure detection on the SCell.
1>    else if the SCell is deactivated:
     2>         not perform beam failure detection on the SCell;
```

TABLE 4-continued

Illustration of BFD cell indication with L1 signaling

| Cell state index | Cell state | BFD cell Status |
|---|---|---|
| i3 | Activated | Not BDF Cell |
| i4 | Activated | BDF Cell |

TABLE 5

Illustration of BFD cell indication with L1 signaling

| Cell state index | Cell state | BFD cell Status |
|---|---|---|
| i0 | Deactivated | Not BDF Cell |
| i1 | Dormant | Not BDF Cell |
| i2 | Activated | Not BDF Cell |
| i3 | Activated | BDF Cell |

TABLE 6

Illustration of BFD cell indication with L1 signaling

| Cell state index | Cell state | BFD cell Status |
|---|---|---|
| i0 | Dormant | Not BDF Cell |
| i1 | Dormant | BDF Cell |
| i2 | Activated | Not BDF Cell |
| i3 | Activated | BDF Cell |

In various embodiments, the title rows of Table 4, Table 5 and Table 6 is replaced by "BWP state index", "BWP state" and/or "BFD BWP?".

In various embodiments, the L1 signaling, e.g. according to embodiments above, refers to BFD on an active BWP, e.g. L1 signaling enables/disables/turns ON/turns OFF BFD on an active BWP. In various embodiments, the BWP is in the same cell and/or is the same BWP on which the L1 signaling was received. In various embodiments, the BWP is in another cell and/or another BWP, e.g. as indicated by a carrier indicator and/or BWP indicator in the L1 signaling. In various embodiments. L1 signaling indicates a BWP switch and also if BFD is to be turned ON or OFF on the BWP the UE switches to.

In various embodiments, L1 signaling, e.g. a DCI, can be used to turn ON or OFF individual or set(s) of BFD-RS. For example, a larger set of BFD-RS can be configured for a cell and/or BWP by RRC and/or MAC CE signaling, and a subset of those BFD-RS can be selected for a cell and/or BWP by L1 signaling. In some embodiments, RRC and/or MAC CE can configure one or more sets of BFD-RS, which individually can be turned ON/OFF with L1 signaling. For example, L1 signaling can select one set out of one or more sets configured by RRC and/or MAC CE. In some embodiments, an empty set can be configured by RRC and/or MAC CE and selected by L1 signaling. In some embodiments, an empty set can be selected by L1 signaling even though it has not been explicitly configured by RRC and/or MAC CE. In some embodiments, selecting an empty set of BFD-RS means that BFD is turned OFF on the cell and/or BWP. In various embodiments, a set of ON BFD-RS is indicated/selected by L1 signaling from a set of explicitly configured BFD-RS, e.g. in a DL BWP RRC configuration, such as in RadioLinkMonitoringConfig, or from a subset of the explicitly RRC configured BFD-RS, where the subset has been selected by MAC CE signaling. In various embodiments, a set of BFD-RS indicated/selected by L1 signaling is a set of implicitly defined BFD-RS, e.g. RS indicated to be currently QCL with monitored CORESET(s). In some embodiments, a set is confined to a single BWP. In some embodiments, a set spans one or multiple BWP(s) of one or more cell(s), e.g. in a frequency band, frequency band combination, and/or frequency range.

In some embodiments, indicated/selected set(s) of BFD-RS by L1 signaling means that all BFD-RS in the set are enabled or ON, whereas other not indicated/selected set(s) of BFD-RS by L1 signaling means that all BFD-RS in the set are disabled or OFF.

Exemplary UE Procedures

Figure 9:
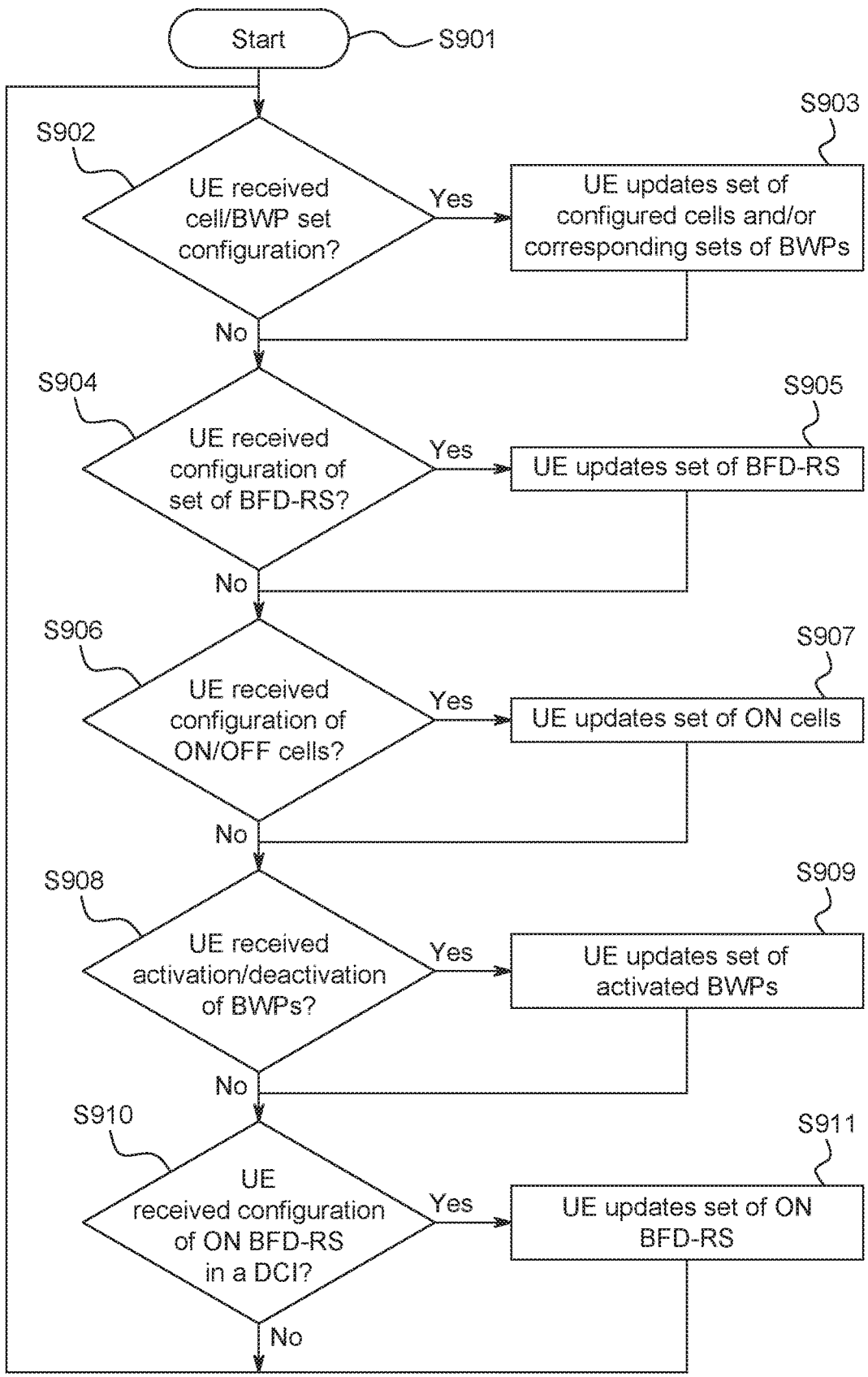
FIG. 9 is a flowchart of a process performed at the UE for selecting a set of active BFD-RS cells.

Various embodiments of UE procedure for selecting a set of ON BFD-RS are illustrated in FIG. 9. The numbered steps in the flow chart are discussed below. Various embodiments include only a part of the steps and/or in a different order.

Step S901. See various embodiments for the description for FIG. 4 and/or FIG. 5.

Step S902. See various embodiments for the description for FIG. 4 and/or FIG. 5.

Step S903. See various embodiments for the description for FIG. 4 and/or FIG. 5.

Step S904. A query is made regarding whether a UE receives from the network a configuration of BFD-RS or a set of BFD-RS, according to various embodiments. e.g. explicitly or implicitly RRC configured per DL BWP. In various embodiments a UE also receives a MAC CE that selects a subset of BFD-RS from an RRC configured set of BFD-RS. If the response to the query is affirmative, the process proceeds to step S905, but if it is negative the process proceeds to step S906.

Step S905. A UE updates a set of BFD-RS based on received RRC configuration and/or subset of BFD-RS based on received MAC CE configuration.

Step S906. See various embodiments for the description for FIG. 4 and/or FIG. 5.

Step S907. See various embodiments for the description for FIG. 4 and/or FIG. 5.

Step S908. A query is made regarding whether a UE receives a configuration from the network, e.g. MAC CE and/or DCI, that indicates activation and/or deactivation of BFD, NBI and/or BFR for one or more cells. If the response is affirmative, the process proceeds to step S909, but if negative the process proceeds to Step S910.

Step S909. If the UE received a configuration about BFD/NBI/BFR activation/deactivation the UE may update the set of BFD-activated cells and set of BFD-deactivated cells accordingly. In various embodiments, such set(s) are not explicitly maintained in the UE. Instead, an BFD activated/deactivated state for each configured and/or ON cell is maintained.

Step S910. Note that various embodiments, the order of steps Step S902/3, Step S904/5, Step S906/7 and Step S908/9 is different, e.g. ON/OFF configuration in Step S906/7 is received prior to BFD-RS configuration in Step S904/5. In various embodiments, a UE receives a subset of the configurations mentioned in steps Step S902-9, for example, a UE receives only a configuration of ON/OFF cells.

In various embodiments, a UE receives a DCI on an activated BWP, e.g. a BWP in an ON cell, where the DCI indicates a set of BFD-RS. For example, the DCI indicates which of the BFD-RS configured in steps S904/5 that are currently ON, according to various embodiments. The DCI may also indicate, explicitly or implicitly which BFD-RS that are OFF.

Step S911. If the UE received a configuration of ON BFD-RS in a DCI, the UE updates the set ON BFD-RS. The DCI may indicate which of the BFD-RS configured in steps Step S904/5 that are currently ON, according to various embodiments. In various embodiments, the DCI may turn BFD-RS ON/OFF in the same BWP, cell and/or band as the DCI was received.

UE-Based Selection Rule/Procedure/Criteria for BFD Management Alternative Embodiments In various embodiments, a selection of a set of BFD-cells and/or set of ON BFD-RS is performed by the UE. In some embodiments, the selection is based on a predefined rule and/or procedure, e.g. as described in a technical specification and/or as configured by the network. In some embodiments, parameters used in such a rule and/or procedure are predefined. In some embodiments, parameters used in such a rule and/or procedure are configured by the network, e.g. using RRC, MAC and/or L1 signaling. In various embodiments, a selection may be partly or fully up to the UE implementation. For example, a criterion, e.g. a threshold, may be predefined and/or configured and it is up to UE implementation to select among the cells and/or BFD-RS that meet the criterion, e.g. exceed a threshold.

In various embodiments, multiple selection rules/procedures are supported, and the network configures which to use, potentially including an associated set of parameters.

In various embodiments, a UE determines a first set of BFD cells/BWP, BFD-RS, BFD-RS of a first type and/or BFD-RS of a second type according to various configurations from the network, e.g. cells/BWPs with BFD enabled, the BFD-RS configured on such cells/BWPs, the set of ON cells, the set of ON BWPs and/or the set of BFD-activated cells/BWPs, e.g. according to various embodiments described herein such as illustrated in FIG. 5, FIG. 6, FIG. 8 and FIG. 9. If such a first determined set of BFD cells, BWPs and/or BFD-RS does not exceed the relevant BFD-related UE capability, the UE uses the first set for BFD (e.g. as BFD cells, BFD BWPs and/or ON BFD-RS). If such a first determined set of BFD cells, BWPs and/or BFD-RS exceeds the relevant UE capability, the UE applies a selection rule/procedure/criterion in order to determine a second set of BFD cells, BWPs and/or BFD-RS that does not exceed the capability. Then, the UE does not use the first set for BFD but instead uses the second set for BFD (e.g. as BFD cells, BFD BWPs and/or ON BFD-RS), since it doesn't exceed the UE capability. Depending on if the UE capability is per frequency band, frequency band combination and/or UE, the selection rule/procedure/criterion is applied per frequency band, frequency band combination and/or UE. In some embodiments, the BFD-related UE capability has component(s) per frequency band and per UE. In this case the selection rule/procedure/criterion may be applied considering both the per band capability and the per UE capability, in order not to exceed the UE capability (or any components thereof).

Cell/BWP Selection Rule/Procedure

In various embodiments, a UE may be configured with more cells and/or BWPs with BFD enabled than its UE capability. In some cases, the number of ON cells with BFD enabled (e.g. first set of BFD cells) exceeds a corresponding UE capability. In some cases, the number of active BWPs with BFD enabled exceeds a corresponding UE capability. In some cases, the number of BFD-RS of a first type (e.g. periodic CSI-RS) across all active BWPs with BFD enabled in ON cells, e.g. in a frequency band, in a frequency band combination or for the UE, exceeds a corresponding UE capability. In some cases, the number of BFD-RS of a second type (e.g. SSB) across all active BWPs with BFD enabled in ON cells, e.g. in a frequency band, in a frequency band combination or for the UE, exceeds a corresponding UE capability. In some cases, the total number of BFD-RS (e.g. periodic CSI-RS and SSB) across all active BWPs with BFD enabled in ON cells, e.g. in a frequency band, in a frequency band combination or for the UE, exceeds a corresponding UE capability.

In various embodiments, the UE selects as set of BFD-cells a subset of the ON cells and/or active BWPs with BFD enabled such that its corresponding BFD UE capability is not exceeded. In various embodiments, the size of the selected set of BFD-cells matches a corresponding UE capability. e.g. the capability is just not exceeded. In various embodiments, a UE does not select a set of BFD-cells if the number of ON cells with BFD enabled does not exceed the UE capability. In various embodiments, the selection rule is predefined so that the selected set of BFD-cells is known to the network, even though the rule/procedure was applied by the UE.

In various embodiments, a first set of BFD cells is denoted $C_{ON}$, e.g. a set of simultaneously ON cells with BFD enabled (e.g. by RRC configuration) and/or BFD activated (e.g. by MAC CE). In various embodiments, a set of BFD-cells is denoted $C_{BFD}$, e.g. a second set of BFD cells.

In various embodiments, e.g. when a UE capability is the form of maximum number of BFD cells and/or BFD BWPs, a UE capability of the maximum size of $C_{BFD}$ is denoted $C_{max}$. In various embodiments, a UE selects $C_{BFD}=C_{ON}$ if $|C_{ON}| \leq C_{max}$, i.e. the UE capability is not exceeded ($|C|$ denotes the size of a set C). On the other hand, if $|C_{ON}|>C_{max}$, a UE selects $C_{BFD}$ as a subset of $C_{ON}$, for instance according to various embodiments that follow. In various embodiments, it is selected such that $|C_{BFD}|=C_{max}$ or $|C_{BFD}|<C_{max}$ or $|C_{BFD}| \leq C_{max}$.

In various embodiments, a UE capability is in the form of the maximum number of BFD-RS, e.g. of a first or second type, across the two types, per frequency band, per band combination, per UE, or a combination thereof. The maximum size of $C_{BFD}$ may depend on which cells/BWPs that are selected and how many BFD-RS (e.g. of a first type, a second type and/or combined across the two types) that are configured in the selected cells/BWPs. Let $D_{max,i}$ denote a BFD-related UE capability, where i is a capability index or an index among the capability components. For the $i^{th}$ capability, a function $C_{api}(C)$ can be defined, which maps a set of cells/BWPs to a value corresponding to the $i^{th}$ capability value, i.e. $C_{api}(C)$ can be directly compared with the capability value. As an example, consider a UE capability in the form of the maximum number of BFD-RS of a first type (e.g. periodic CSI-RS) in a frequency band. As an example, if the maximum capability value is 8 and the capability has index i=1, then $D_{max,2}=8$. In the example, $C_{ap2}(C)$ maps a set of selected cells to a number of BFD-RS of a first type in a frequency band, i.e. according to the UE capability. For instance, $C_{ap2}(C_{ON})=12$ may mean that there are totally 12 configured BFD-RS of a first type in a frequency band among the cells in the set $C_{ON}$. In another example in which the UE capability is in the form of the maximum number of BFD cells, the mapping function may be as in the example in the previous paragraph, i.e. $C_{api}(C)=|C|$.

In various embodiments, a UE selects $C_{BFD}=C_{ON}$ if $C_{api}(C_{ON}) \leq D_{max,i}$ for each index i corresponding to a BFD-related UE capability, i.e. the UE capability is not exceeded. On the other hand, if $C_{api}(C_{ON})>D_{max,i}$ for some index i corresponding to a BFD-related UE capability, a UE selects $C_{BFD}$ as a subset of $C_{ON}$, for instance according to various embodiments that follow. In various embodiments, it is selected such that $C_{api}(C_{BFD})=D_{max,i}$ or $C_{api}(C_{BFD})<D_{max,i}$ or $C_{api}(C_{BFD}) \leq D_{max,i}$, in various combinations, for the indices i corresponding to BFD-related UE capabilities.

In the embodiment descriptions below, a number of cell and/or BWP selection rules/procedures/criteria are described. Examples based on a UE capability in the form of a maximum number of BFD cells and/or BFD BWPs are given, i.e. $C_{max}$ in examples above. For brevity, other examples with other forms of BFD-related UE capabilities, i.e. $D_{max,i}$ in examples above, are not presented. However, the cell and/or BWP selection rules/procedures/criteria are equally applicable to a scenario with such other forms of BFD-related UE capabilities, e.g. by replacing |C| with $C_{api}(C)$ and $C_{max}$ with $D_{max,i}$ as outlined above.

Selection Based on Cell/BWP Index

In various embodiments, the UE selects $C_{BFD}$ as a subset of $C_{ON}$, according to a cell index and/or active BWP index, e.g. ServingCellIndex or SCellIndex, of the cells in $C_{ON}$. For example, cells in $C_{ON}$, e.g. $C_{max}$ cells, with lowest and/or highest cell index(es) are included in $C_{BFD}$.

A motivation to use such a selection method could be that it is simple and that the network can control the order/priority with which the UE includes cells in $C_{BFD}$ by the configured association between cell and cell index (and/or BWP and BWP index). For example, if the UE includes the cells with lowest cell index in $C_{BFD}$, the network can assign the lowest cell indices to the cells the network prefers the UE perform BFD on.

Selection Based on Time in a Cell/BWP State

In various embodiments, the UE selects $C_{BFD}$ as a subset of $C_{ON}$, according to a time duration the cells/BWPs have been in the present cell/BWPs state. For example, cells/BWPs in $C_{ON}$, e.g. $C_{max}$ cells, with longest and/or shortest duration in the present state are included in $C_{BFD}$. In various embodiments, a time duration the cells/BWPs have been in an ON state is considered, where ON state may comprise one or more states, e.g. activated and dormant states.

A motivation to include a cell with long time in an ON state in $C_{BFD}$ could be that such a cell is likely used as a form of anchor cell with relatively frequent transmissions, which could include various control information. On the other hand, cells with a short time in an ON state are more likely to be used as a form of data booster cell that is more frequently switched between states depending on the UE traffic.

Selection Based on Inactivity Time in a Cell/BWP

In various embodiments, the UE selects $C_{BFD}$ as a subset of $C_{ON}$, according to one or more inactivity time duration(s) of the cells and/or BWPs. For example, cells/BWPs in $C_{ON}$, e.g. $C_{max}$ cells/BWPs, with longest and/or shortest inactivity are included in $C_{BFD}$.

A cell inactivity time could for instance be similar to sCellDeactivationTimer timer as defined in [3GPP Technical Specification 38.321, V15.3.0, September 2018, or "38.321"]. A BWP inactivity timer could for instance be similar to bwp-InactivityTimer timer as defined in [38.321]. Various embodiments of an inactivity time on a first cell/BWP is the minimum time of all or a subset of the following times the time since a PDCCH (e.g. addressed to C-RNTI and/or CS-RNTI) on the first cell/BWP indicates an uplink grant or downlink assignment; and/or the time since a PDCCH on a second cell scheduling the first cell indicates an uplink grant or a downlink assignment for the first cell; and/or the time since a MAC PDU is transmitted in a configured uplink grant or received in a configured downlink assignment on the first cell; and/or the time since a DL BWP and/or UL BWP switch on the first cell; and/or the time since the cell state of the first cell has changed.

A motivation to include a cell with long inactivity time in $C_{BFD}$ could be that also beam management may have been inactive for a long time. e.g. if aperiodic and/or semi-persistent beam management RS transmission and/or reporting is used. Therefore, the risk may be greater than the UE has experienced some blocking without the network knowing about it.

In various embodiments, the inactivity time duration that triggers a cell/BWP switch into an OFF state is taken into account. For example, cells/BWPs with longest inactivity, but with a certain time margin (e.g. predefined or RRC configured) until an inactivity timer-trigger switches them to OFF state, are included in $C_{BFD}$.

A motivation to include a cell with short inactivity time in $C_{BFD}$ could be that it may be more important to recover a cell that is frequently active than a cell that is not (for a UE).

Selection Based on Cell Frequency

In various embodiments, the UE selects $C_{BFD}$ as a subset of $C_{ON}$, according to the frequency, e.g. cell DL frequency, of the cells. A cell frequency may be represented for example, by an absolute frequency of a cell-defining SSB (e.g. by parameter absoluteFrequencySSB in FrequencyInfoDL IE in [38.331]), absolute frequency of reference point A (e.g. by parameter absoluteFrequencyPointA in FrequencyInfoDL IE in [38.331]) and/or the absolute frequency of the first PRB of the initial DL BWP (e.g. given partly by parameter locationAndBandwidth in BWP IE in [38.331]). For example, cells in $C_{ON}$, e.g. $C_{max}$ cells, with highest and/or lowest frequency are included in $C_{BFD}$. In various embodiments, a UE selects cells for inclusion in $C_{BFD}$ based on the frequency of the cell, according to a function that maps a cell's frequency to a priority to be included in $C_{BFD}$, where the function may be predefined and/or fully/partly configured.

A motivation to include a cell with high frequency in $C_{BFD}$ could be that beam failure may be more likely on cells on higher frequencies than cells on lower frequencies.

Selection Based on Frequency Band of Cell/BWP

A frequency band is a contiguous or non-contiguous frequency range. In various embodiments, a cell and/or BWP is in a frequency range and a frequency range may contain one or more cells. In various embodiments, frequency bands partly overlap in frequency, which means that a cell and/or BWP may be in multiple frequency bands.

In various embodiments, the set of cells and/or BWPs $C_{ON}$ are located on a set of frequency band(s) denoted $B_{ON}$, where a cell/BWP in $C_{ON}$ may be located in a non-strict subset of $B_{ON}$ (a non-strict subset of a set S may be equal to the set S). In various embodiments, the set of selected cells/BWP $C_{BFD}$ are located on a set of frequency band(s) denoted $B_{BFD}$, where a cell/BWP in $C_{BFD}$ may be located in a non-strict subset of $B_{BFD}$. Note that also other uses of "subset" herein refer to a non-strict subset, which is the common use of the term "subset", which refers to less than all of the elements of a set. However, as used herein non-strict subset should be construed to include either less than all of the elements of the set, or the same elements as the set.

In various embodiments, a UE selects $C_{BFD}$ as a subset of $C_{ON}$, based on the frequency band(s) in which of the cells/BWPs are located.

In various embodiments in which $|B_{ON}| \leq C_{max}$, the cells/BWPs in $C_{BFD}$ are selected such that $B_{BFD}=B_{ON}$, i.e. at least one cell/BWP in each frequency band in $B_{ON}$ is selected for $B_{BFD}$. A motivation for such a selection method may be that beam failure events may be correlated across cells/BWPs in the same band, e.g. due to blocking. For instance, if beam failure occurs in one cell/BWP, the risk is high that it has also happened in another cell/BWP in the same band.

In some embodiments, there is a candidate set of cells/BWPs in $C_{ON}$ which are located in the same frequency band, from which a UE may select one or more cell(s)/BWP(s) for inclusion in $C_{BFD}$. In various embodiments, it is up to the UE to select which cell(s)/BWP(s) from the candidate set to include in $C_{BFD}$ as long as $B_{BFD}=B_{ON}$. In various embodiments, a UE uses one or more selection criterion/criteria to select which cell(s)/BWP(s) from the candidate set to include in $C_{BFD}$, including according to various embodiments described in this disclosure, for example, based on cell/BWP index, time in a state, inactivity time, cell/BWP frequency, priority value, services/QoS of the services to be carried over a cell/BWP, cell group configurations, etc.

For example, consider one or more of candidate set(s) of cells/BWPs in $C_{ON}$, where cells/BWPs in the same candidate set are located in the same frequency band. In order to achieve $B_{BFD}=B_{ON}$, one or more cells/BWPs from each candidate set should be selected for inclusion in $C_{BFD}$. The UE first selects a first cell/BWP from each candidate set according to one or more selection criterion/criteria, including according to various embodiments described in this disclosure, for example, based on cell/BWP index, time in a state, inactivity time, cell/BWPs frequency, priority value, services/QoS of the services to be carried over a cell/BWP, cell group configurations, etc. After selecting a first cell/BWPs from each candidate set for inclusion in $C_{BFD}$, i.e. $|B_{ON}|$ cells/BWPs, the UE has already achieved $B_{BFD}=B_{ON}$. Now, if $|B_{ON}|<C_{max}$, the UE may select another $C_{max}-|B_{ON}|$ cells/BWPs for inclusion in $C_{BFD}$. This second selection may be according to the same criterion/criteria as the first selection or it may be according to other criterion/criteria or it may be up to the UE implementation.

In various embodiments, e.g. in which $|B_{ON}|>C_{max}$, the cells/BWPs in $C_{BFD}$ are selected such that $|B_{BFD}|$ is maximized. In various embodiments, the cells/BWPs in $C_{BFD}$ are selected such that each cell/BWP in $C_{BFD}$ is located in a different frequency band. In various embodiments. e.g. when no cell/BWP in $C_BFD$ is located in multiple frequency bands, $|B_{BFD}|=C_{max}$. In various embodiments, e.g. when a cell/BWP in $C_{BFD}$ is located in multiple frequency bands, $|B_{BFD}|>C_{max}$. In various embodiments, a UE uses one or more selection criterion/criteria to select which band(s) from $B_{ON}$ to include in $B_{BFD}$. In some embodiments, the selection of band is based on the selection of cells/BWPs, e.g. with an additional constraint related to the number of selected cells/BWPs per band, e.g. at most a single cell/BWP per band is selected. In some embodiments, the selection of band is based on the band frequency (e.g. lowest or highest frequency of the band definition), a band index, a predefined and/or configured band priority for BFD, NBI and/or BFR.

In various embodiments, the frequency range (FR) in which a cell/BWP is located is used to select if it's included in $C_{BFD}$. Frequency ranges are for example
 below or above 7.125 GHz (also denoted FR1 and FR2)
 below 3 GHz, between 3 and 24.25 GHz and above 24.25 GHz For instance, if a cell/BWP is located in certain frequency range(s), it is not included in $C_{BFD}$, in various embodiments, in some cases even if the cell/BWP is selected using another criterion/rule/procedure. In some cases, another cell/BWP is selected instead. In other cases, another cell/BWP is not selected instead. In various embodiments in which at least one cell/BWP from each "group" is to be included in $C_{BFD}$, where a group may be for instance cells/BWP located in the same frequency band, belonging to the same TAG, etc., if all cells in the group are located in certain frequency range(s), the group is excluded from the selection, i.e. UE may omit selecting at least one cell/BWP from the group into $C_BFD$. The certain frequency range(s) for which the above applies, may be predefined in a specification and/or configured by the network, in various embodiments.

In some cases, the network configures a UE with one or more groups of cells and/or BWPs for simultaneous activation of TCI state ID(s) for CORESET(s) and/or PDSCH by MAC $C_{max}$. For example, the network configures the UE with two groups of cells, with the cells in the first group being in one frequency band and the cells in the second group being in a second frequency band. In this example, a group may correspond to a frequency band. In other examples, a group contains cells from multiple frequency bands. When the UE receives a MAC CE activating a TCI state ID for a CORESET ID of a cell in the second group, it activates the TCI state ID for CORESETs with the same ID in all cells in the second group. This functionality can be useful for example if the network knows that the same beam(s) will be used in multiple cells. By simultaneous TCI state ID activation across multiple cells, instead of individual activation, signaling overhead can be reduced. The groups may in one example be configured by RRC using one or more lists of cells (e.g. simultaneousTCI-CellList1 is sequence(size of (1, . . . , maxNrofServingCells)) of ServCellIndex and simultaneousTCI-CellList2 is sequence(size of (1, . . . , maxNrofServingCells)) of ServCellIndex, etc). The groups may in one example be configured by RRC using a list where each element includes a serving cell index and a group/list ID (e.g. simultaneousTCI-CellList is sequence (size of (1, . . . , maxNrofServingCells)) of X and X includes both ServCellIndex and simultaneousTCI-CellListId, where simultaneousTCI-CellListId may be 0 or 1 for example).

In various embodiments, the set of cells and/or BWPs $C_{ON}$ are located on a set of group(s) denoted $B_{ON}$, where a cell/BWP in $C_{ON}$ may be located in a non-strict subset of $B_{ON}$. In some cases, not all cells and/or BWPs in $C_{ON}$ are contained in the configured set of group(s), e.g. through the list(s) described above. In some cases, each cell in $C_{ON}$ that is not configured in a group may be given its own group (containing one cell) in $B_{ON}$. In some cases, a selection method is first used for cells in $C_{ON}$ that are configured in a group and second for cell in $C_{ON}$ that are not configured in a group. In other cases, a selection method is first used for cells in $C_{ON}$ that are not configured in a group and second for cell in $C_{ON}$ that are configured in a group. In various embodiments, the set of selected cells/BWP $C_{BFD}$ are located in a set of group(s) denoted $B_{BFD}$, where a cell/BWP in $C_{BFD}$ may be located in a non-strict subset of $B_{BFD}$. In some cases, a cell may be located in at most one group.

In various embodiments, a UE selects $C_BFD$ as a subset of $C_{ON}$, based on the group (s) in which of the cells/BWPs are located.

In various embodiments in which $|B_{ON}|\leq C_{max}$, the cells/BWPs in $C_{BFD}$ are selected such that $B_{BFD}=B_{ON}$, i.e. at least one cell/BWP in each group in $B_{ON}$ is selected for $B_{BFD}$. A motivation for such a selection method may be that beam failure events may be correlated across cells/BWPs in the same group, e.g. since the same set of beams are used for cells within a group.

In some embodiments, there is a candidate set of cells/BWPs in $C_{ON}$ which are located in the same group, from which a UE may select one or more cell(s)/BWP(s) for inclusion in $C_{BFD}$. In various embodiments, it is up to the UE to select which cell(s)/BWP(s) from the candidate set to include in $C_{BFD}$ as long as $B_{BFD}=B_{ON}$. In various embodiments, a UE uses one or more selection criterion/criteria to select which cell(s)/BWP(s) from the candidate set to include in $C_{BFD}$, including according to various embodiments described in this disclosure, for example, based on cell/BWP index, time in a state, inactivity time, cell/BWP frequency, priority value, services/QoS of the services to be carried over a cell/BWP, cell group configurations, etc.

For example, consider one or more of candidate set(s) of cells/BWPs in $C_{ON}$, where cells/BWPs in the same candidate set are located in the same group. In order to achieve $B_{BFD}=B_{ON}$, one or more cells/BWPs from each candidate set (group) should be selected for inclusion in $C_{BFD}$. The UE first selects a first cell/BWP from each candidate set (group) according to one or more selection criterion/criteria, including according to various embodiments described in this disclosure, for example, based on group index, cell/BWP index, time in a state, inactivity time, cell/BWPs frequency, priority value, services/QoS of the services to be carried over a cell/BWP, cell group configurations, etc. After selecting a first cell/BWPs from each candidate set (group) for inclusion in $C_{BFD}$, i.e. $|B_{ON}|$ cells/BWPs, the UE has already achieved $B_{BFD}=B_{ON}$. Now, if $|B_{ON}|<C_{max}$, the UE may select another $C_{max}-|B_{ON}|$ cells/BWPs for inclusion in $C_{BFD}$. This second selection may be according to the same criterion/criteria as the first selection or it may be according to other criterion/criteria or it may be up to the UE implementation.

In various embodiments, e.g. in which $|B_{ON}|>C_{max}$, the cells/BWPs in $C_{BFD}$ are selected such that $|B_{BFD}|$ is maximized. In various embodiments, the cells/BWPs in $C_{BFD}$ are selected such that each cell/BWP in $C_{BFD}$ is located in a different group. In various embodiments, e.g. when no cell/BWP in $C_{BFD}$ is located in multiple groups, $|B_{BFD}|=C_{max}$ (in some cases the configured groups need to be disjoint). In various embodiments, e.g. when a cell/BWP in $C_{BFD}$ is located in multiple groups, $|B_{BFD}|>C_{max}$. In various embodiments, a UE uses one or more selection criterion/criteria to select which group(s) from $B_{ON}$ to include in $B_{BFD}$. In some embodiments, the selection of group is based on the selection of cells/BWPs, e.g. with an additional constraint related to the number of selected cells/BWPs per band. e.g. at most a single cell/BWP per band is selected. In some embodiments, the selection of group is based on the group index. In some embodiments in which the cells in $C_{ON}$ that are not in any RRC configured group are placed in their own groups in $B_{ON}$, the UE first selects cells for $C_{BFD}$ from the RRC configured groups in $B_{ON}$.

Selection Based on Cell/BWP Priority Value

In various embodiments, a cell and/or BWP has one or more priority value(s) related to BFD, NBI and/or BFR. In various embodiments, a UE uses a cell/BWP priority value as a criterion for selecting cells/BWPs for inclusion in $C_{BFD}$, for example, the $C_{max}$ cells/BWPs with highest and/or lowest priority values.

In various embodiments, a priority value for a cell and/or BWP is configured by the network, e.g. as a part of an RRC configuration. In some embodiments, a priority value for a cell and/or BWP could be included in a cell configuration, such as ServingCellConfig. In some embodiments, a priority value for a cell and/or BWP could be included in a DL BWP or UL BWP configuration, such as in a radioLinkMonitoringConfig (in a DL BWP configuration) or in a BeamFailureRecoveryConfig (in an UL BWP configuration).

Selection Based on Service/QoS Associated with Cell/BWP

In various embodiments, a cell and/or BWP may be associated with one or more service type(s), e.g. eMBB and/or URLLC. In various embodiments, a cell and/or BWP may be associated with one or more QoS class(es), category(ies) and/or level(s). In various embodiments, such association is configured by the network. In some embodiments, such association is setup by default. In some embodiments, such association is configured implicitly.

In various embodiments, a UE uses the service type(s) associated with cell(s)/BWP(s) to select which cell(s)/BWP(s) to include in $C_{BFD}$, for example, the $C_{max}$ cells/BWPs with highest requirement(s) on reliability and/or latency.

In various embodiments, a UE uses the QoS associated with cell(s)/BWP(s) to select which cell(s)/BWP(s) to include in $C_{BFD}$, for example, the $C_{max}$ cells/BWPs with highest QoS requirements, e.g. in terms of block error rate, latency etc.

In various embodiments, a cell/BWP is associated with one or more flows and/or logical channels. In various embodiments, such a flow and/or logical channel is associated with one or more service type(s) and/or QoS. In various embodiments, a UE selects a flow/logical channel to represent the cell/BWP in terms of service type/QoS for the purpose of cell/BWPs selection for inclusion in $C_{BFD}$, e.g. the flow/logical channel with highest requirement(s) on reliability and/or latency.

Selection Based on TAG of Cell

In various embodiments, a time advance group (TAG) is a group of cell(s) and/or BWP(s) for which the UE applies the same transmission time advance for UL transmissions. Cells/BWPs belonging to the same TAG often means that they are transmitted from the same transmission point or at least from quasi co-located transmission points. This may result in that beam failures etc. between cells/BWPs in the same TAG are correlated.

In various embodiments, each or some of the cell(s) and/or BWP(s) $C_{ON}$ belong to a TAG. The set of TAG(s) to which cells/BWPs in $C_{ON}$ belong is denoted $T_{ON}$. In some embodiments, each cell/BWP belongs to a TAG. In some embodiments, a cell/BWP in $C_{ON}$ may belong to zero or one TAG. In various embodiments, the set of selected cells/BWP $C_{BFD}$ belong to a set of TAG(s) denoted $T_{BFD}$.

In various embodiments, a UE selects $C_{BFD}$ as a subset of $C_{ON}$, at least partly based on the TAG(s) to which the cells/BWPs belong.

In various embodiments in which $|T_{ON}|\leq C_{max}$, the cells/BWPs in $C_{BFD}$ are selected such that $T_{BFD}=T_{ON}$, i.e. at least one cell/BWP in each TAG in $B_{ON}$ is selected for $B_{BFD}$. A motivation for such a selection method may be that beam failure events may be correlated across cells/BWPs in the same TAG, e.g. due to blocking. For instance, if beam failure occurs in one cell/BWP, the risk is high that it has also happened in another cell/BWP in the same TAG.

In some embodiments, there is a candidate set of cells/BWPs in $C_{ON}$ which are located in the same TAG, from which a UE may select one or more cell(s)/BWP(s) for inclusion in $C_{BFD}$. In various embodiments, it is up to the UE to select which cell(s)/BWP(s) from the candidate set to include in $C_{BFD}$ as long as $B_{BF}m=B_{ON}$. In various embodiments, a UE uses one or more selection criterion/criteria to select which cell(s)/BWP(s) from the candidate set to include in $C_{BFD}$, including according to various embodiments described in this disclosure, for example, based on cell/BWP index, time in a state, inactivity time, cell/BWP frequency, priority value, service/QoS of a cell/BWP, cell group configurations, etc.

For example, consider one or more of candidate set(s) of cells/BWPs in $C_{ON}$, where cells/BWPs in the same candidate set are located in the same TAG. In order to achieve $T_{BFD}=T_{ON}$, one or more cells/BWPs from each candidate set should be selected for inclusion in $C_{BFD}$. The UE first selects a first cell/BWP from each candidate set according to one or more selection criterion/criteria, including according to various embodiments described in this disclosure, for example, based on cell/BWP index, time in a state, inactivity time, cell/BWPs frequency, priority value, service/QoS of a cell/BWP, cell group configurations, etc. After selecting a first cell/BWPs from each candidate set for inclusion in $C_{BFD}$, i.e. $|T_{ON}|$ cells/BWPs, the UE has already achieved achieve $T_{BFD}=T_{ON}$. Now, if $|T_{ON}|<C_{max}$, the UE may select another $C_{max}-|T_{ON}|$ cells/BWPs for inclusion in $C_{BFD}$. This second selection may be according to the same criterion/criteria as the first selection or it may be according to other criterion/criteria or it may be up to the UE implementation.

In various embodiments. e.g. in which $|T_{ON}|>C_{max}$, the cells/BWPs in $C_{BFD}$ are selected such that $|T_{BFD}|$ is maximized. In various embodiments, the cells/BWPs in $C_{BFD}$ are selected such that each cell/BWP in $C_{BFD}$ is located in a different TAG. In various embodiments, e.g. when no cell/BWP in $C_{BFD}$ is located in multiple TAGs, $|T_{BFD}|=C_{max}$. In various embodiments, e.g. when a cell/BWP in $C_{BFD}$ is located in multiple TAGs, $|T_{BFD}|>C_{max}$. In various embodiments, a UE uses one or more selection criterion/criteria to select which TAG(s) from $T_{ON}$ to include in $T_{BFD}$. In some embodiments, the selection of TAG is based on the selection of cells/BWPs. e.g. with an additional constraint related to the number of selected cells/BWPs per TAG. e.g. at most a single cell/BWP per TAG is selected. In some embodiments, the selection of TAG is based on the time advance of the TAG (e.g. lowest or highest TA), a TAG index, a predefined and/or configured TAG priority for BFD, NBI and/or BFR.

Selection Based on Cell Type

In various embodiments, cells are differentiated in different types. In various embodiments, a UE uses a cell type to select cell(s) for inclusion in $C_{BFD}$. Examples of cell different types are:

PCell, PSCell and SCells
SpCell (includes PCell and PSCell) and SCell
PUCCH cell (e.g. SpCell(s), PUCCH SCell(s)) and non-PUCCH cell(s)
Cells configured to schedule other cell(s), e.g. with cross-carrier scheduling with PDCCH In various embodiments, a UE first includes SpCell(s) (PCell and PSCell, if defined) among the cells in $C_{BFD}$. Secondly, if $C_{BFD}$ is greater than the number of SpCell(s), the UE uses another criterion/rule/procedure to select SCells for inclusion in $C_{BFD}$, e.g. according to embodiment(s) described in this disclosure.

In various embodiments, a UE prioritizes including PUCCH cell(s) (PCell and PSCell, if defined) among the cells in $C_{BFD}$ over non-PUCCH cells. For example, if the UE has one or more ON PUCCH SCell(s), they may be firstly included in $C_{BFD}$ before other SCells.

In various embodiments, a UE prioritizes cells for $C_{BFD}$ that are configured to schedule other cell(s) over cells that are configured to self-schedule only. In various embodiments, the previous two types (cross scheduling and self-scheduling) are further prioritized over cell(s) that are configured to be scheduled by other cell(s).

Selection Based on Explicitly and/or Implicitly Defined BFD-RS

In various embodiments, a UE is explicitly configured with BFD-RS, i.e. it is explicitly indicated that an RS should be used for BFD, sometimes in addition to other purposes such as beam management. e.g. in an RRC configuration such as in a RadioLinkMonitoringConfig. In various embodiments, a UE is implicitly configured with BFD-RS, e.g. when BFD-RS is not explicitly configured. When BFD-RS is implicitly configured, a UE uses RS defined/configured for other purposes also for BFD. For instance, an RS configured to be QCL, e.g. spatial QCL, with a CORESET/search space that a UE monitors, is an implicitly defined BFD-RS, in various embodiments.

Selection Based on BWP and BWP-Inactivity Timer Properties

In various embodiments, a UE is configured with a BWP-inactivity timer for a configured cell. In various embodiments, a UE can be explicitly configured with a default BWP. Without an explicitly configured default BWP, the default DL/UL BWP is the initial DL/UL BWP, in some embodiments.

In various embodiments, a UE prioritizes cells with a BWP-inactivity timer configured for inclusion in $C_{BFD}$. In various embodiments, a UE prioritizes cells/BWPs when the active DL BWP is the default DL BWP. In various embodiments, a UE prioritizes cells with a BWP-inactivity timer configured and the active DL BWP being the default BWP for inclusion in $C_{BFD}$.

A motivation to prioritize default DL BWP could be that BWP inactivity due to beam failure does not result in the UE switching BWP after inactivity timer expiry. For other cells (not yet on the default DL BWP) the UE may still switch active DL BWP to the default DL BWP after inactivity due to beam failure on the active DL BWP. Note that the set of configured and/or monitored BFD-RS may differ between BWPs.

Selection Based on UE Measurement

In various embodiments, a UE selects cells/BWPs to include in $C_{BFD}$ based on measurement results. In some embodiments, the UE performs a first type of measurement on cells/BWPs in $C_{ON}$, e.g. a measurement with lower complexity and/or power consumption than the BFD measurement. An example of such a measurement is an RSRP measurement, e.g. with relaxed measurement accuracy requirements. For a cell/BWP with multiple BFD-RS, an RSRP value could be obtained by averaging the measured RSRP across the multiple BFD-RS of the cell/BWP.

In various embodiments, a UE selects $\min(|C_{ON}|, C_{max})$ cells/BWPs with lowest measurement result, e.g. lowest RSRP, for inclusion in $C_{BFD}$. In various embodiments, a UE may select any cell/BWP with measurement result, e.g. RSRP, below a threshold for inclusion in $C_{BFD}$, where the threshold may be predefined or configured using RRC. Note that if the selection is based on the UE measurement result, the network may not be aware of the UE selection.

Selection Based on Cell State

In various embodiments, a UE selects cells/BWPs to include in $C_{BFD}$ based on cell state. In some embodiments, a UE prioritizes cells in activated cell state over cells in dormant cell state for inclusion in $C_{BFD}$. In some embodiments, a UE includes a cell/BWP in $C_{BFD}$ before a switch from dormant to activated cell state occurs, for example, at the time an SR has been transmitted on another cell, e.g. on the SpCell, which the UE expects to be followed by a grant received on the cell that switches from dormant to activated.

This approach may facilitate link recovery, if needed, on the cell that is about to become activated.

Multiple Selection Criteria

In various embodiments, a UE uses multiple selection criteria for selecting which cells and/or BWPs to include in $C_{BFD}$. For example, a primary and a secondary criterion are defined. In another example a primary, secondary and third criterion are defined.

In some embodiments, a UE uses a first selection criterion for inclusion of cells/BWPs in $C_{BFD}$. If the first criterion did not fully select cells/BWPs for $C_{BFD}$. e.g. since multiple cells are equivalent according to the first criterion, then a UE uses a second criterion for selecting cells/BWPs as tie-breaking. In some embodiments, a second criterion is used to resolve selection that was not resolved by using the first criterion. In some embodiments, a second criterion is used for selection of cells/BWPs without considering selection, e.g. partial selection, that was already achieved by the first criterion. A third criterion may be used similarly, if a second criterion was not sufficient. Some embodiments also include further criteria beyond a third.

For example, if a priority value is used as a primary criterion, cells are firstly included in $C_{BFD}$ based on a priority value. e.g. highest and/or lowest value. If, due to the priority values, selection among cells/BWPs with the same priority is required, a secondary criterion is used to select among those cells/BWPs, e.g. based on cell/BWP index.

In an example, a set of bands is selected in a first criterion, e.g. $B_{BFD}$ is selected for instance according to various embodiments in regarding frequency band of cell/BWP. If there are multiple cells/BWPs in a band, e.g. in $B_{BFD}$, a cell/BWP priority value is used as a secondary criterion to select among cells/BWPs located in a band. If there are multiple cells/BWPs in a band with the same priority value, a third criterion may be used, e.g. based on for instance cell/BWP index.

Note that even though multiple selection criteria are defined, they might not have to be used in many cases, e.g. if a first criterion is sufficient to completely select cells/BWPs for inclusion in $C_{BFD}$.

In various embodiments with multiple selection criteria, a UE uses as first, second, third, etc., selection criterion a combination of selection criteria/rules/procedures described in various embodiments in this disclosure, e.g. as described as variants on Cell/BWP Selection Rule/Procedures. In various embodiments, a last criterion, e.g. second or third criterion, is up to UE implementation. For instance, if further selection is needed after selection according to a first criterion or according to a first and second criteria, it is up to the UE how to finalize the selection.

In various embodiments in which it is, at least partly, up to the UE how to select cells and/or BWPs, the network may not be aware of the selection by the UE. In some embodiments, after selection of cells and/or BWPs, the UE indicates to the network which cells and/or BWPs that it selected. In some cases, an indication, e.g. a 1-bit indication, is included in a UCI that BFD is performed or not performed on a cell, e.g. the cell associated with the UCI and/or the cell associated with the PUCCH resource used to carry the UCI. In some embodiments, an indication which cells and/or BWPs the UE selected for BFD is included in a MAC CE from the UE to the network.

BFD-RS Selection Rule/Procedure

In various embodiments, a UE may be configured with more BFD-RS in ON cells and/or active BWPs than its UE capability, which is various embodiments is in the form of a maximum number of simultaneously monitored BFD-RS of a first type, a maximum number of simultaneously monitored BFD-RS of a second type, a maximum number of simultaneously monitored BFD-RS summed over of a first type and second type, per frequency band, per frequency band combination, and/or per UE. In various embodiments, the UE selects as set of ON BFD-RS a subset of the BFD-RS in ON cells and/or active BWPs with BFD enabled such that its corresponding BFD UE capability is not exceeded.

In various embodiments, the size of the selected set of ON BFD-RS matches a corresponding UE capability, e.g. the capability is just not exceeded. In various embodiments, the set of ON BFD-RS is the number of BFD-RS in ON cells and/or activated BWPs with BFD enabled, e.g. when this set does not exceed the UE capability. In various embodiments, the selection rule is predefined so that the selected set of ON BFD-RS is known to the network, even though the rule/procedure was applied by the UE.

In various embodiments, a set of BFD-RS configured on cells and/or active BWPs with BFD enabled (e.g. by RRC configuration) and/or BFD activated (e.g. by MAC CE and/or DCI) is denoted $R_{ON}$. In various embodiments, a set of ON BFD-RS for BFD is denoted $R_{BFD}$. In various embodiments, a UE capability of the maximum size of $R_{BFD}$ is denoted $R_{max}$. In various embodiments, a UE selects $R_{BFD}=R_{ON}$ if $|R_{ON}| \leq R_{max}$, i.e. the UE capability is not exceeded. On the other hand, if $|R_{ON}|>R_{max}$, a UE selects $R_{BFD}$ as a subset of $R_{ON}$, for instance according to various embodiments regarding BFD-RS Index, priority value, QCL properties, and multiple selection criteria. In various embodiments, it is selected such that $|R_{BFD}|=R_{max}$ or $|R_{BFD}|<R_{max}$ or $|R_{BFD}| \leq R_{max}$.

In various embodiments, there are multiple separate UE capabilities related to BFD-RS, such as on different types of BFD-RS and/or different frequency bands, etc. In such embodiments, selection rules/procedures may be applied such that each separate UE capability is not exceeded.

In various embodiments, a set of BFD-RS of a first type configured on cells and/or active BWPs with BFD enabled (e.g. by RRC configuration) and/or BFD activated (e.g. by MAC CE and/or DCI) is denoted $R_{ON,1}$. Similarly, a set of BFD-RS of a second type is denoted $R_{ON,2}$. In various embodiments, a set of ON BFD-RS of a first type for BFD is denoted $R_{BFD,1}$ and a set of ON BFD-RS of a second type for BFD is denoted $R_{BFD,2}$. In various embodiments, a UE capability of the maximum size of $R_{BFD,1}$ is denoted $R_{max,1}$ and a UE capability of the maximum size of $R_{BFD,2}$ is denoted $R_{max,2}$. In various embodiments, a UE selects $RBFD,i=R_{ON,i}$ if $|R_{ON,i}| \leq R_{max,i}$, i.e. the UE capability for BFD-RS of the $i^{th}$ type is not exceeded. On the other hand, if $|R_{ON,i}|>R_{max,i}$, a UE selects $R_{BMD,i}$ as a subset of $R_{ON,i}$, for instance according to various embodiments that follow. In various embodiments, it is selected such that $|R_{BFD,i}|=R_{max,i}$ or $|R_{BFD,i}|<R_{max,i}$ or $|R_{BFD,i}| \leq R_{max,i}$.

In various embodiments, some of the RS in the set $R_{ON}$ are implicitly configured BFD-RS, e.g. if a BFD-enabled cell/BWP is not explicitly configured with BFD-RS.

In various embodiments, a combination of BFD-RS selection and cell/BWP selection is used.

In various embodiments, a combination of UE capabilities of different forms is applicable, e.g. maximum number of BFD-RS of different types per frequency band and the combined maximum number of BFD-RS of different types per frequency band etc. In such embodiments, BFD-RS of different types, in different frequency bands, etc. may be selected jointly, such that each UE capability is not exceeded.

In the embodiment descriptions below, various examples of selection rules/procedures/criteria are described. The example with a UE capability in the form of a maximum number of ON BFD-RS, e.g. $R_{max}$. For brevity, other examples with other forms of BFD-RS-related UE capabilities, i.e. $R_{max,i}$ in examples above, are not presented. However, the BFD-RS selection rules/procedures/criteria are equally applicable to a scenario with such other forms of BFD-related UE capabilities, e.g. by replacing $R_{max}$ with $R_{max,i}$ etc., as outlined above.

Selection Based on BFD-RS Index

In various embodiments, the UE selects $R_{BFD}$ as a subset of $R_{ON}$, according to an index of the RS in $R_{ON}$, e.g. RadioLinkMonitoringRS-Id. SSB-Index, and/or NZP-CSI-RS-ResourceId. Note that, in various embodiments, such RS indices are often defined per cell and/or BWP, which means that the same set of possible indices may be used in each cell and/or BWP. For example, explicitly defined BFD-RS may be defined per DL BWP, e.g. in RadioLinkMonitoringConfig, and may be indexed from 0 to maxNrofFailureDetectionResources−1 (e.g. 9).

In various embodiments, BFD-RS in $R_{ON}$, e.g. $R_{max}$ BFD-RS, with lowest and/or highest index(es) are included in $R_{BFD}$.

In some embodiments, the RS with lowest and/or highest indices across all ON cells and/or active BWPs are included. For example, if there are any RS with index 0 in any ON cell and/or active BWP, it/they are first included in $R_{BFD}$. Then, if there are any RS with index 1 in any ON cell and/or active BWP, it/they are secondly included in $R_{BFD}$, etc., e.g. until $R_{max}$ is reached. Various such embodiments may result in an imbalanced inclusion in $R_{BFD}$ of BFD-RS from different ON cells and/or active BWPs. For example, all BFD-RS from some cells may be included, e.g. if they were configured with low indices, whereas no BFD-RS from other cells may be included, e.g. if they were configured with high indices.

In some embodiments, the RS with lowest and/or highest indices in an ON cells and/or active BWPs are included. For example, for each ON cell and/or BWP, the RS with lowest and/or highest index is first included in RBFD, given that RBFD is not exceeded. After that, the RS with second lowest and/or second highest index is included in RBFD, etc., as long as RBFD is not exceeded. Various such approaches may result in more even inclusion of BFD-RS into RBFD, across ON cells and/or active BWPs. In one example, one BFD-RS per ON cell and/or active BWP is included in RBFD, even if the BFD-RS in the different ON cells and/or active BWPs are configured with very different indices.

A motivation to use such a selection method could be that it is simple and that the network can control the order/priority with which the UE includes BFDRS in RBFD by the configured association between RS and RS index. For example, if the UE includes the BFD-RS with lowest cell indexes in RBFD, the network can assign the lowest RS indices to the BFD-RS the network prefers the UE perform BFD on.

Selection Based on BFD-RS Priority Value

In various embodiments, a BFD-RS has one or more priority value(s) related to BFD, NBI and/or BFR. In various embodiments, a UE uses a BFD-RS priority value as a criterion for selecting BFD-RS for inclusion in RBFD, for example, the Rmax BFD-RS with highest and/or lowest priority values.

In various embodiments, a priority value for a BFD-RS is configured by the network, e.g. as a part of an RRC configuration. e.g. in RadioLinkMonitoringRS. In some embodiments, a priority value for a BFD-RS could be predefined, e.g. a priority value associated with BFD-RS that are SSB and another priority value associated with BFD-RS that are CSI-RS.

Selection Based on QCL Properties

In various embodiments, a UE uses a set of configured QCL relations (e.g. through RRC configured TCI-states and/or TCI state indicated via MAC CE and/or DCI) to determine which BFD-RS to include in RBFD. In some embodiments, a UE prioritizes RS that are QCL with a monitored CORESET/Search space. In some embodiments, a UE prioritizes an RS for inclusion in RBFD that is QCL with a monitored CORESET with a certain index, e.g. CORESET index 0.

In various embodiments, multiple RS are QCL with a monitored CORESET. In some such embodiments, only an RS with QCL-TypeD (see [38.214]) is included in RON. In some such embodiments, the multiple RS are included in RON, but an RS with QCL-TypeD (see [38.214]) is prioritized for inclusion in RBFD.

Multiple Selection Criteria

In various embodiments, a UE uses multiple selection criteria for selecting which BFD-RS to include in RBFD. For example, a primary and a secondary criterion are defined. In another example a primary, secondary and third criterion are defined.

In some embodiments, a UE uses a first selection criterion for inclusion of BFD-RS in RBFD. If the first criterion did not fully select BFD-RS for RBFD, e.g. since multiple BFD-RS are equivalent according to the first criterion, then a UE uses a second criterion for selecting BFD-RS. In some embodiments, a second criterion is used as tie-breaking to resolve selection that was not resolved by using the first criterion. In some embodiments, a second criterion is used for selection of BFD-RS without considering selection, e.g. partial selection, that was already achieved by the first criterion. A third criterion may be used similarly, if a second criterion was not sufficient. Some embodiments also include further criteria beyond a third. For example, if a priority value is used as a primary criterion, BFD-RS are firstly included in RBFD based on a priority value. e.g. highest and/or lowest value. If, due to the priority values, selection among BFD-RS with the same priority is required, a secondary criterion is used to select among those BFD-RS, e.g. based on RS index.

In an example, a first criterion uses RS index to include BFD-RS in RBFD, for instance according to various embodiments regarding selection based on BFD-RS Index. If a further selection between BFD-RS with same/equivalent index is needed, a second criterion based on the cell and/or BWP is used, e.g. a cell index.

Note that even though multiple selection criteria are defined, they might not have to be used in many cases, e.g. if a first criterion is sufficient to completely select BFD-RS for inclusion in $R_{BFD}$.

In various embodiments with multiple selection criteria, a UE uses as first, second, third, etc., selection criterion a combination of selection criteria/rules/procedures described in various embodiments in this disclosure, e.g. as described regarding BFD-RS Selection Rule/Procedure. In various embodiments, a last criterion, e.g. second or third criterion, is up to UE implementation. For instance, if further selection is needed after selection according to a first criterion or according to a first and second criteria, it is up to the UE how to finalize the selection.

Exemplary UE Procedures

Figure 10:
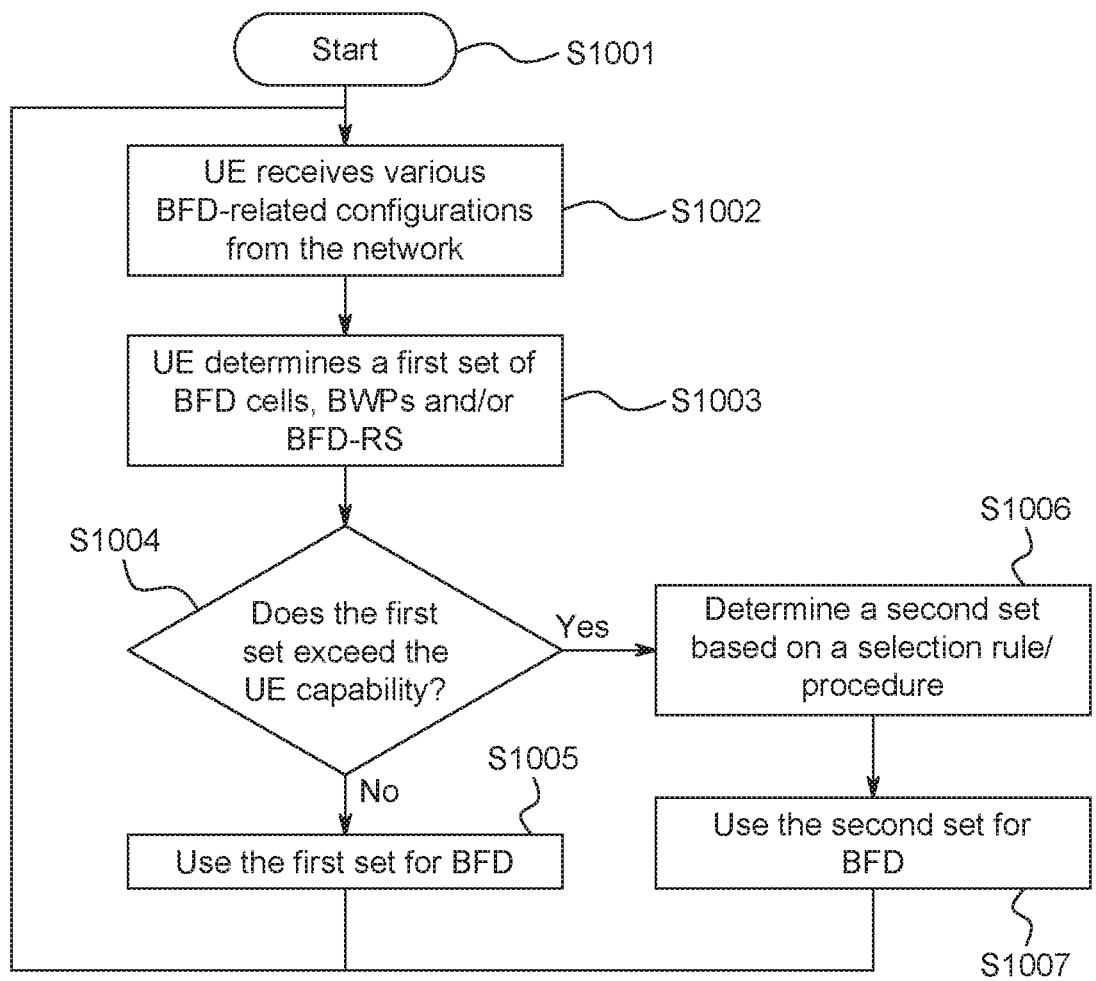
FIG. 10 is a flowchart of a UE process performed at the UE for determining whether an existing BFD demand (caused by a network configuration of) a first set of cells on UE capability is exceeded and then identifying a second set of cells if the UE determines the UE capability is exceeded by the first set of cells.

Various embodiments of a UE procedure for maintaining a set of BFD cells, BFD BWPs and/or BFD-RS that does not exceed a UE capability are illustrated in FIG. 10. The numbered steps in the flow chart are discussed below. Various embodiments include only a part of the steps and/or in a different order.

Step S1001. See various embodiments for the description for FIG. 4 and/or FIG. 5.

Step S1002. A UE receives various configurations from the network, e.g. RRC configurations, MAC CE configurations or configurations by DCI, related to BFD. For example, one or more configurations discussed in regarding Network indication are received, e.g. as illustrated in FIG. 4, FIG. 5. FIG. 7 and FIG. 8.

Step S1003. A UE determines a first set of BFD cells, BFD BWPs and/or BFD-RS, e.g. according to various configurations received in step S1002.

In various embodiments in which UE capabilities of multiple different forms are applicable, multiple first sets of BFD-RS may be determined. For example, if a capability for the maximum number of ON BFD-RS of a first type as well as a capability for the maximum number of ON BFD-RS of a second type are applicable, then a UE may determine a first set of BFD-RS of the first type and a first set of BFD-RS of a second type in this step.

Step S1004. The UE evaluates if the first set exceeds the one or more BFD related UE capabilities.

In various embodiments with a first set of BFD-RS of the first type and a first set of BFD-RS of a second type in this step, the UE evaluates if the sets exceed the corresponding UE capability, i.e. if the first set of BFD-RS of the first type exceeds to UE capability regarding the ON BFD-RS of the first type.

Step S1005. If not exceeded, the UE uses the first set for BFD.

In various embodiments with a first set of BFD-RS of the first type and a first set of BFD-RS of a second type in this step, the UE uses these first sets of BFD-RS as ON BFD-RS.

Step S1006. If the first set exceeds the UE capability/capabilities, the UE determines a second set of BFD cells, BFD BWPs and/or BFD-RS, based on one or more selection rule(s)/procedure(s), e.g. as described in embodiments regarding cell/BWP Selection Rule/Procedure, and BFD-RS Selection Rule/Procedure.

In various embodiments with a capability regarding BFD-RS of the first type and a capability regarding BFD-RS of a second type, the UE determines, e.g. jointly, a second set of set of BFD-RS of the first type and a second set of BFD-RS of a second type in this step, such that each of the corresponding UE capabilities is not exceeded.

Step S1007. The UE uses the second set for BFD.

In various embodiments with a second set of BFD-RS of the first type and a second set of BFD-RS of a second type in this step, the UE uses these second sets of BFD-RS as ON BFD-RS.

An exemplary embodiment of the present disclosure provides a first apparatus (e.g., 102) that includes a processor (e.g., processor 118), a memory (e.g., memory 130, memory 132, etc.), and communication circuitry (which can include e.g., transceiver 120). The first apparatus is connected to a communications network via its communication circuitry. The first apparatus further includes computer-executable instructions stored in the memory of the first apparatus which, when executed by the processor of the first apparatus, cause the first apparatus to: identify an apparatus capability (e.g., a UE capability) that is an indication of an ability of the first apparatus to perform beam failure detection (BFD) for a plurality of cells, transmit the apparatus capability to a second apparatus (e.g., gNode B), receive from the second apparatus at least one message including information of a change in network configuration (e.g., different cells being assigned to the UE, or different BWPs assigned to the UE, or different BDF-RSs assigned to the UE, or ON/OFF status changes of cells); and substitute a second set of cells for the first set of cells on which the first apparatus performs BFD based on the information of change in network configuration so the apparatus capability is not exceeded by the network configuration.

The embodiment described in the paragraph above, is one of multiple ways to address the issues where a UE's capabilities are exceeded by a network configuration (e.g., cells, or BWPs, or BFD-RSs assigned to the UE for performing BFD). Here, the UE identifies an apparatus capability (UE capability) that is an indication of an ability of the first apparatus to perform beam failure detection (BFD) for a plurality of cells and transmits it to a second apparatus (e.g., gNode B). The second apparatus then makes a change to the network configuration so the UE's capability is not exceeded by the cells, BWPs, and BFD-RSs assigned to if for BFD. The UE receives from the second apparatus at least one message including information of a change in network configuration, and in response, substitutes a second set of cells for the first set of cells on which the first apparatus performs BFD based on the information of change in network configuration so the apparatus capability is not exceeded by the network configuration. The second set of cells (and/or BWPs. and BFD-RSs) may be provided to the UE by the second apparatus.

As discussed previously, the demands on UEs to perform BFD can be substantially higher than conventional systems where according to the present disclosure, the UE may be assigned more than 2, such as 5, 10, 15, 20, 25, 30, or even 36 different cells on which to perform BFD. As recognized by the present inventors, without an active way to manage the load/demand on the UE, the UE may fail in its ability to provide BFD on the cells for which it is expected to provide BFD. The present disclosure provides numerous ways for addressing this potential issue.

In a second way, the UE determines by itself that its UE capability is exceeded and in turn applies a set of rules or processes to substitute the first set of cells for a second set of cells, the network configuration for which falls within the capability of the UE.

Likewise, although many of the exemplary embodiments provided herein describe demand in terms of a number of cells, a number of reference signals, and/or a discrete number or amount of BWP, for example, the present inventors recognize that the teachings of the present disclosure also cover dynamic control so as to adapt to changes in power level at the UE, or other cells. Likewise, the teachings of the present disclosure have described various parameters (e.g., UE capability) in terms of integers (e.g., number of cells). However, the UE capability parameter, and demand placed on the UE for BFD functions need not be integers (i.e., where all cells pose an equal demand on the UE). For example, it is recognized that some cells may require more BFD processing capability than others because perhaps (1) the number of BFD-RS they use is different than other cells. (2) the SNR or (signal to interference plus noise) ratio may impose a greater BFD strain on a UE than other cells, or (3) the power levels at the cells may be lower than a threshold, which gives rise to signal disturbance such as beam fading, null shifting, other BFD-RS properties such as transmission periodicity, as well as other aspects such as bandwidth and density in frequency. Accordingly, these factors need not result in a quantization levels of network configuration expressed in integer number of cell, but also real numbers. Moreover, these real numbers will have a temporal component to reflect changes in cell and channel status. As a non-limiting example, a UE may be assigned two cells, the first of which, at a time T1, creates a demand of 90% of a standard cell demand, and the second cell creates a second demand of 110% of the standard cell demand. However, at time T2, the respect demands change to 110% and 120% respectively, which in turn triggers either the network or the UE to determine that the demand exceeds the UE capability for BFD. In response to this realization, either the network adapts the cell configurations for the UE, or the UE decides by itself, by applying a set of rules, that the set of cells for which the UE will perform BFD will be substituted out for a second set of cells, the demand for which is within the UE capability for BFD. Similarly, the UE capability may not be static, and thus a recognized change in the UE capability will be realized by the UE and/or the network, and serve as a similar triggering event to that described above, to substitute the second set of cells for the first set of cells.

In an exemplary embodiment, the first apparatus receives from a second apparatus at least one message including information of a change in network configuration. The at least one message may be in several forms. For example, it may be in a radio resource control (RRC) signal, where the RRC signal contains an indication of a cell configuration of a candidate cell of the second set of cells regarding whether, at least one of, BFD is enabled on a BandWidth part (BWP) for the candidate cell, BFD is enabled on the candidate cell, and BFD-reference signal (BFD-RS) is configured for the candidate cell. Alternatively, it may occur by way of MAC CE signaling with respect to activating BFD. BWP and/or BFD-RS on the candidate cell, or L1 signaling. In the case of L1 signaling, the signal(s) may include a cell state index which indicates a state of the candidate cell.

In an exemplary embodiment, as discussed above with regard to "a second way" the first apparatus, identifies an apparatus capability that is an indication of an ability of the first apparatus to perform beam failure detection (BFD) for a plurality of cells, determines whether a network configuration of a first set of cells exceeds the apparatus capability to perform BFD on a first set of cells of the plurality of cells, and in response to a determination that the apparatus capability is exceeded, substitute a second set of cells for the first set of cells on which the first apparatus performs BFD.

In an exemplary embodiment, the first apparatus compares the apparatus capability to the network configuration of the first set of cells, and reduce a number of cells in the second set of cells relative to the first set of cells so the apparatus capability is no longer exceeded.

In an exemplary embodiment, first apparatus to: select candidate cells to be included in the second set of cells based on a selection criteria that includes at least one of a cell index, a BWP index, a time in a cell state, a time in a BWP state, an inactivity time in a cell state, an inactivity time in a BWP state, a cell frequency, a frequency band of a cell, a frequency band of BWP, a cell priority value, a BWP priority value, a service or quality of service for a cell, a service or quality of service or a BWP, a time advance group of a cell, a cell type, whether a configuration of a cell is made with a BFD-reference signal (BFD-RS), at least one of BWP and BWP-inactivity timer property, first apparatus measurement, and, cell state.

Likewise, in an exemplary embodiment, the first apparatus may select candidate cells to be included in the second set of cells based on a selection criteria that includes at least one of BFD-reference signal (BFD-RS) index, BFD-RS priority value, and Quasi co-location property.

In an exemplary embodiment, a first apparatus includes a processor; a memory; and communication circuitry, the first apparatus being connected to a communications network via the communication circuitry, the first apparatus further including computer-executable instructions stored in the memory which, when executed by the processor, causes the first apparatus to identify an apparatus capability that is an indication of an ability of the first apparatus to perform beam failure detection (BFD) operations for a plurality of BFD-reference signals (RS's), transmit the apparatus capability to a second apparatus; receive from the second apparatus at least one message including information of a change in network configuration; and substitute a second set of cells for the first set of BFD-RS's on which the first apparatus performs BFD operations based on the information of change in network configuration so the apparatus capability is not exceeded by the network configuration.

In an exemplary embodiment, a first apparatus includes a processor; a memory; and communication circuitry, the first apparatus being connected to a communications network via the communication circuitry, the first apparatus further including computer-executable instructions stored in the memory which, when executed by the processor, causes the first apparatus to identify an apparatus capability that is an indication of an ability of the first apparatus to perform beam failure detection (BFD) operations for a plurality of BFD-reference signals (RS's), determine whether a network configuration of a first set of cells exceeds the apparatus capability to perform BFD operations for a first set of BFD-RSs, and in response to a determination that the apparatus capability is exceeded, substitute a second set of cells for the first set of BFD-RS's on which the first apparatus performs BFD operations so the apparatus capability is not exceeded by the network configuration.

In an exemplary embodiment, a method of managing beam failure detection (BFD) in a first apparatus is described that includes a processor, a memory, and communication circuitry and is connected to a communications network via the communication circuitry, the method include identifying an apparatus capability that is an indication of an ability of the first apparatus to perform beam failure detection (BFD) for a plurality of cells, transmitting the apparatus capability to a second apparatus: receiving from the second apparatus at least one message including a change in network configuration; and substituting a second set of cells for the first set of cells on which the first apparatus performs BFD based on the change in network configuration so the apparatus capability is not exceeded by the network configuration.

In an exemplary embodiment, a non-transitory computer readable storage medium is described having computer-readable instructions tangibly recorded thereon which, when executed by processing circuitry, cause the processing circuitry to manage beam failure detection (BFD) in a first apparatus, the method including identifying an apparatus capability that is an indication of an ability of the first apparatus to perform beam failure detection (BFD) for a plurality of cells, transmitting the apparatus capability to a second apparatus; receiving from the second apparatus at least one message including a change in network configuration; and substituting a second set of cells for the first set of cells on which the first apparatus performs BFD based on the change in network configuration so the apparatus capability is not exceeded by the network configuration.

In an exemplary embodiment, a second apparatus include a processor, a memory; communication circuitry, the second apparatus being connected to a communications network via its communication circuitry, the second apparatus further including computer-executable instructions stored in the memory which, when executed by the processor, cause the second apparatus to: receive in at least one message from a first apparatus an apparatus capability that includes an indication of an apparatus capability of the first apparatus to perform beam failure detection (BFD) on cells in a communications network; and transmit to the first apparatus cell configuration information for a first set of cells, the cell configuration information including information indicating whether respective cells are configured to have BDF that is enabled via at least one of RRC signaling. MAC CE signaling, and L1 signaling.

In an exemplary embodiment, the second apparatus transmits the cell configuration information via RRC signaling, the RRC signaling contains an indication of a cell configuration of a candidate cell of a second set of cells on which the first apparatus performs BFD regarding whether, at least one of, BFD is enabled on a BandWidth part (BWP) for the candidate cell, BFD is enabled on the candidate cell, and BFD-RS is on for the candidate cell.

In an exemplary embodiment, the second apparatus transmits the cell configuration information with an indication of whether a candidate cell in a second set of cells has BFD and BWP activated by MAC CE.

In an exemplary embodiment, the second apparatus transmits the cell configuration information with an indication of whether a candidate cell in a second set of cells has BFD-RS activated by MAC CE.

In an exemplary embodiment, the second apparatus transmits the cell configuration information with an indication of whether a candidate cell in a second set of cells has BFD and BWP activated by L1 signaling.

In an exemplary embodiment, a method is described for managing beam failure detection (BFD) in a first apparatus via configuration information transmitted from a second apparatus, the second apparatus includes a processor, a memory, and communication circuitry and is connected to a communications network via the communication circuitry, the method including receiving in at least one message from a first apparatus an indication of an apparatus capability of the first apparatus to perform beam failure detection (BFD) on cells in a communications network; and transmitting to the first apparatus cell configuration information for a first set of cells, the cell configuration information including information indicating whether respective cells are configured to have BDF that is enabled via at least one of RRC signaling, MAC CE signaling, and L1 signaling.

Thus, it will be appreciated by those skilled in the art that the disclosed systems and methods can be embodied in other specific forms without departing from the spirit or essential characteristics thereof. The presently disclosed embodiments are therefore considered in all respects to be illustrative and not restricted. It is not exhaustive and does not limit the disclosure to the precise form disclosed. Modifications and variations are possible in light of the above teachings or may be acquired from practicing of the disclosure, without departing from the breadth or scope. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment. B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises." "comprising." or any other variation thereof, are intended to cover a non-exclusive inclusion, such that a process, method, article, or apparatus that comprises a list of elements does not include only those elements but may include other elements not expressly listed or inherent to such process, method, article, or apparatus. The scope of the invention is indicated by the appended claims rather than the foregoing description and all changes that come within the meaning and range and equivalence thereof are intended to be embraced therein.

What is claimed is:

1. A wireless transmit/receive unit (WTRU) comprising:
a processor; and
a memory coupled with the processor, the memory storing executable instructions that when executed by the processor cause the processor to effectuate operations comprising:
communicating with two or more serving cells, wherein the two or more serving cells comprise a special cell (SpCell) and one or more secondary cells (SCells),
wherein each of the one or more SCells is in a cell state for the WTRU,
wherein the cell state comprises a deactivated state, an activated state with dormant bandwidth part (BWP), or an activated state with a non-dormant BWP,
wherein, an SCell of the one or more SCells is:
in the activated state with the dormant BWP when an active downlink (DL) BWP of the SCell is a dormant DL BWP, wherein the dormant DL BWP is the DL BWP of the SCell with a BWP identifier equal to a dormant BWP identifier configured for the SCell; or
in the activated state with the non-dormant BWP when the active DL BWP of the SCell is the non-dormant BWP;
receiving, for the SCell that is in the activated state with the non-dormant BWP, information indicating to switch to the activated state with the dormant BWP for the SCell; and
based on the information, switching to the activated state with the dormant BWP for the SCell.

2. The WTRU of claim 1, the operations further comprising when the SCell is in the activated state with the dormant BWP:
- performing beam failure recovery (BFR) and beam failure detection (BFD);
- measuring channel state information (CSI); and
- reporting the CSI on the SpCell, wherein for the SCell the WTRU is configured to:
  - not monitor PDCCH,
  - not transmit PUCCH, and
  - not transmit SRS.

3. The WTRU of claim 1, wherein the information comprises a bitmap with each bit being associated with the one or more serving cells, and the association being configurable.

4. The WTRU of claim 1, the operations further comprising transitioning to the activated state with the dormant BWP from:
- the deactivated state, or
- the activated state with a non-dormant BWP.

5. The WTRU of claim 1, wherein the information is received on the SpCell.

6. The WTRU of claim 1, wherein the information indicates to switch the active DL BWP from the non-dormant BWP to the dormant BWP.

7. The WTRU of claim 1, wherein the information indicates to switch the SCell from the deactivated state to the activated state with the dormant BWP.

8. A method comprising:
- communicating with two or more serving cells, wherein the two or more serving cells comprise a special cell (SpCell) and one or more secondary cells (SCells),
  - wherein each of the one or more SCells is in a cell state for a wireless transmit/receive unit (WTRU),
  - wherein the cell state comprises a deactivated state, an activated stated with dormant bandwidth part (BWP), or an activated state with a non-dormant BWP,
  - wherein, an SCell of the one or more SCells is:
    - in the activated state with the dormant BWP when an active downlink (DL) BWP of the SCell is a dormant DL BWP, wherein the dormant DL BWP is the DL BWP of the SCell with a BWP identifier equal to a dormant BWP identifier configured for the SCell; or
    - in the activated state with the non-dormant BWP when the active DL BWP of the SCell is the non-dormant BWP;
- receiving, for the SCell that is in the activated state with the non-dormant BWP, information indicating to switch to the activated state with the dormant BWP for the SCell; and
- based on the information, switching to the activated state with the dormant BWP for the SCell.

9. The method of claim 8, the operations further comprising when the SCell is in the activated state with the dormant BWP:
- performing beam failure recovery (BFR) and beam failure detection (BFD);
- measuring channel state information (CSI); and
- reporting the CSI on the SpCell, wherein for the SCell the WTRU is configured to:
  - not monitor PDCCH,
  - not transmit PUCCH, an
  - not transmit SRS.

10. The method of claim 8, wherein the information comprises a bitmap with each bit being associated with the one or more serving cells, and the association being configurable.

11. The method of claim 8, the operations further comprising transitioning to the activated state with the dormant BWP from:
- the deactivated state, or
- the activated state with a non-dormant BWP.

12. The method of claim 8, wherein the information is received on the SpCell.

13. The method of claim 8, wherein the information indicates to switch the active DL BWP from the non-dormant BWP to the dormant BWP.

14. The method of claim 8, wherein the information indicates to switch the SCell from the deactivated state to the activated state with the dormant BWP.

15. A computer readable storage medium storing computer executable instructions that when executed by a computing device cause the computing device to effectuate operations comprising:
- communicating with two or more serving cells, wherein the two or more serving cells comprise a special cell (SpCell) and one or more secondary cells (SCells),
  - wherein each of the one or more SCells is in a cell state for a wireless transmit/receive unit (WTRU),
  - wherein the cell state comprises a deactivated state, an activated stated with dormant bandwidth part (BWP), or an activated state with a non-dormant BWP,
  - wherein, an SCell of the one or more SCells is:
    - in the activated state with the dormant BWP when an active downlink (DL) BWP of the SCell is a dormant DL BWP, wherein the dormant DL BWP is the DL BWP of the SCell with a BWP identifier equal to a dormant BWP identifier configured for the SCell; or
    - in the activated state with the non-dormant BWP when the active DL BWP of the SCell is the non-dormant BWP;
- receiving for the SCell that is in the activated state with the non-dormant BWP, information indicating to switch to the activated state with the dormant BWP for the SCell; and
- based on the information, switching to the activated state with the dormant BWP for the SCell.

16. The computer readable storage medium of claim 15, wherein the information indicates to switch the active DL BWP from the non-dormant BWP to the dormant BWP.

17. The computer readable storage medium of claim 15, wherein the information indicates to switch the SCell from the deactivated state to the activated state with the dormant BWP.

18. The computer readable storage medium of claim 15, wherein the information indicating to switch state for the one or more SCells comprises a bitmap with each bit being associated with the one or more serving cells, and the association being configurable.

19. The computer readable storage medium of claim 15, wherein the information indicates to switch the active DL BWP from the non-dormant BWP to the dormant BWP.

20. The computer readable storage medium of claim 15, wherein the information indicates to switch the SCell from the deactivated state to the activated state with the dormant BWP.

* * * * *